US008011406B2

(12) United States Patent
Niwa et al.

(10) Patent No.: US 8,011,406 B2
(45) Date of Patent: Sep. 6, 2011

(54) APPARATUS FOR PRODUCING RFID LABEL AND EDITING APPARATUS FOR LABEL

(75) Inventors: Akihiko Niwa, Toki (JP); Tatsuhiro Ikedo, Ena (JP); Hideo Ueno, Nagoya (JP); Nobuhiko Funato, Gifu (JP); Kazunari Taki, Nagoya (JP); Tsuyoshi Ohashi, Hashima (JP); Katsumi Toda, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 905 days.

(21) Appl. No.: 11/942,907

(22) Filed: Nov. 20, 2007

(65) Prior Publication Data

US 2008/0093027 A1  Apr. 24, 2008

Related U.S. Application Data

(63) Continuation-in-part of application No. PCT/JP2006/310139, filed on May 22, 2006.

(30) Foreign Application Priority Data

May 23, 2005 (JP) ................................ 2005-149188
Jul. 12, 2005 (JP) ................................ 2005-202581

(51) Int. Cl.
*B29C 65/48* (2006.01)
*B32B 37/00* (2006.01)
*B32B 38/00* (2006.01)
*B32B 41/00* (2006.01)
*B65C 9/40* (2006.01)

(52) U.S. Cl. ........ 156/378; 156/384; 156/387; 156/510; 156/511; 156/537

(58) Field of Classification Search .................. 156/184, 156/192, 213, 227, 249, 250, 268, 277, 280, 156/384, 287, 510, 511, 521, 522, 537, 387, 156/378; 235/451, 492
See application file for complete search history.

(56) References Cited

U.S. PATENT DOCUMENTS 4,623,418 A * 11/1986 Gombrich et al. ............ 156/361
6,979,139 B2 12/2005 Hine et al.
(Continued)

FOREIGN PATENT DOCUMENTS

DE        4309750 A1 *  9/1994
(Continued)

OTHER PUBLICATIONS

English Abstract of DE 4309750 (Apr. 11, 2011).*
(Continued)

*Primary Examiner* — Philip C Tucker
*Assistant Examiner* — Sing P Chan
(74) *Attorney, Agent, or Firm* — Baker Botts L.L.P.

(57) ABSTRACT

There are provided a cartridge to which a first roll around which a base tape with a plurality of RFID circuit elements arranged is wound can be detachably attached, an antenna for transmission/reception of information with the RFID circuit element, a signal processing circuit and a transmitting portion that generate access information to an IC circuit part of the RFID circuit element, transmit the information to the RFID circuit element and carry out information writing in the IC circuit part or information reading from the IC circuit part, a print head for printing on a cover film, and a control circuit provided with a determination portion that determines matching between parameter data provided at the cartridge and instruction data relating to the print input by an operation portion.

22 Claims, 36 Drawing Sheets

U.S. PATENT DOCUMENTS

| | | |
|---|---|---|
| 7,495,559 B2 | 2/2009 | Nagai et al. |
| 2003/0077099 A1* | 4/2003 | Tanaka et al. ............... 400/615.2 |
| 2007/0131769 A1* | 6/2007 | Tanaka .......................... 235/451 |

FOREIGN PATENT DOCUMENTS

| | | |
|---|---|---|
| JP | H10-067157 A | 3/1998 |
| JP | 2000-237692 A | 9/2000 |
| JP | 2005-014524 A | 1/2005 |
| JP | 2005-128867 A | 5/2005 |
| JP | 2005-178278 A | 7/2005 |

OTHER PUBLICATIONS

Machine English Translation of DE 4309750 (Apr. 11, 2011).*

* cited by examiner

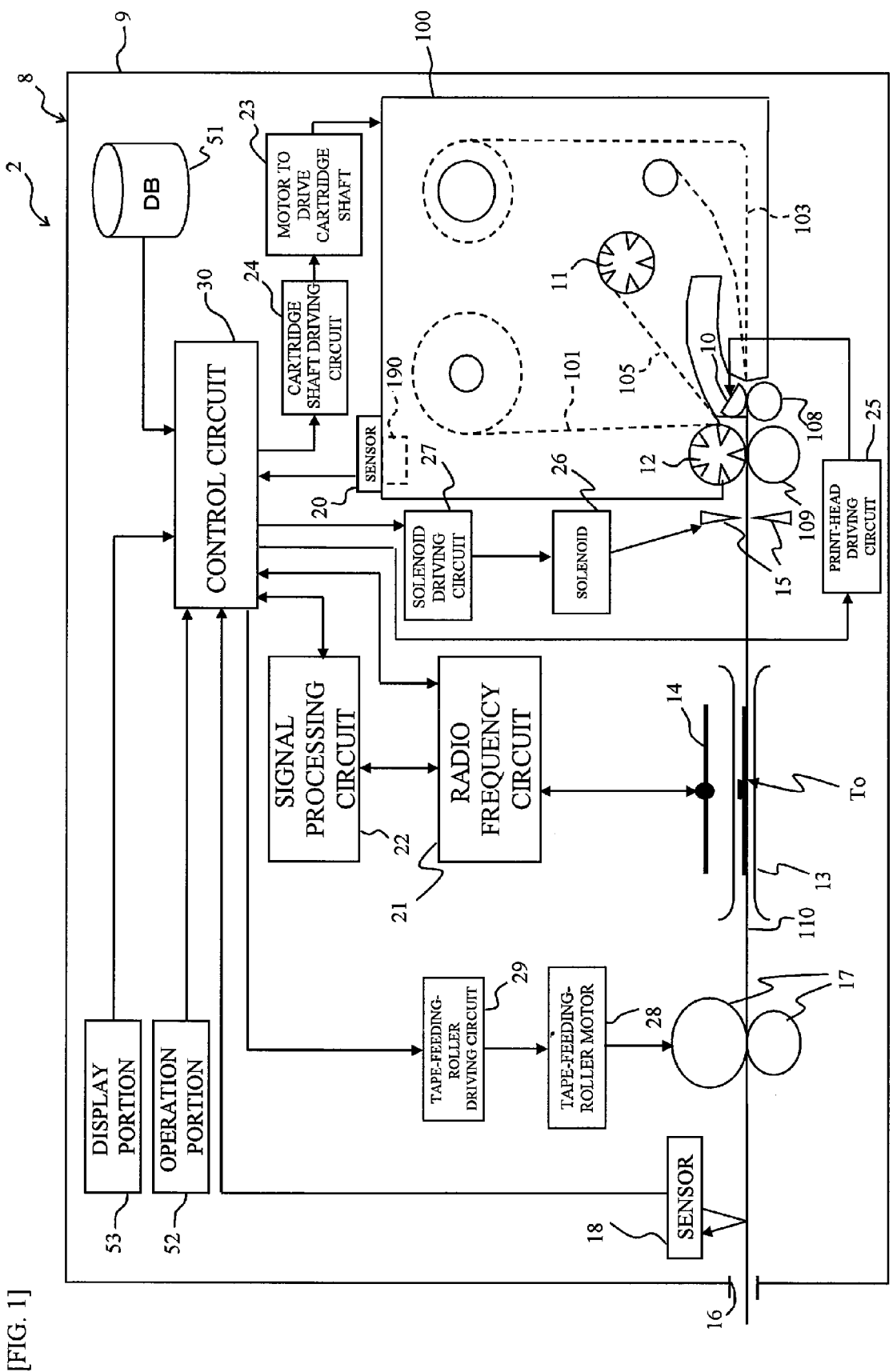
[FIG. 1]

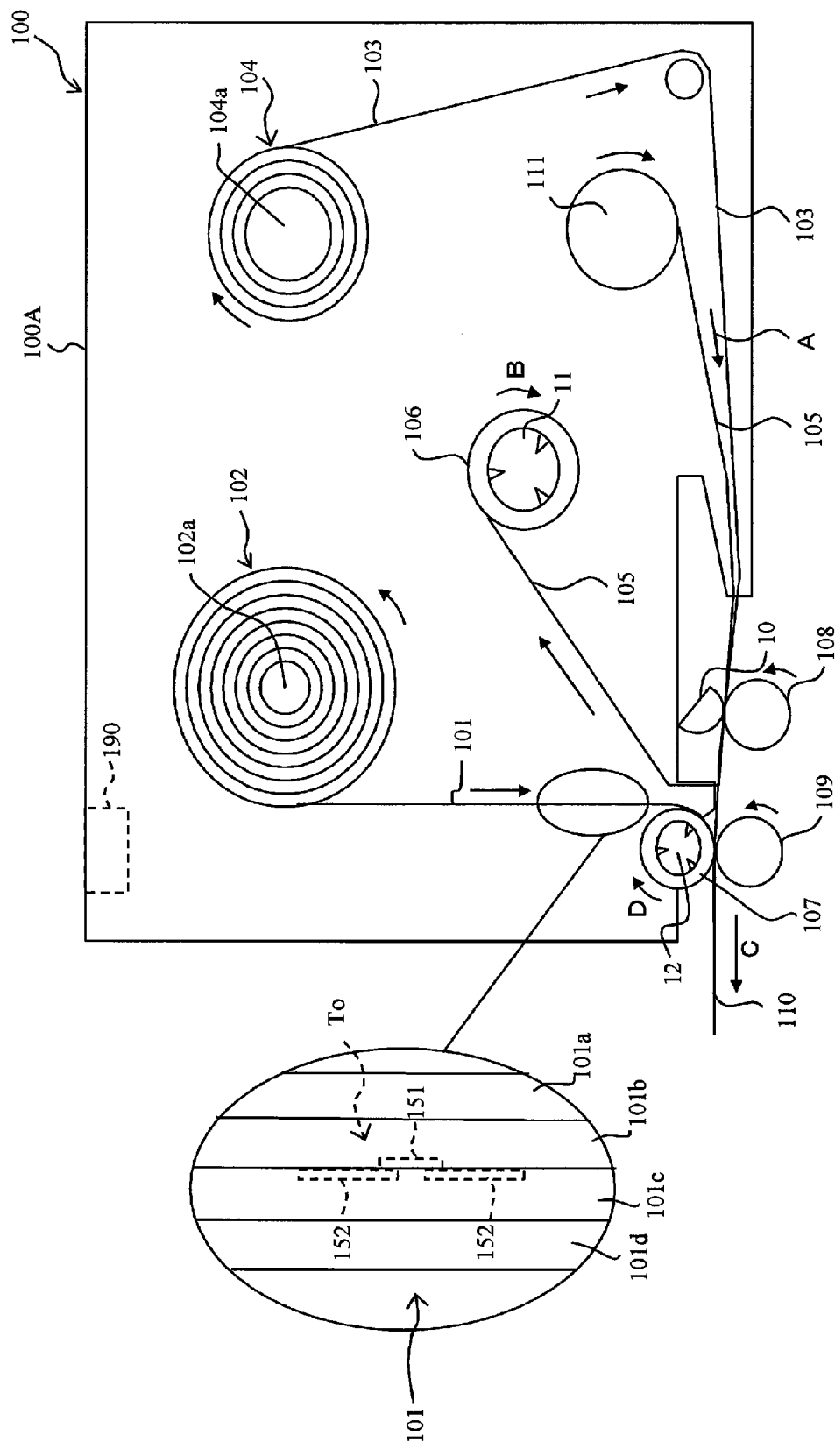

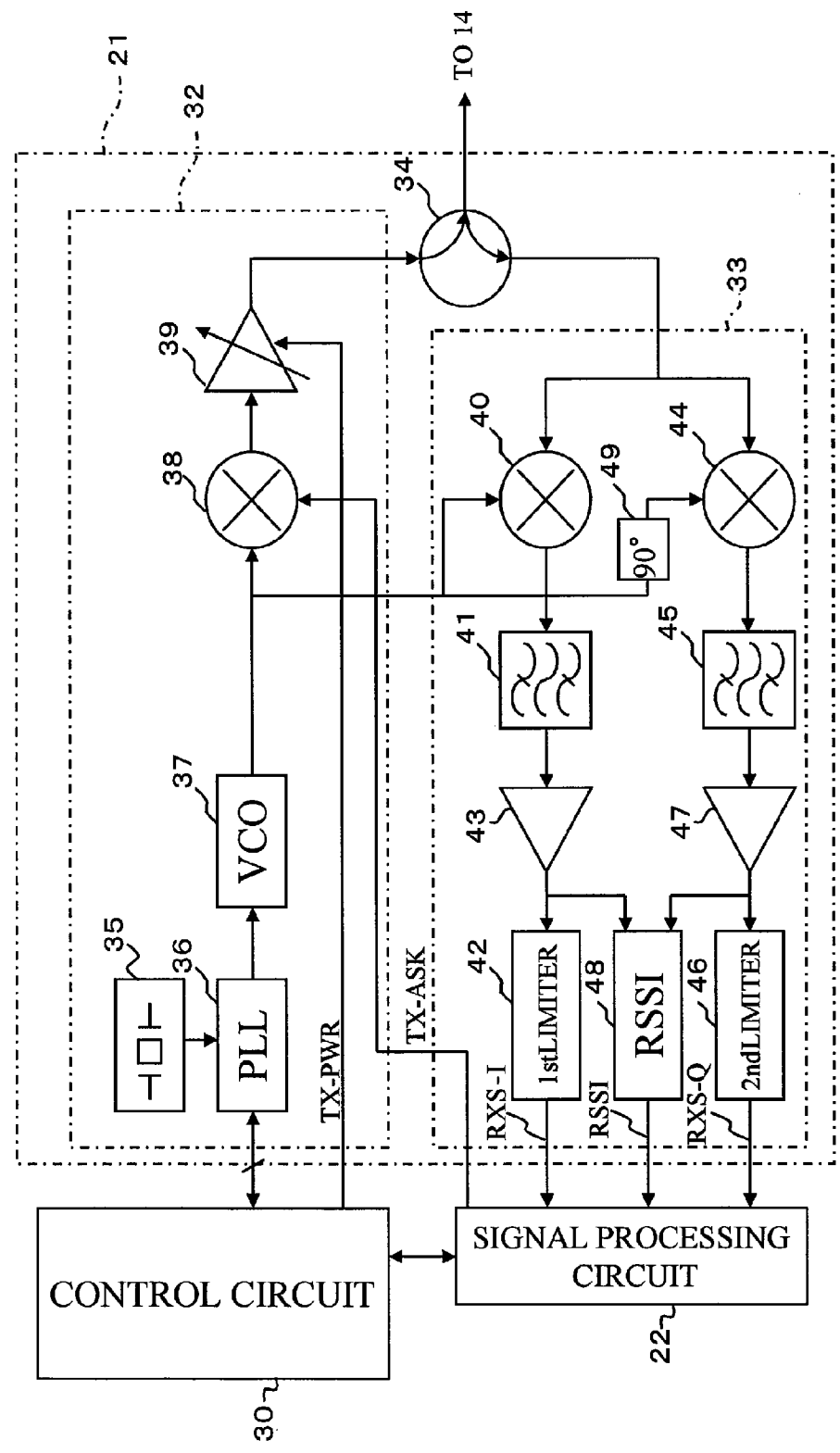
[FIG. 3]

[FIG. 4]
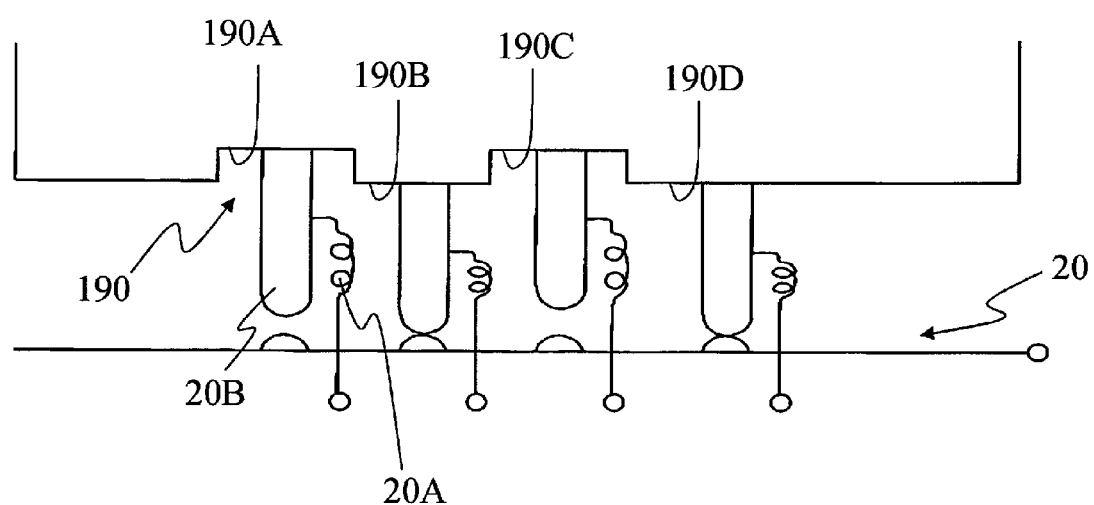

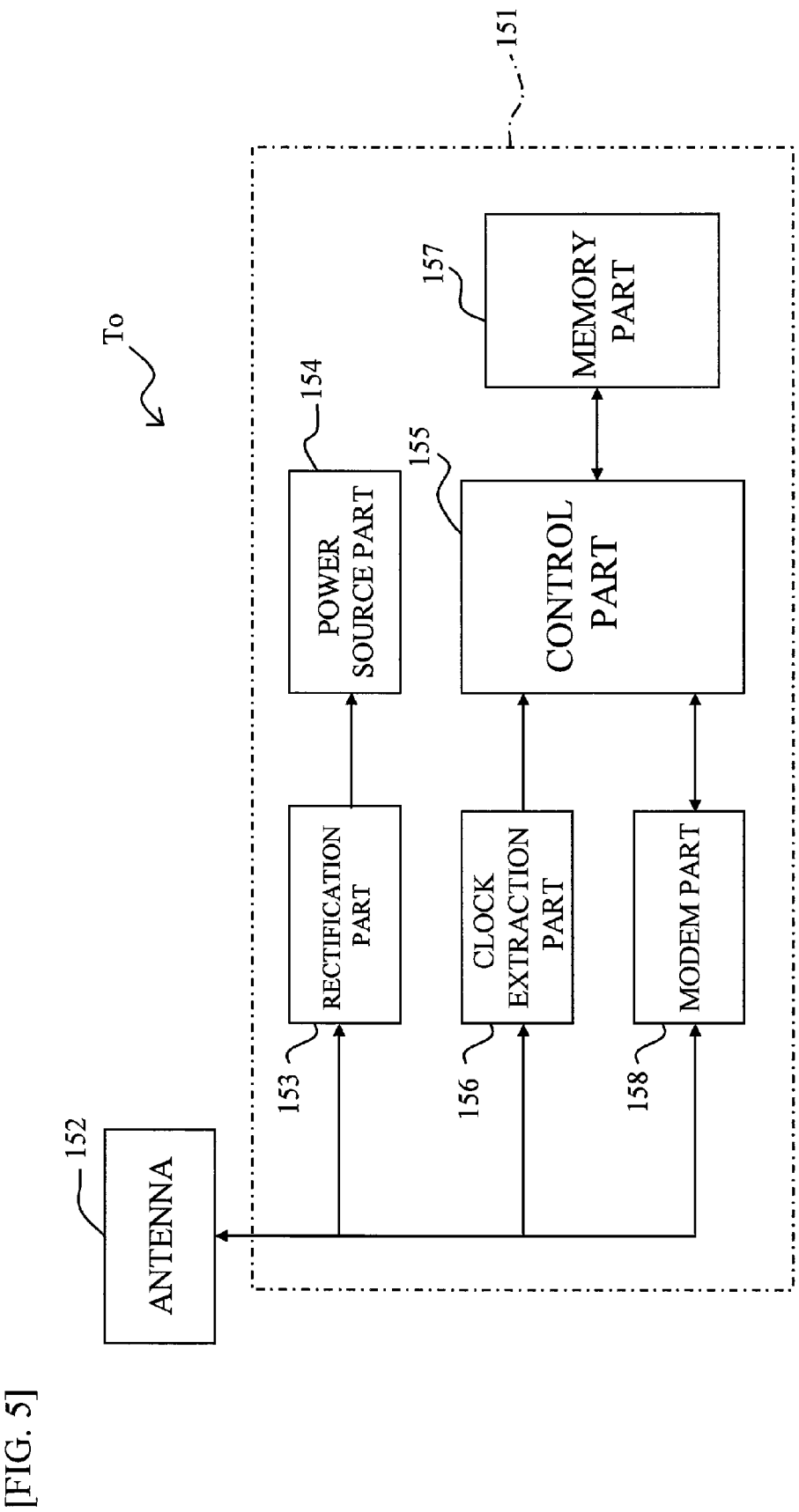
[FIG. 5]

[FIG. 6A]
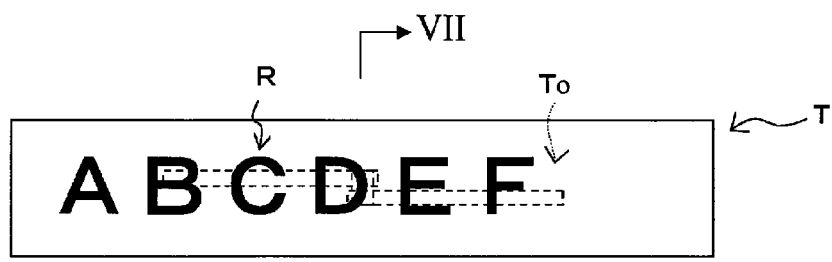
[FIG. 6B]
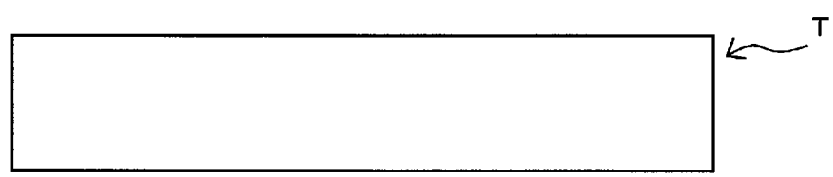
[FIG. 7]
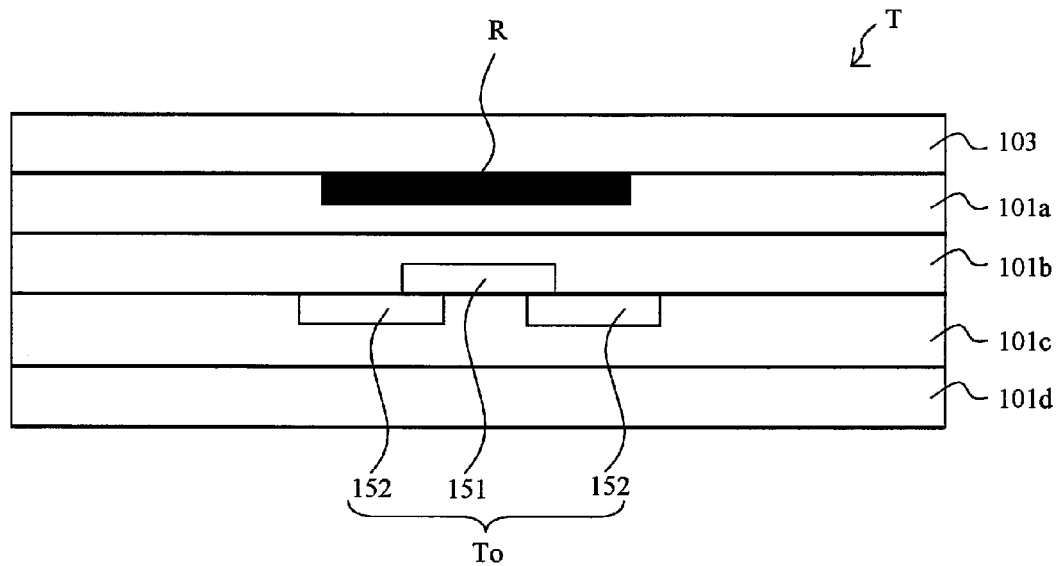

[FIG. 8A]
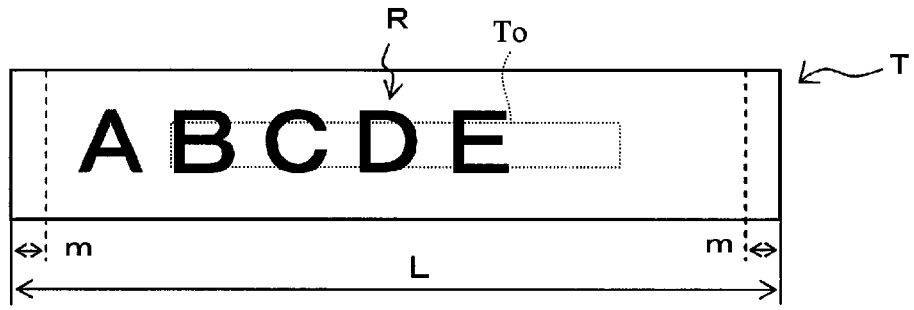
[FIG. 8B]
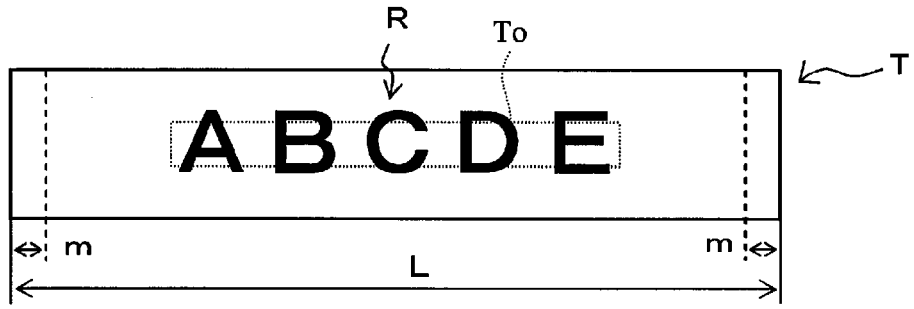
[FIG. 8C]
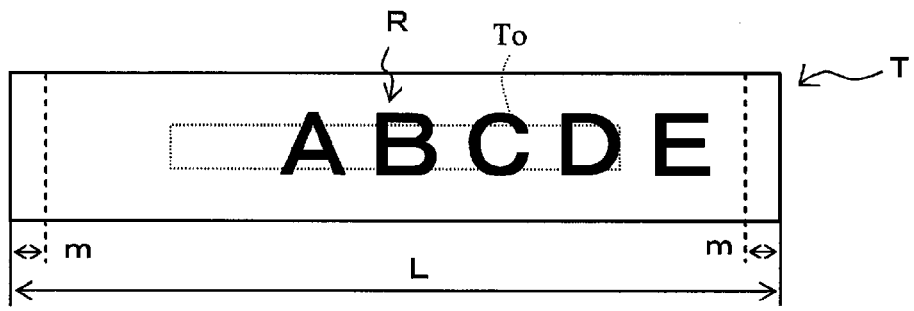
[FIG. 8D]
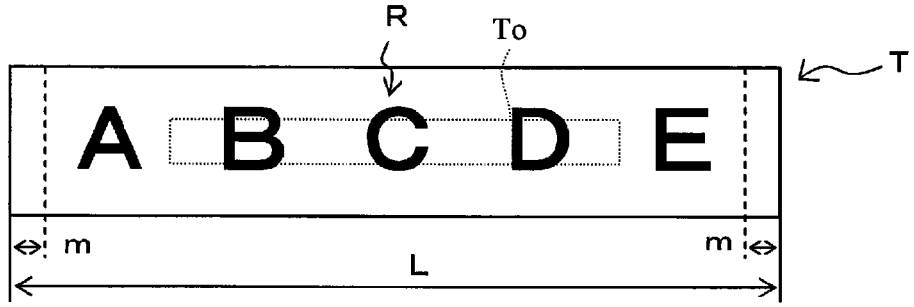

[FIG. 9]

RFID LABEL TYPE

| 915MHz, 100mm × 36mm TAG |
|---|

PRINT CHARACTERS

| A    B    C |
|---|

ACCESS ID

| 1 6 , 7 7 7 , 2 1 5 |
|---|

ARTICLE INFORMATION

| 1 3 1 , 0 7 1 |
|---|

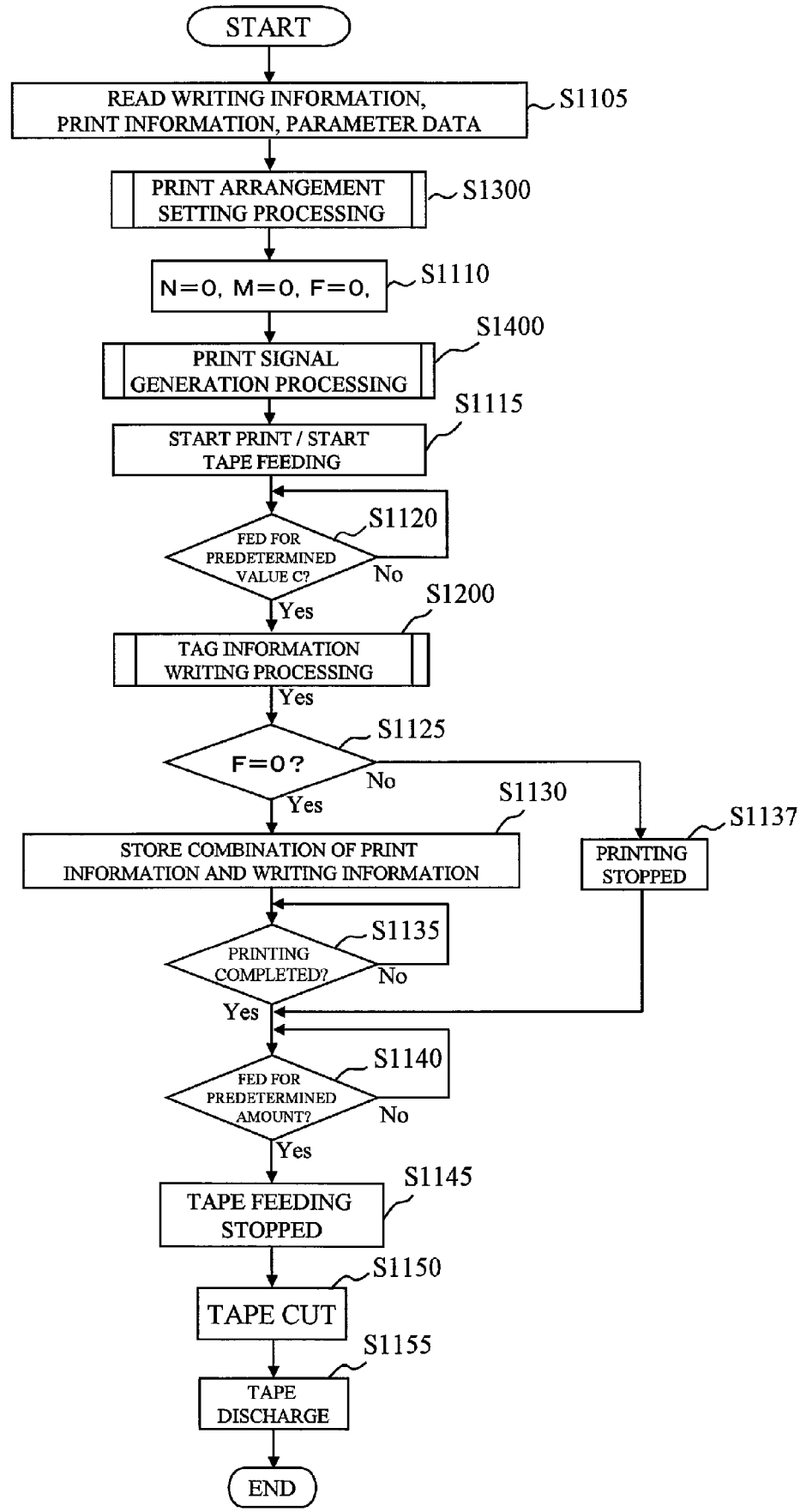
[FIG. 10]

[FIG. 11]
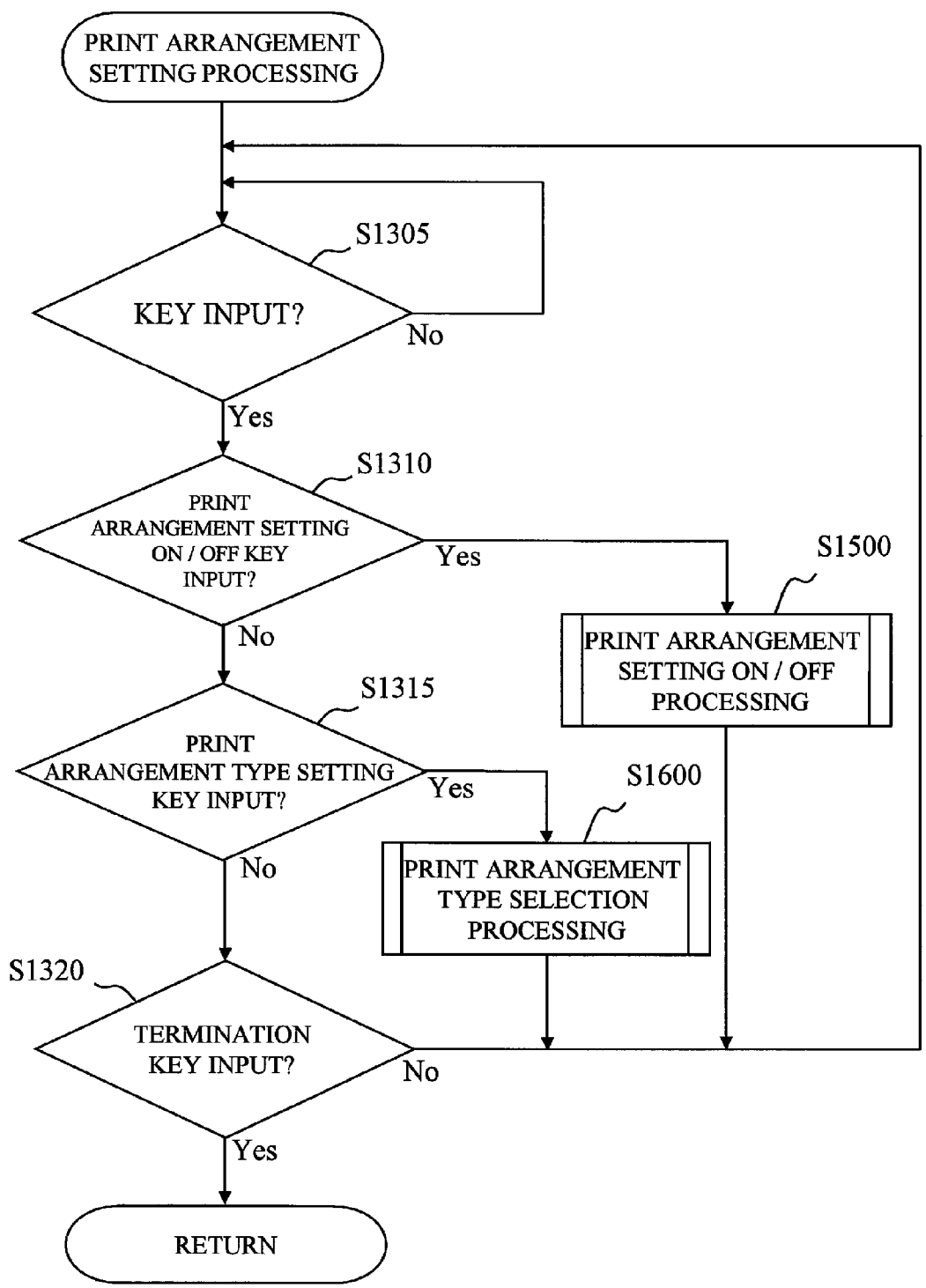

[FIG. 12]
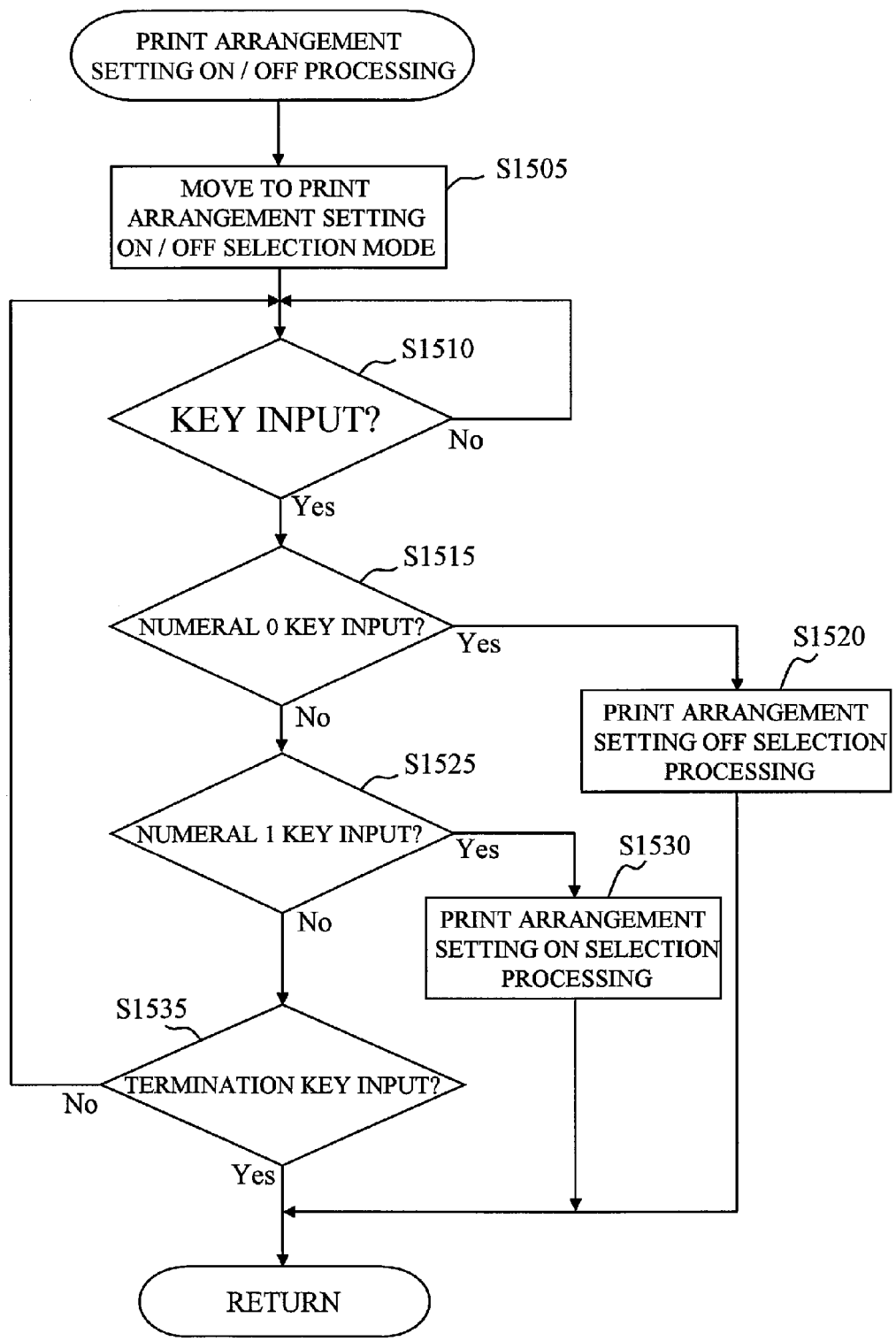

[FIG. 13]
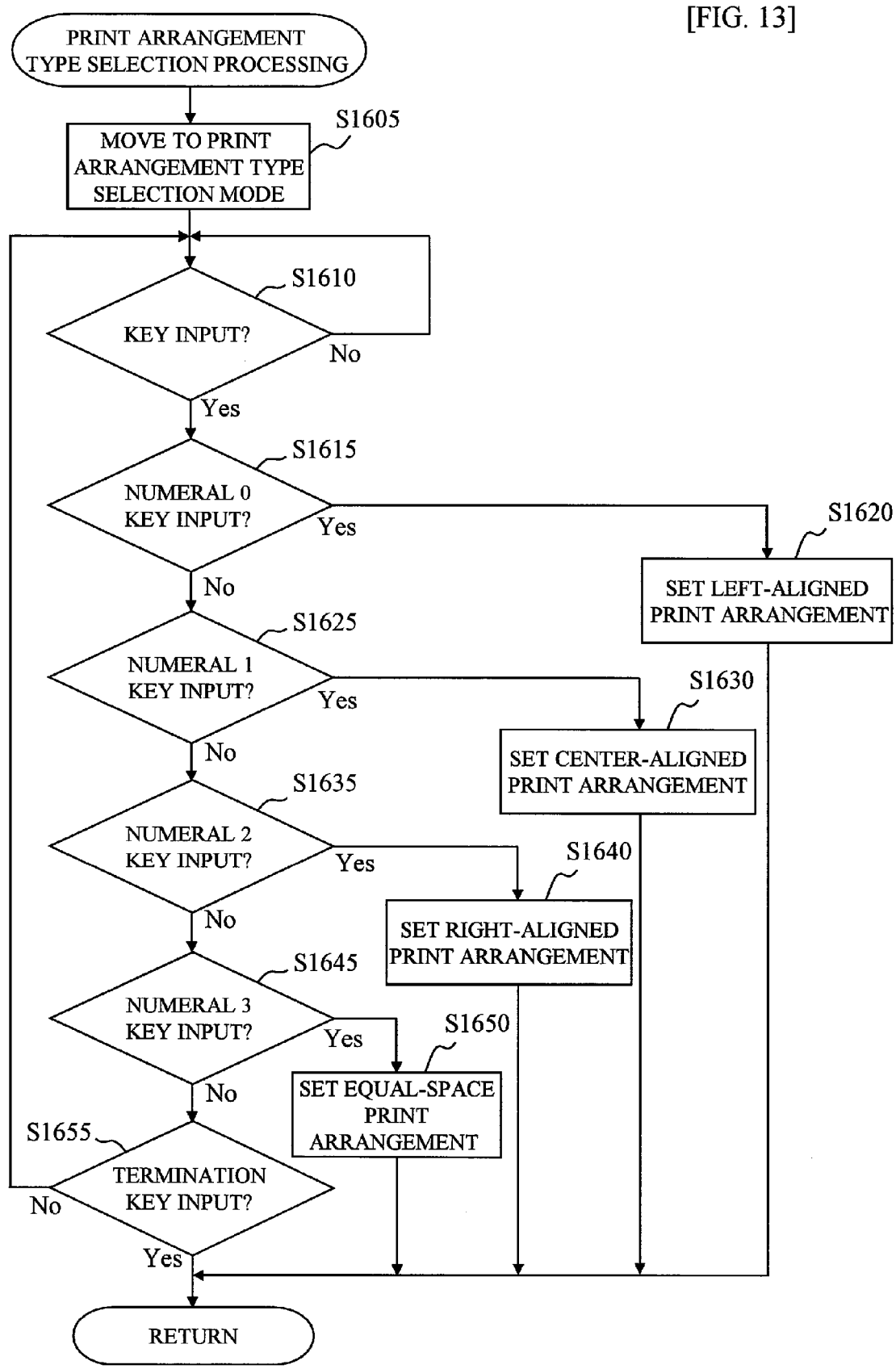

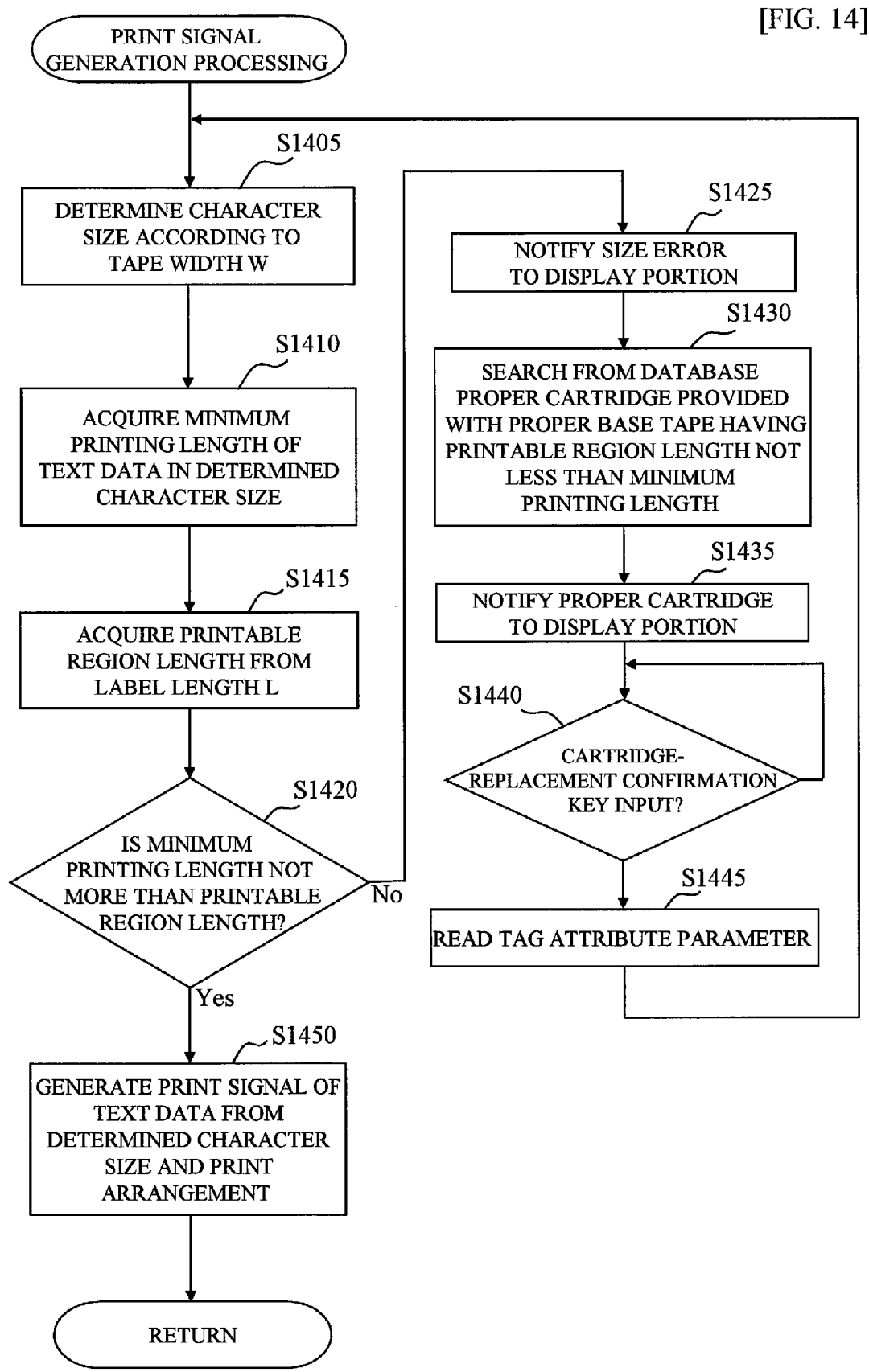
[FIG. 14]

[FIG. 15]
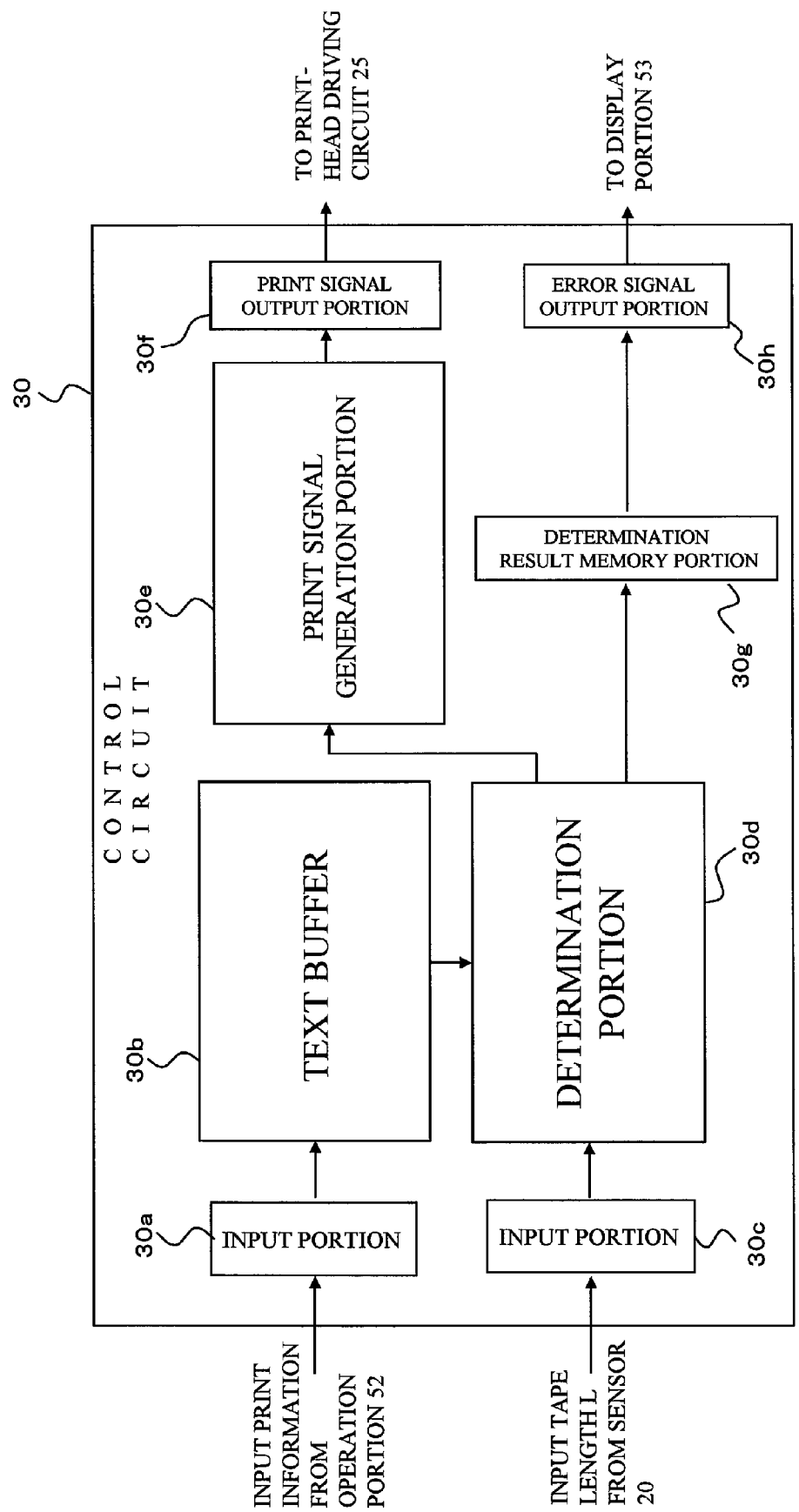

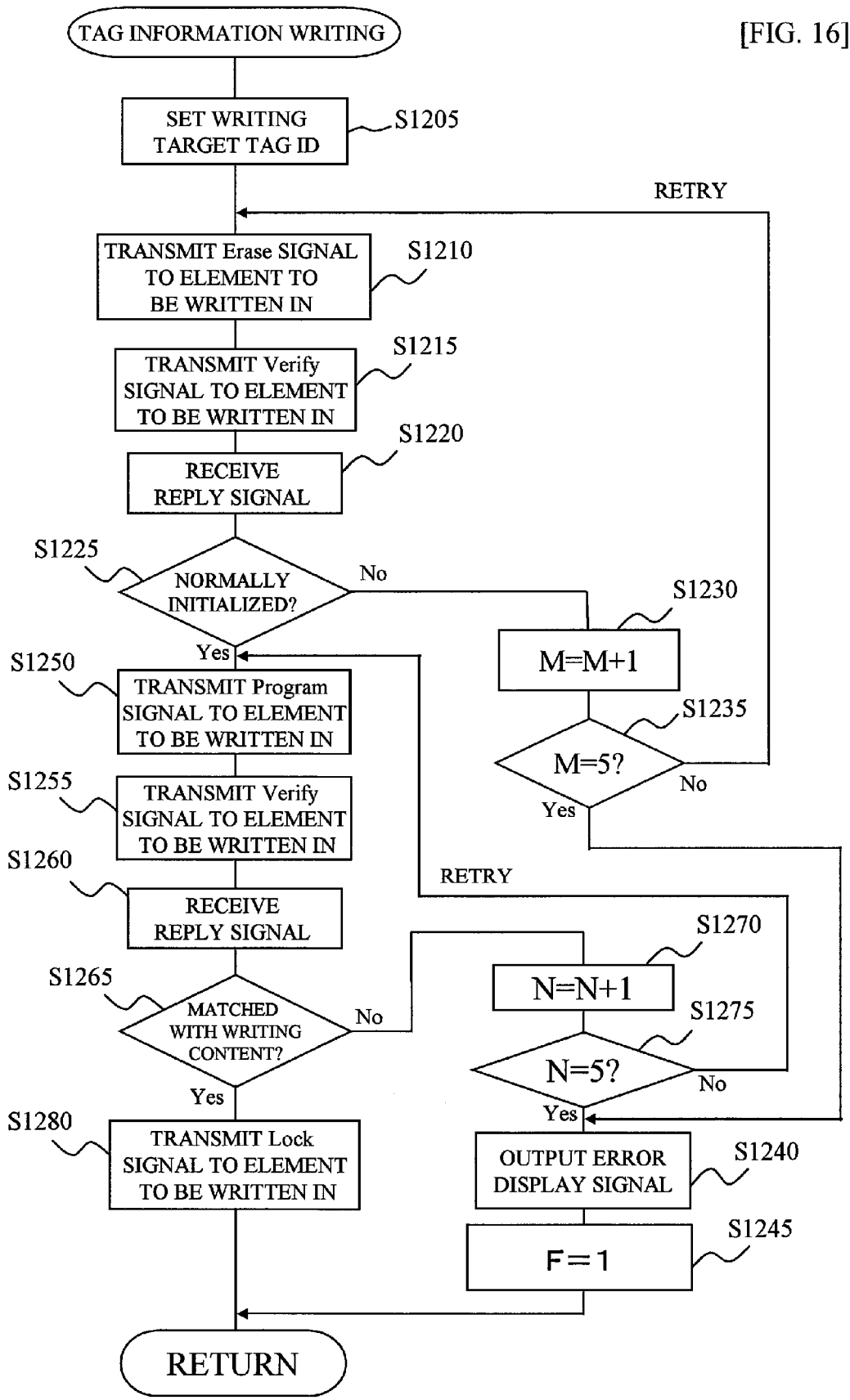
[FIG. 16]

[FIG. 17A]
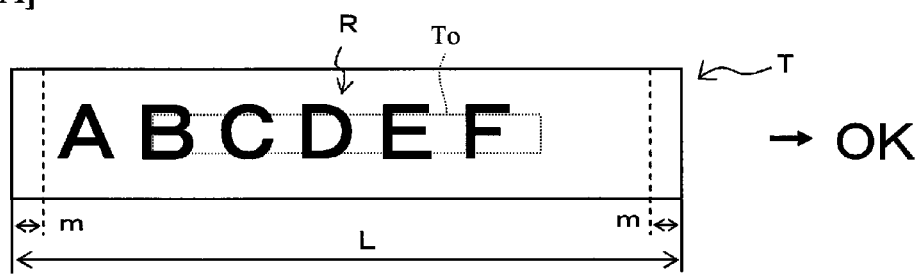
→ OK
[FIG. 17B]
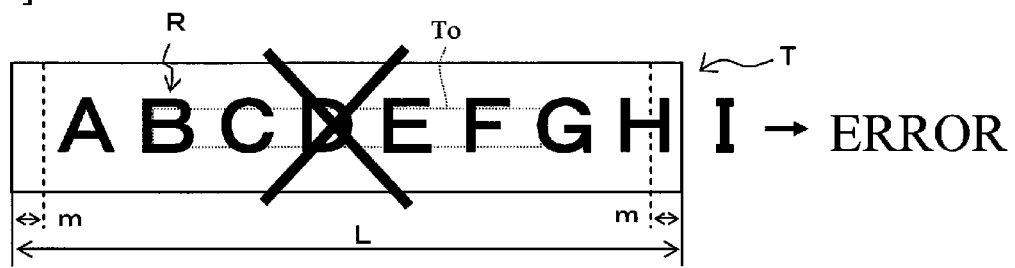
→ ERROR

[FIG. 18]
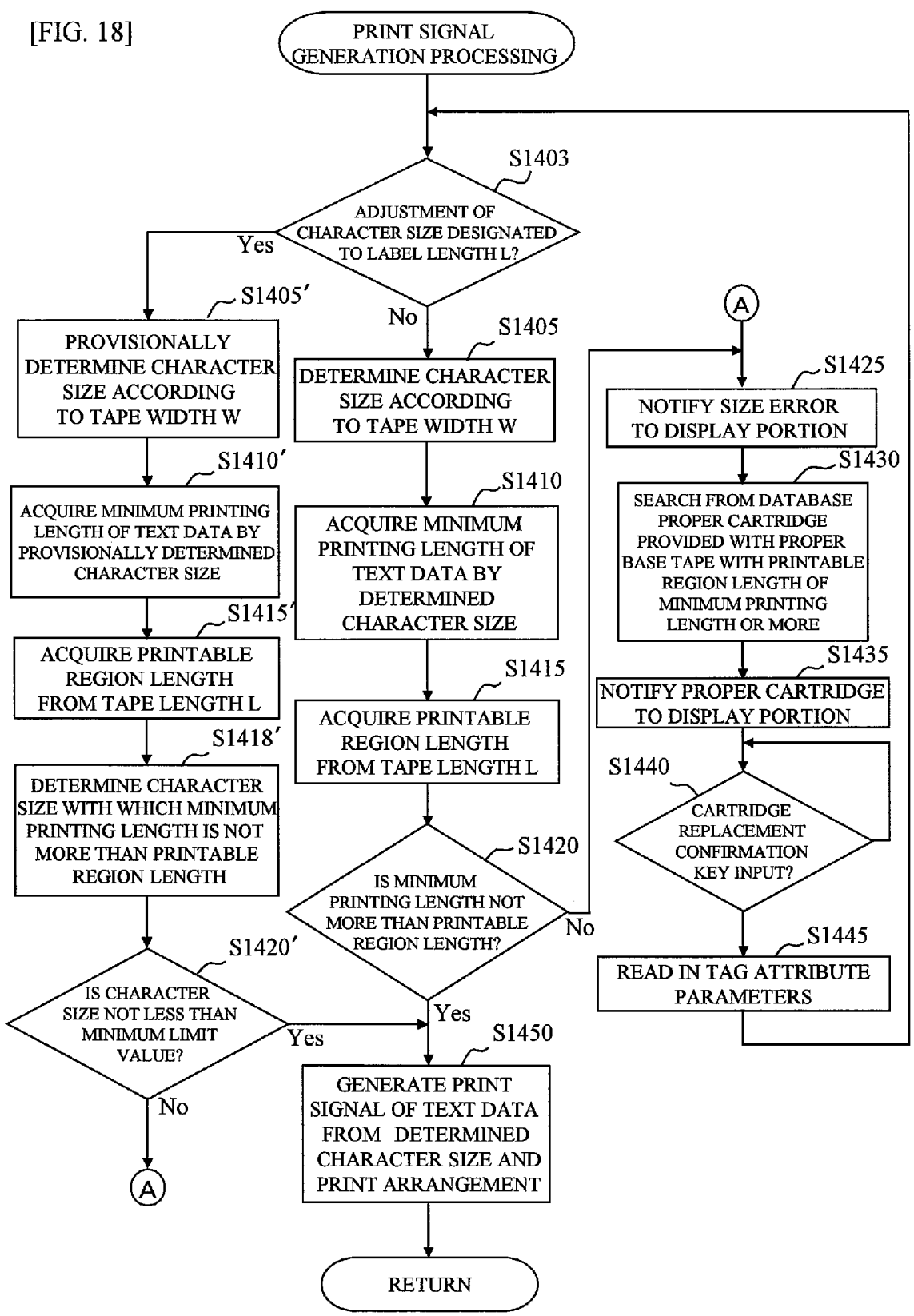

[FIG. 19A]
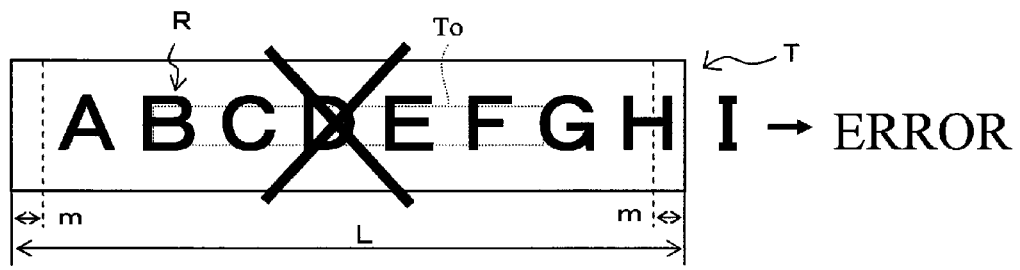
[FIG. 19B]
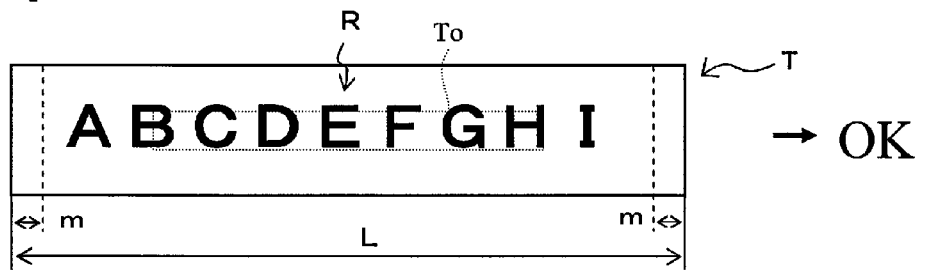

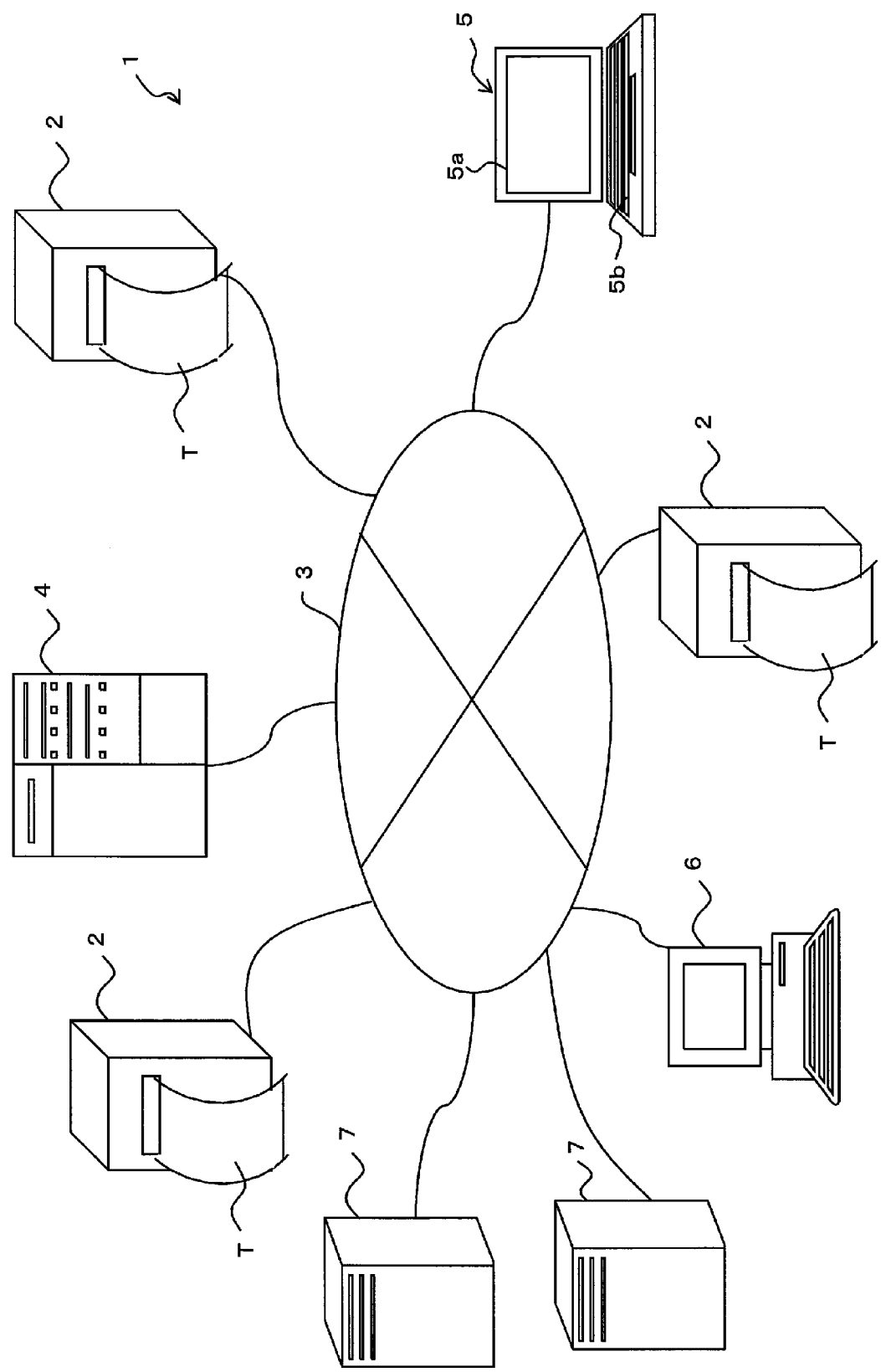
[FIG. 20]

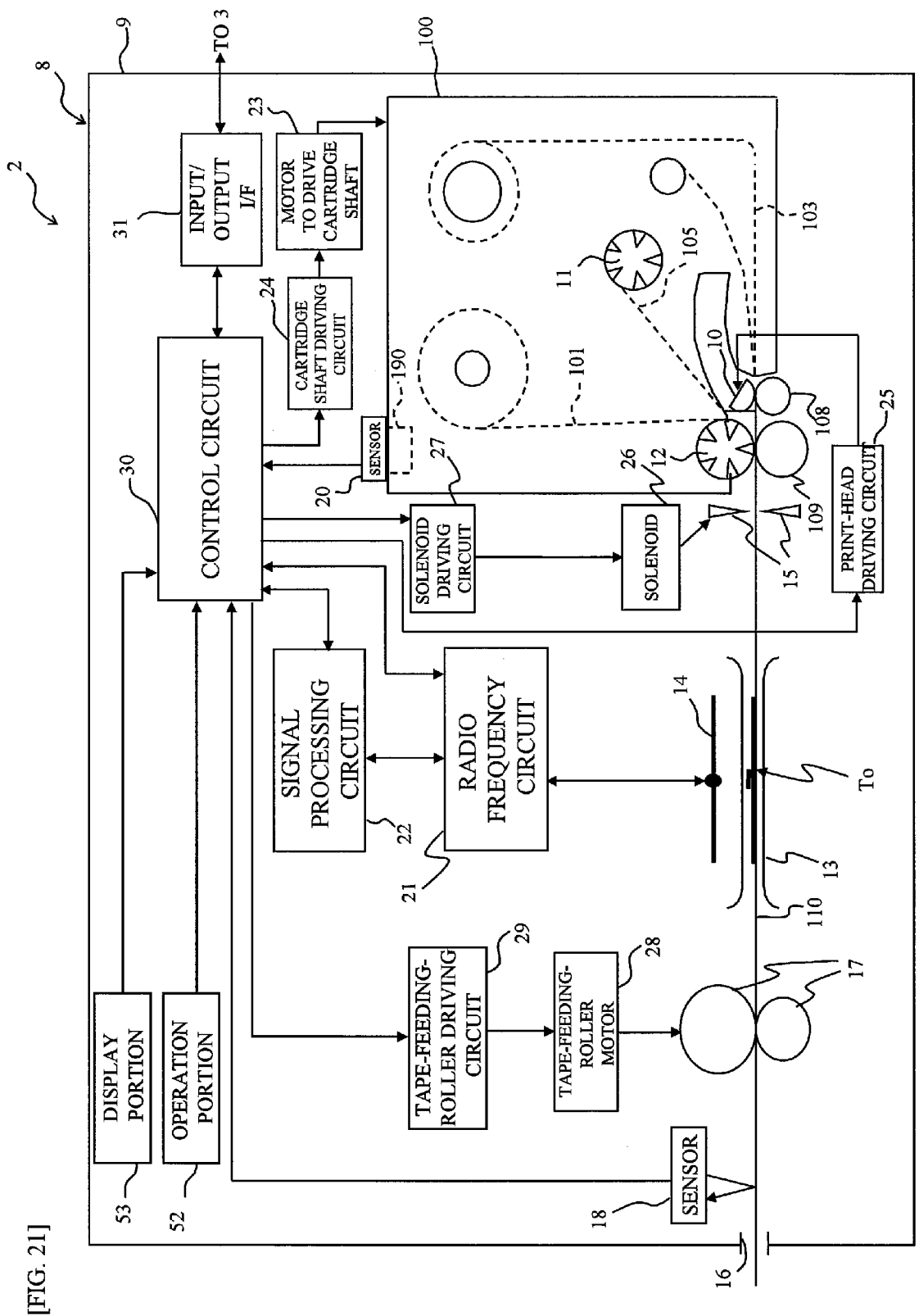
[FIG. 2I]

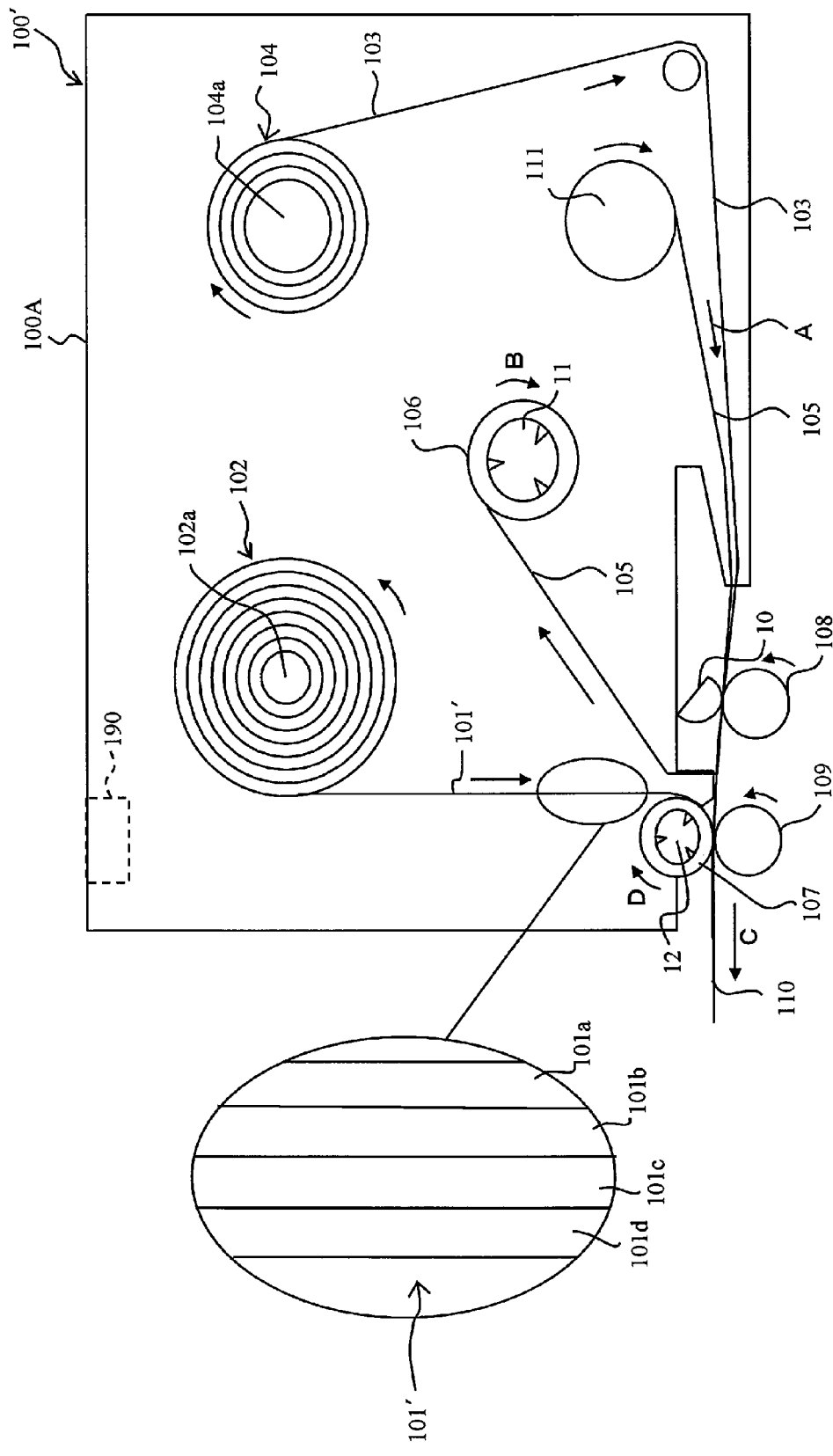
[FIG. 22]

[FIG. 23A]
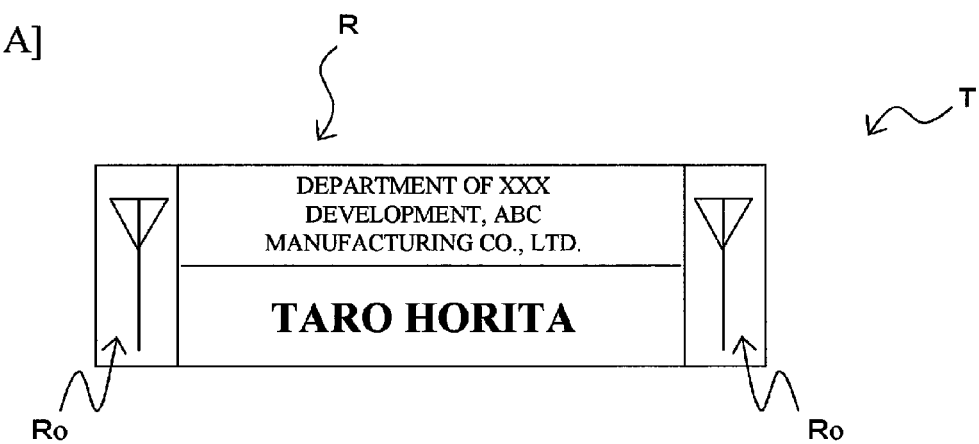
[FIG. 23B]
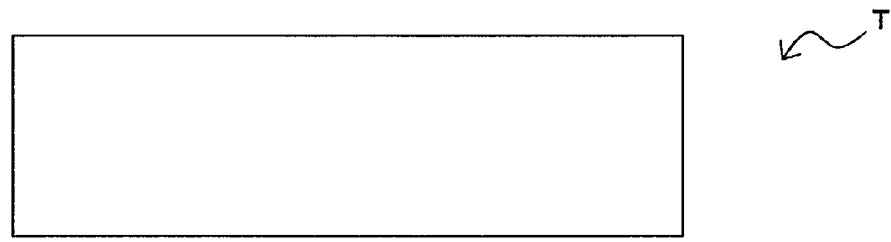

[FIG. 24A]
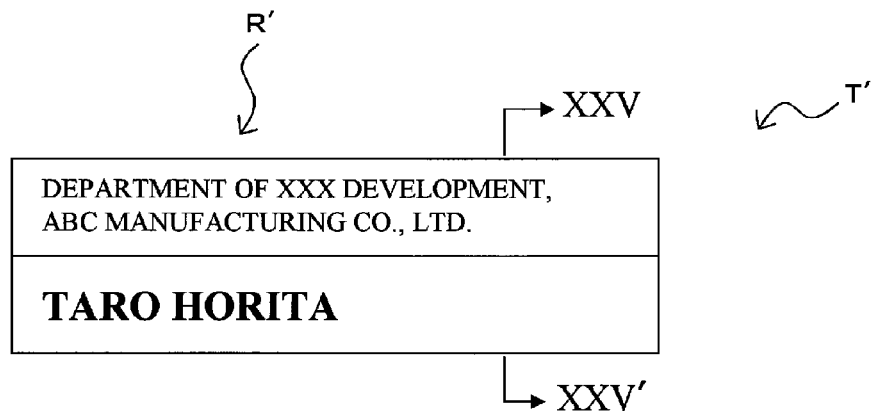
[FIG. 24B]
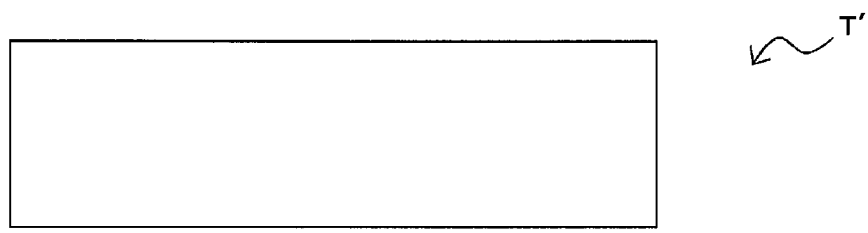
[FIG. 25]
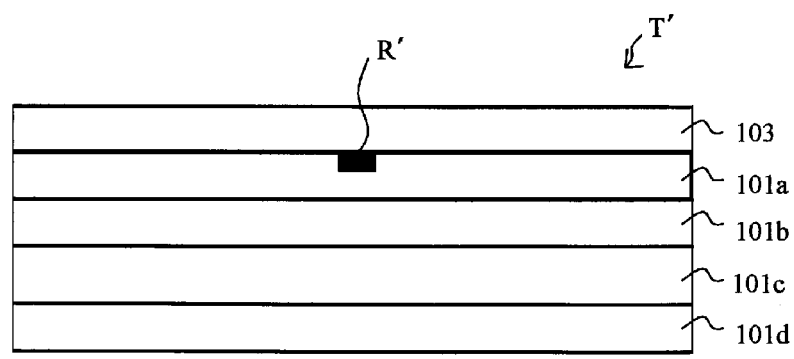

[FIG. 26]
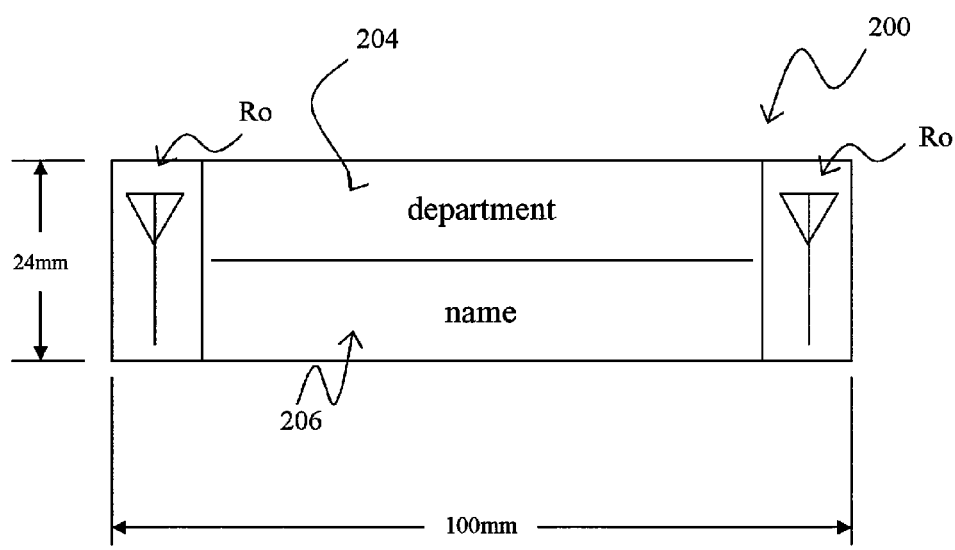
[FIG. 27]
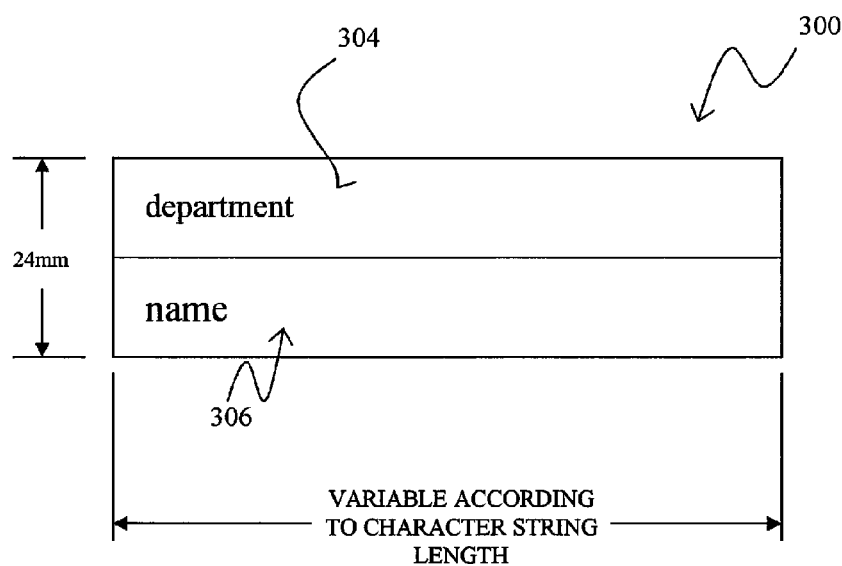

[FIG. 28]
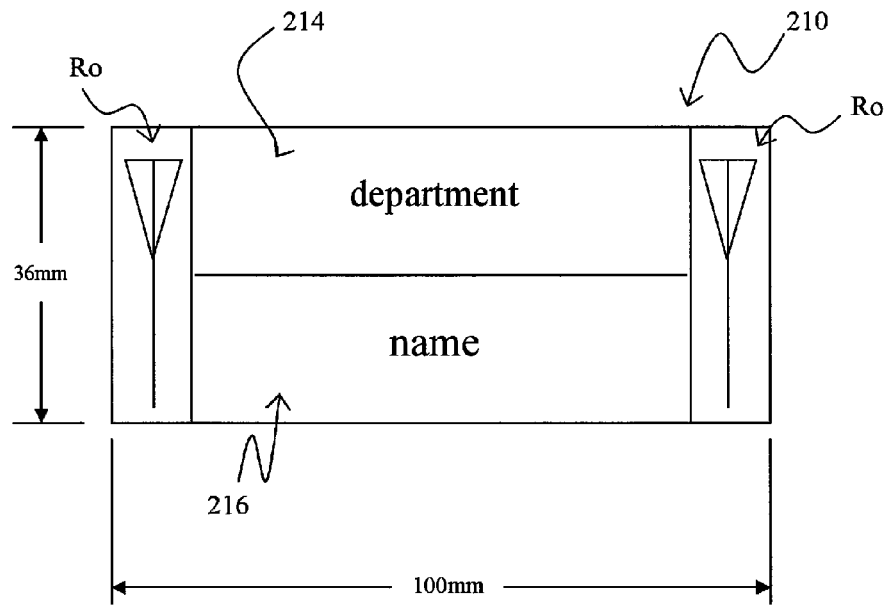
[FIG. 29]
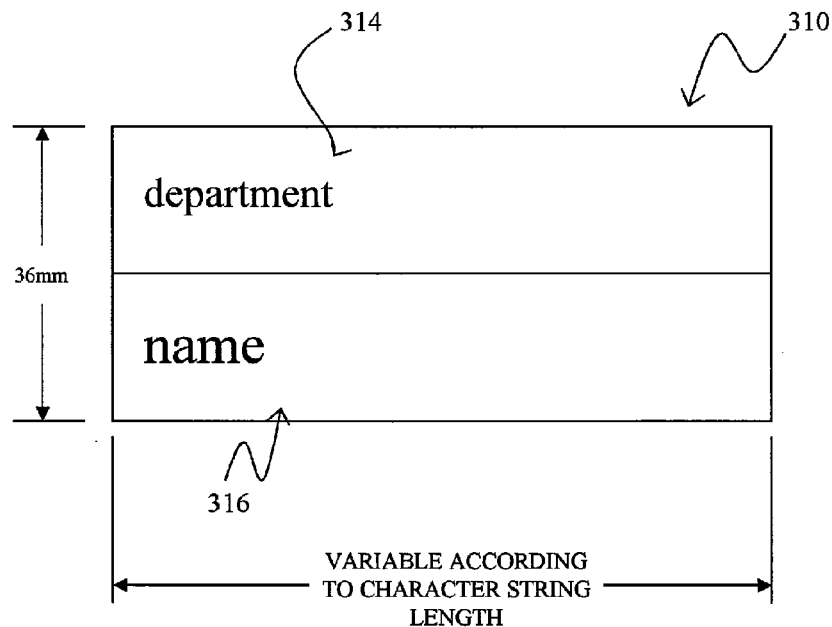

[FIG. 30]

| TEMPLATE SETTING ITEM (SETTING FACTOR GROUP) | TEMPLATE 300 (NO RFID TAG) | TEMPLATE 200 (WITH RFID TAG) |
|---|---|---|
| TAPE WIDTH [mm] | 24mm | |
| LABEL LENGTH [mm] | FREE LENGTH | 100 mm (FIXED) |
| RIGHT AND LEFT MARGIN SIZE [mm] | 5mm | 10mm |
| FONT | GOTHIC | |
| FONT SIZE | 20 | AUTO |
| FONT STYLE | BOLD | |
| VERTICAL TEXT ALIGNMENT | CENTER-ALIGNED | UP-ALIGNED/DOWN-ALIGNED (OPPOSITE TO TAG POSITION) |
| HORIZONTAL TEXT ALIGNMENT | LEFT-ALIGNED | CENTER-ALIGNED |
| CHARACTER CONTROL | FREE LENGTH | FRAME SIZE FIXED |
| TEXT PAINTED | NONE | |
| ENTIRE BACKGROUND | NONE | |
| RFID LABEL MARK | NO | YES |
| ... | | |
| ... | | |

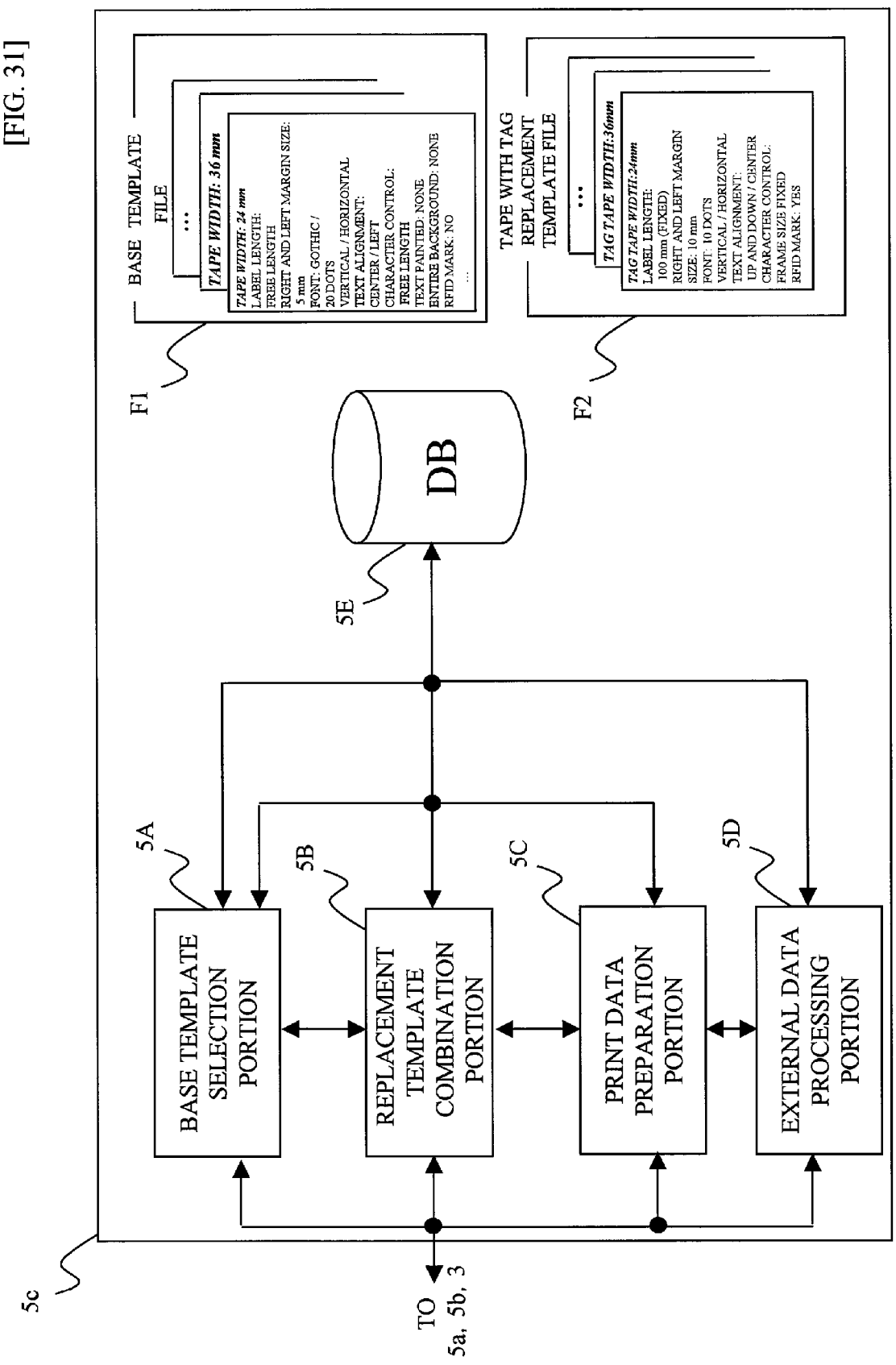
[FIG. 31]

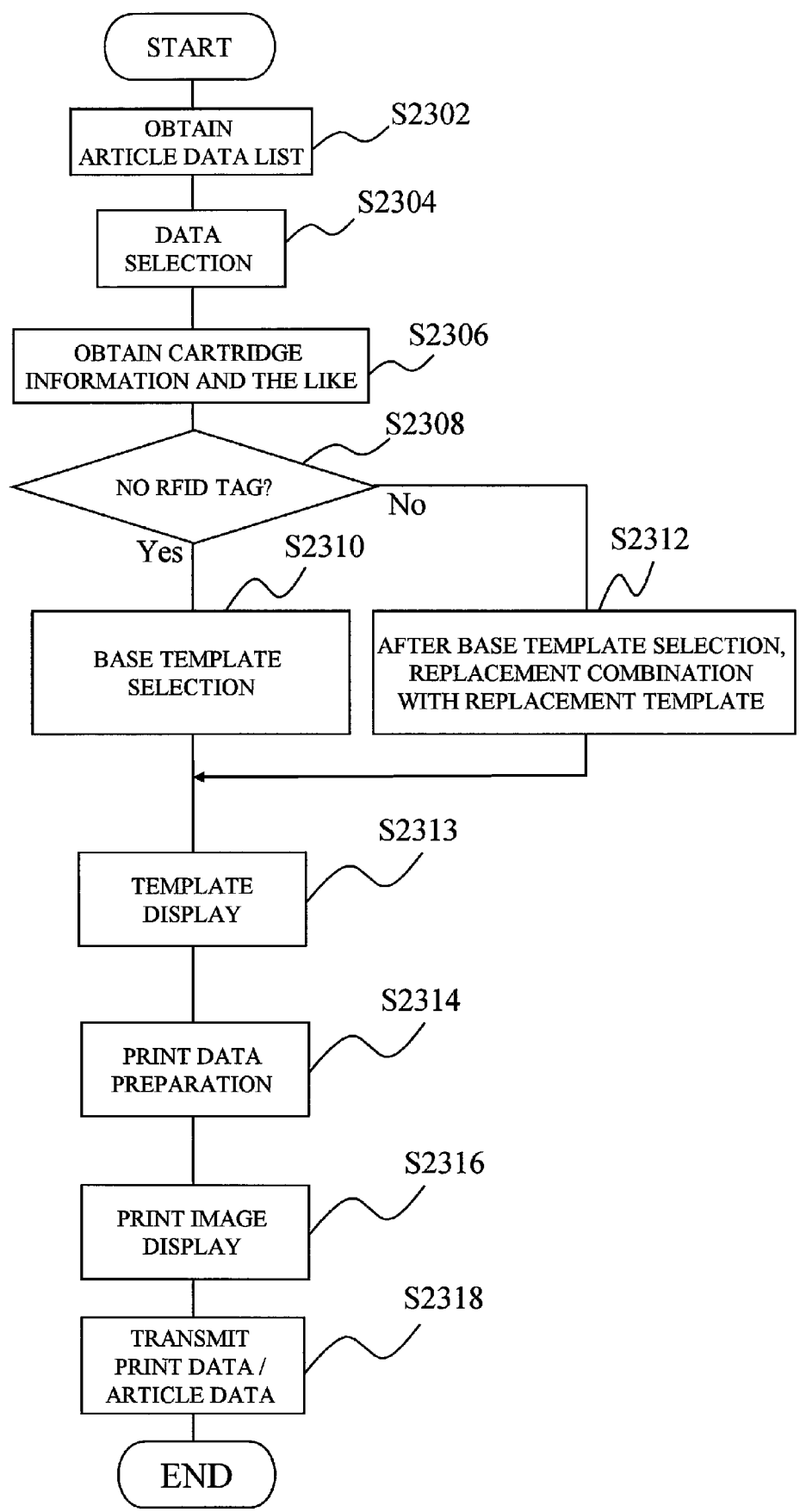

[FIG. 33]
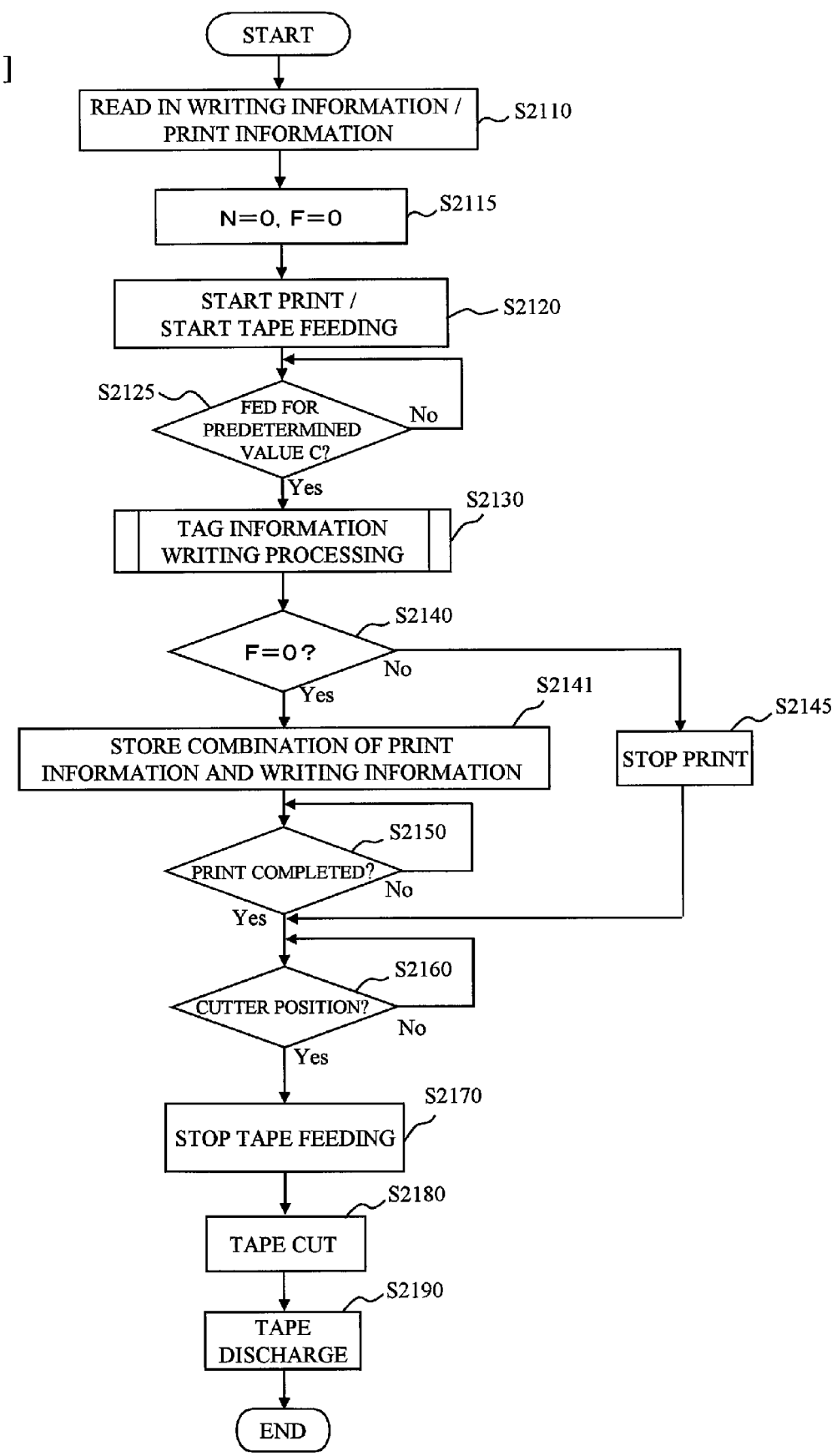

[FIG. 34]
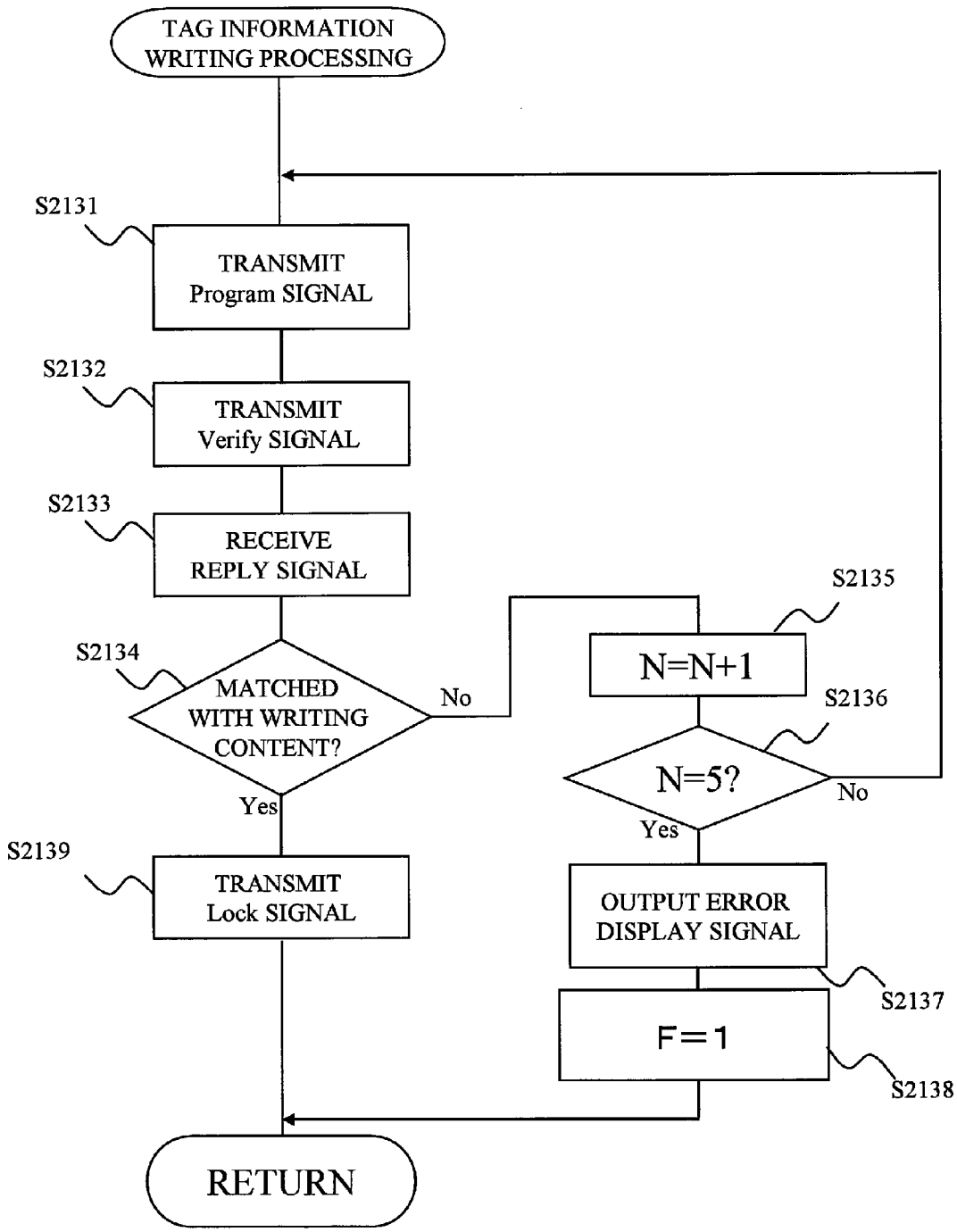

[FIG. 35]
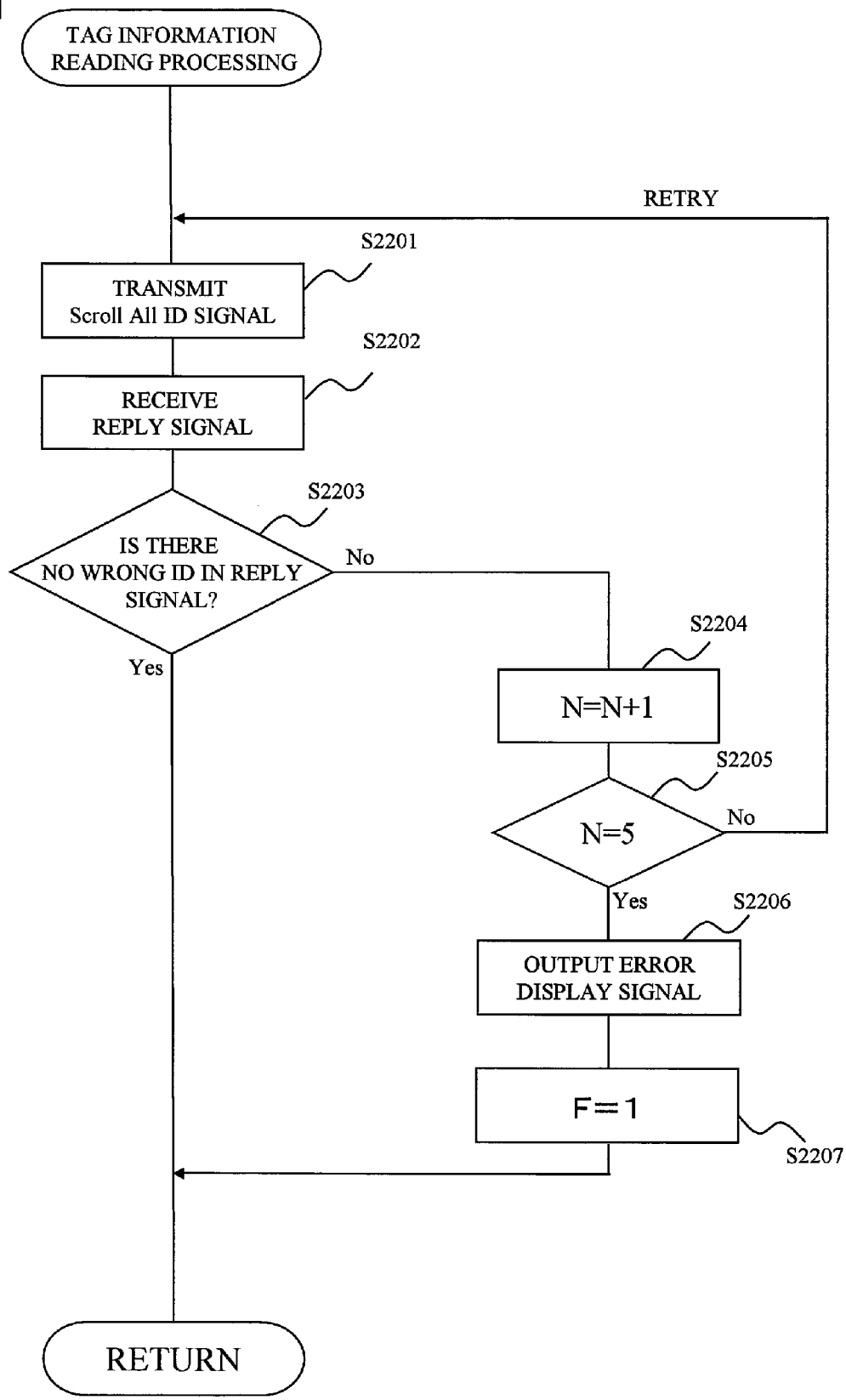

[FIG. 36]
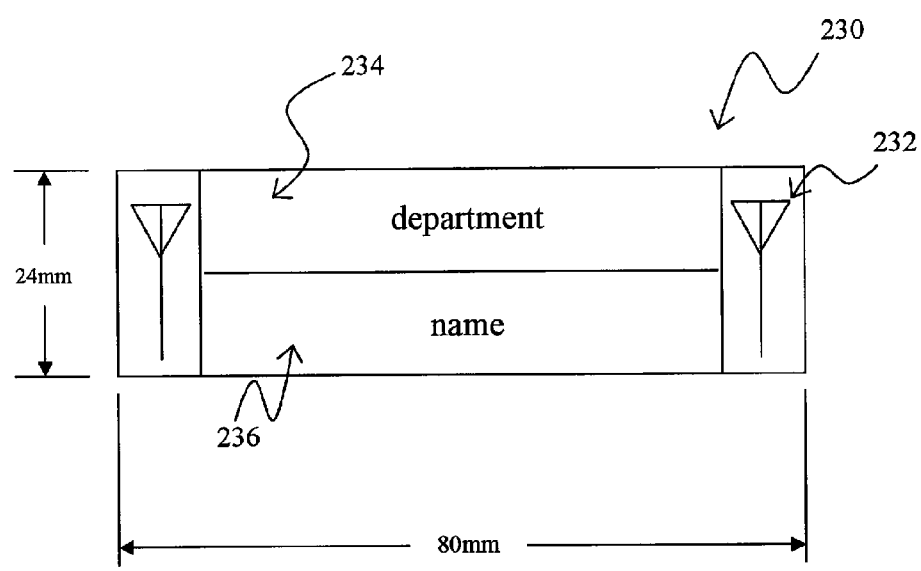

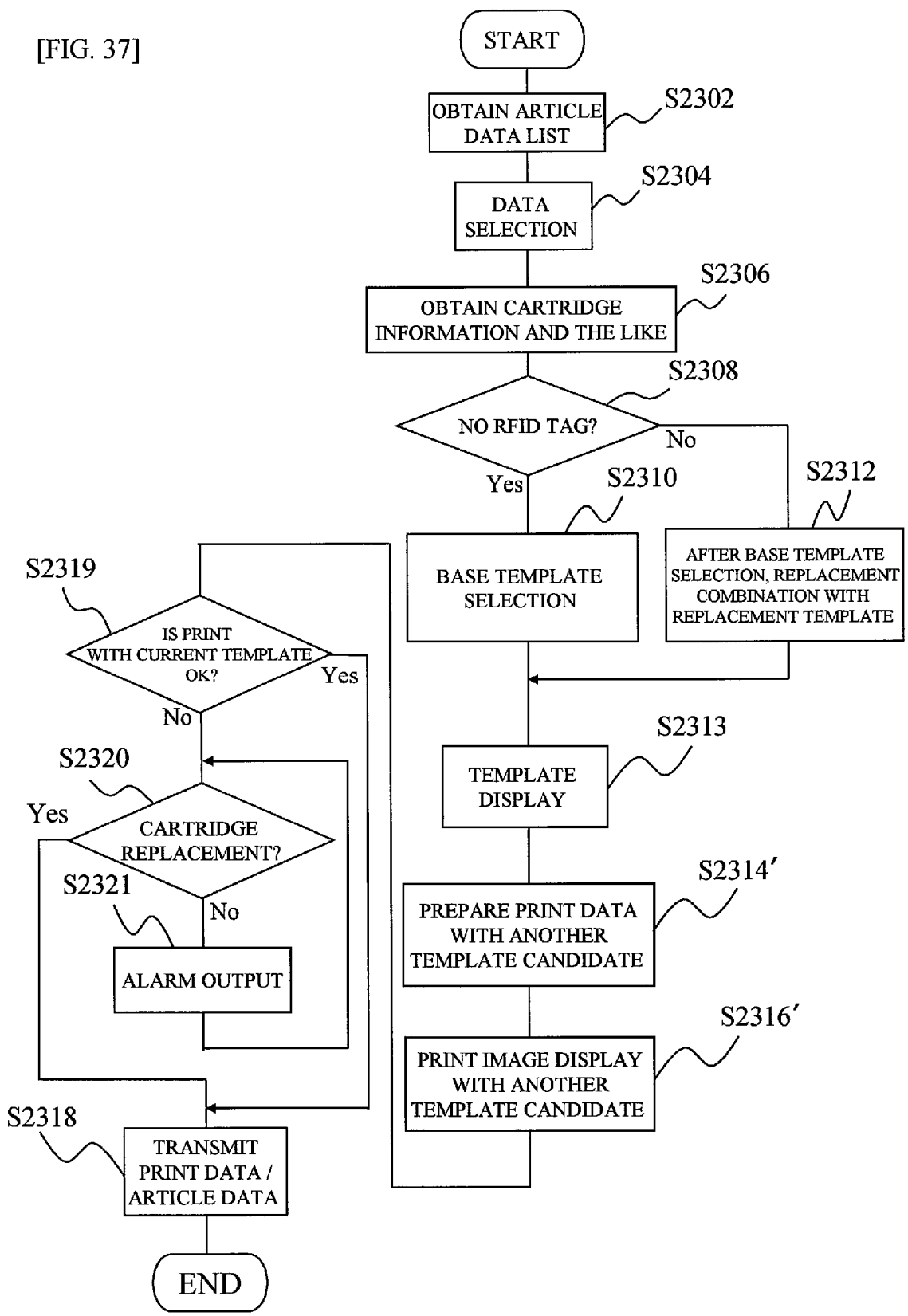
[FIG. 37]

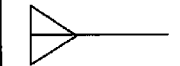
[FIG. 38]

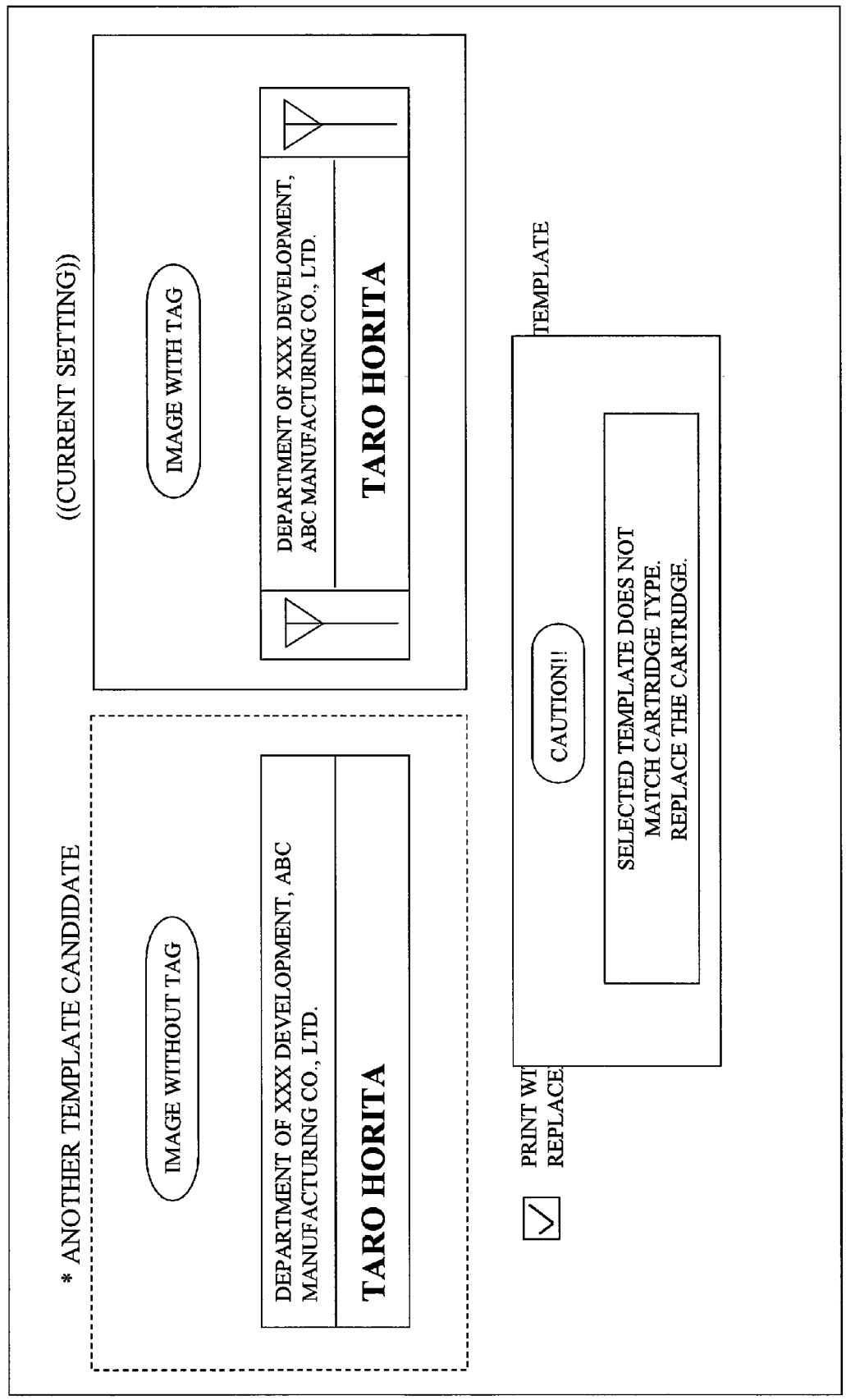

[FIG. 40]
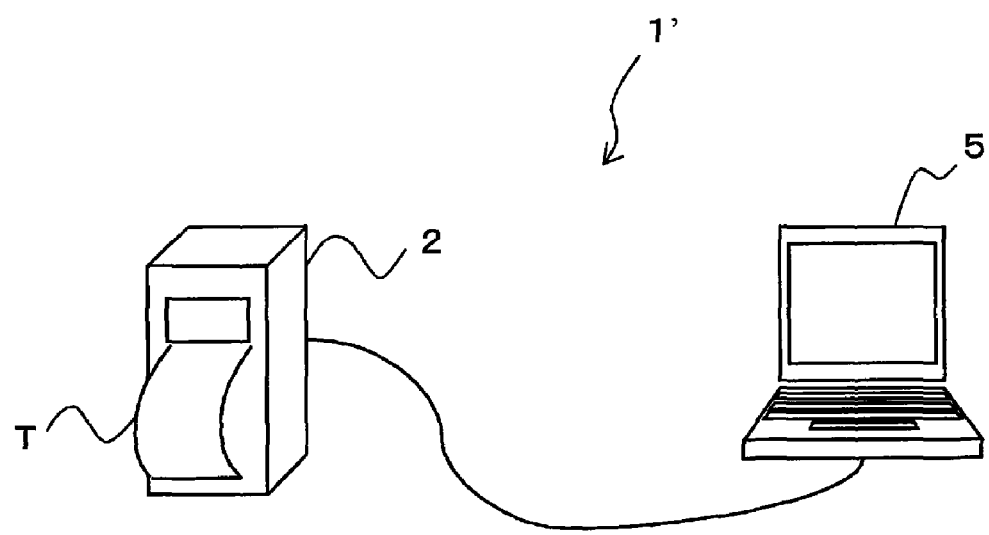

APPARATUS FOR PRODUCING RFID LABEL AND EDITING APPARATUS FOR LABEL

CROSS-REFERENCE TO RELATED APPLICATION

This is a CIP application PCT/JP2006/310139, filed May 22, 2006, which was not published under PCT article 21 (2) in English and claims the benefits of Japanese Patent application No. 2005-149188 filed May 23, 2005 and No. 2005-202581 filed Jul. 12, 2005.

BACKGROUND OF THE INVENTION

1. Field of the Invention

The present invention relates to an apparatus for producing RFID label for producing a RFID label capable of reading or writing through wireless communication from outside and to an editing apparatus for label used when various labels including the RFID label are to be produced.

2. Description of the Related Art

A prior art for improving convenience for operators when a printed matter (document) is to be completed by printing according to a format determined in advance as described in Patent Document 1, for example, is known.

With this prior art, various setting factors relating to print contents are prepared in advance as a single setting-factor group (template) so that a predetermined document can be completed easily only by additionally inputting text data (sentences and the like) to the template.

On the other hand, RFID (Radio Frequency Identification) systems for reading/writing information contactlessly between a small-sized RFID tag and a reader (reading device)/writer (writing device) have been proposed recently. A RFID circuit element provided at a RFID tag is provided with an IC circuit part storing predetermined RFID tag information and an antenna connected to the IC circuit part for transmission/reception of information, and even if the RFID tag is stained or arranged at a hidden position, an access (information reading/writing) to the RFID tag information of the IC circuit part from the reader/writer is possible, and the systems are being put into practical use in various fields such as a name tag to be worn on the chest of a person, asset management, document control at an office or the like.

The RFID tag with the above various applications is usually formed by providing the above RFID circuit element on a label-state material, and this RFID label is affixed to an object article for classification/organization of various documents/articles, for example, in many cases. At this time, if the information relating to the RFID tag information is printed on the label separately from the RFID tag information stored inside, users can visually recognize the related information on the label, which is convenient.

Technologies for producing such a RFID label with print include one described in Patent Document 2, for example. In this prior-art apparatus for producing RFID label, a cartridge for including at least a RFID tag (cartridge) provided with a roll (supply spool) around which a tape (band-state tape) having RFID circuit elements (antenna parts and IC chips) arranged in a tape longitudinal direction with substantially an equal interval is wound is attached, the above tape is fed out of the above roll of this cartridge for transmission/reception of RFID tag information to the RFID circuit element provided at the tape, and predetermined print is applied at a predetermined position on the tape so as to produce a RFID label with print.

[Patent Document 1] JP, A, 9-231205
[Patent Document 2] JP, A, 2004-330492

Recently, with expansion of use of a RFID tag, diversified applications are in demand and there is an emerging need to produce labels with varied print modes in many ways. Here, if RFID circuit elements are arranged substantially with an equal interval on a tape as mentioned above, the maximum length of a label is limited by the arrangement interval (pitch). As mentioned above, with the prior art described in Patent Document 2, since the cartridge for including at least a RFID tag provided with a roll around which a tape with the RFIC circuit elements arranged is wound is detachable, if the number of printed characters is to be relatively large, for example, (in order to prevent such a situation that all the characters can not be contained in the label length) the cartridge for including at least a RFID tag provided with a tape with a larger arrangement pitch of the RFID circuit elements is attached for RFID label production. On the other hand, if the number of characters is not so large (in order to prevent production of wastefully long labels), the cartridge for including at least a RFID tag provided with a tape with a usual size of arrangement pitch of the RFID circuit elements is attached for RFID label production.

As mentioned above, in the prior art described in Patent Document 2, by replacing a plurality of cartridges for including at least a RFID tag for use according to the number of printed characters, the need for varied print modes by operators can be satisfied. However, when the cartridge for including at least a RFID tag which is replaced according the number of printed characters in this way is selected, if an operator selects a wrong cartridge for including at least a RFID tag unsuitable for the print mode, there is a fear that the print is interrupted in the middle or the print is divided by the RFID circuit element interval.

Also, other than the RFID circuit element, if the tape width is different according to type of the cartridge for including at least a RFID tag, for example, there is also a fear of the same problem due to a wrong selection. Moreover, when tag labels for near-field communication and far-field communication are to be produced separately with different set values of communication sensitivities of the IC circuit part and the antenna of the RFID circuit element and memory capacity of the IC circuit part, even if corresponding print is applied to produce a tag label with print, wrong selection of the corresponding cartridge for including at least a RFID tag causes mismatch between the print and the communication sensitivity or memory capacity of the IC circuit part, and there is a fear that satisfactory performance and quality for the operator can not be obtained.

Furthermore, not limited to tag attribute parameters such as the RFID circuit element arrangement interval, tape width, communication sensitivity, IC circuit part memory capacity and the like but also with regard to communication parameters such as a frequency of an electric wave and communication protocol used for the wireless communication, wrong selection of the corresponding cartridge for including at least a RFID tag also causes mismatch between the print and the communication parameters, which should have been matched, and there is a fear that satisfactory performance and quality for the operator can not be obtained.

On the other hand, in the case of predetermined print on the tag tape as mentioned above, it is necessary for an operator to operate and input the print contents on the print format. Then, at the print data input in the RFID label production, the method of the prior art described in Patent Document 1 is applied and various setting factors relating to the print contents are prepared in advance as a single setting-factor group (template) and by additionally inputting text data (words, sentences and the like) to the template, the print contents on the tag tape can be determined.

Here, needs for the RFID label in diversified modes have been increased in the recent years, but if the width or the length of the RFID label to be produced is to be changed, for example, it is necessary to replace the tag tape together with the entire cartridge for including at least a RFID tag every time.

When the prior art described in Patent Document 1 is applied to the apparatus for producing RFID label as mentioned above, even though a single type of RFID label with print can be produced by using the template so as to realize the optimal print mode, when the cartridge for including at least a RFID tag is replaced in order to produce various RFID labels with print as mentioned above, the template can not fully cope with the situation. That is, in order to realize the optimal print, complicated setting and operation are required at every replacement of the cartridge for including at least a RFID tag, and convenience for operators is low.

The problem is not limited to the case where various cartridges for including at least a RFID tag are replaced as above. That is, in production of a normal print label not provided with the RFID circuit element, even if various label tapes can be replaced and attached by the cartridge (normal cartridge) in order to change the width, length and the like, and moreover, even if the cartridge for including at least a RFID tag and the normal cartridge are switched and attached so that the RFID label and the normal print label can be produced, there is a nonconformity similar to the above, and convenience for operators is low.

As mentioned above, in the prior art described in patent Documents 1 and 2, when various labels are to be produced by replacing the tape or cartridge, there can be mismatch in combination of the replaced tape or cartridge with the print or complicated setting and operation are required in order to prevent the mismatch, and convenience for operators is low.

SUMMARY OF THE INVENTION

A first object of the present invention is to provide an apparatus for producing RFID label and an editing apparatus for label which can easily prevent mismatch with print and can improve convenience for operators even when a label is to be produced by replacing a tape or a cartridge.

A second object of the present invention is to provide an apparatus for producing RFID label which can prevent production of a RFID label with insufficient performance or quality due to mismatch based on a wrong selection by an operator and can improve convenience for operators.

A third object of the present invention is to provide an apparatus for producing RFID label and an editing apparatus for label which can easily apply the optimal print corresponding to various modes of label without complicated setting operation and can improve convenience for operators.

BRIEF DESCRIPTION OF THE DRAWING

FIG. 1 is a conceptual diagram illustrating a detailed structure of an apparatus for producing RFID label of a first embodiment of the present invention.

FIG. 2 is an explanatory diagram for illustrating a detailed structure of a cartridge.

FIG. 3 is a functional block diagram illustrating a detailed function of a radio frequency circuit.

FIG. 4 is an explanatory diagram illustrating an example of a configuration of a sensor for detecting parameter data of the cartridge.

FIG. 5 is a functional block diagram illustrating a functional configuration of a RFID circuit element.

FIGS. 6A and 6B are a top view and a bottom view illustrating an example of an appearance of a RFID label.

FIG. 7 is a cross-sectional view by VII-VII' section in FIG. 6A.

FIGS. 8A to 8D are views illustrating examples of an appearance of the RFID label produced by printing with different print layouts from the same cartridge.

FIG. 9 is a view illustrating an example of a screen displayed on a display portion upon an access of RFID tag information.

FIG. 10 is a flowchart illustrating a control procedure executed by a control circuit at production of the RFID label.

FIG. 11 is a flowchart illustrating a detailed procedure of Step S1300 in FIG. 10.

FIG. 12 is a flowchart illustrating a detailed procedure of Step S1500 in FIG. 11.

FIG. 13 is a flowchart illustrating a detailed procedure of Step S1600 in FIG. 11.

FIG. 14 is a flowchart illustrating a detailed procedure of Step S1400 in FIG. 10.

FIG. 15 is a functional block diagram extracting and showing a portion relating to determination made at Step S1400 in FIG. 10 among the functions of the control circuit.

FIG. 16 is a flowchart illustrating a detailed procedure of Step S1200 in FIG. 10.

FIGS. 17A and 17B are views illustrating each example determined as matching and mismatching between text data and a tag attribute parameter by the apparatus for producing RFID label of the first embodiment of the present invention by way of an appearance of the RFID label.

FIG. 18 is a flowchart illustrating a detailed procedure of print signal generation processing in FIG. 14 executed by a control circuit of a variation carried out by switching a normal mode with a matching control mode.

FIGS. 19A and 19B are views illustrating an appearance of the RFID label in a case where it is determined as mismatch in the normal mode and a case matched in the matching control mode in a variation carried out by switching between the normal mode and the matching control mode.

FIG. 20 is a system configuration diagram illustrating a RFID tag manufacturing system to which an apparatus for producing a RFID label of a second embodiment of the present invention is applied.

FIG. 21 is a conceptual block diagram illustrating a detailed structure of the apparatus for producing a RFID label.

FIG. 22 is an explanatory view for illustrating a detailed structure of a cartridge not provided with the RFID circuit element.

FIGS. 23A and 23B are a top view and a bottom view illustrating an example of an appearance of the RFID label.

FIGS. 24A and 24B are a top view and a bottom view illustrating an example of an appearance of a label not provided with the RFID circuit element.

FIG. 25 is a cross-sectional view by XXV-XXV' section in FIG. 24A.

FIG. 26 is a view illustrating an example of a template for print displayed on a display when a cartridge provided with a base tape including a RFID circuit element is attached to a cartridge holder portion.

FIG. 27 is a view illustrating an example of a template for print displayed on a display when a cartridge provided with a base tape not including a RFID circuit element is attached to a cartridge holder portion.

FIG. 28 is a view illustrating another example of a template for print displayed on a display when a cartridge provided with a base tape including a RFID circuit element is attached to a cartridge holder portion.

FIG. 29 is a view illustrating another example of a template for print displayed on a display when a cartridge provided with a base tape not including a RFID circuit element is attached to a cartridge holder portion.

FIG. 30 is an explanatory diagram illustrating a list of examples of various setting items relating to print in a template displayed on a display of a terminal and the respective set values/setting modes.

FIG. 31 is a functional block diagram illustrating a function of a CPU of the terminal.

FIG. 32 is a flowchart illustrating a control procedure executed by the CPU of the terminal.

FIG. 33 is a flowchart illustrating a control procedure executed by the control circuit of the apparatus for producing RFID label.

FIG. 34 is a flowchart illustrating a detailed procedure of Step S2130 shown in FIG. 33.

FIG. 35 is a flowchart illustrating a detailed procedure of RFID tag reading processing when a RFID label is produced by reading RFID tag information from a RFID circuit element and applying print corresponding to that.

FIG. 36 is a view illustrating an example of a template setting the tape length as different fixed lengths.

FIG. 37 is a flowchart illustrating a control procedure executed by the CPU of the terminal in a variation displaying a list of print images by a plurality of templates.

FIG. 38 is a view illustrating an example of a comparison list display on the display.

FIG. 39 is a view illustrating an example of an alarm display on the display.

FIG. 40 is a view illustrating a variation in which the apparatus for producing RFID label and the terminal are connected by a local network.

DETAILED DESCRIPTION OF THE PREFERRED EMBODIMENTS

Embodiments of the present invention will be described below referring to the attached drawings.

A first embodiment of the present invention will be described referring to FIGS. 1 to 19.

FIG. 1 is a conceptual block diagram illustrating a detailed structure of an apparatus 2 for producing RFID label of this embodiment.

In FIG. 1, at a main body 8 of the apparatus 2 for producing RFID label, a cartridge holder portion (holder for installing a tag tape, holder for installing a tape, roll holder for a tag tape. Not shown) as a recess portion is provided, and in this holder portion, a cartridge 100 (cartridge for including at least a RFID tag) is detachably attached.

The main body 8 has a housing 9 provided with the cartridge holder portion to which the cartridge 100 is fitted and constituting a profile, a print head (thermal head) 10 as a printing device for applying a predetermined print (printing) on a cover film 103 (print-receiving tape), a ribbon take-up roller driving shaft 11 for driving an ink ribbon 105 having finished print on the cover film 103, a tape-feeding-roller driving shaft (driving device) 12 for bonding the cover film 103 and a base tape 101 together and feeding it as a tag label tape 110 with print from the cartridge 100, an antenna (device antenna) 14 for transmission/reception of a signal by wireless communication using a radio frequency such as an UHF band with a RFID circuit element To (details will be described later) provided at the tag label tape 110 with print, a cutter 15 for cutting the tag label tape 110 with print to a predetermined length at predetermined timing and generating a label-state RFID label T (details will be described later), a pair of feeding guides 13 for setting and holding the RFID circuit element To at a predetermined access area opposed to the antenna 14 at transmission/reception of the signal by the wireless communication and guiding the tape 110 (=RFID label T) after cutting, a feeding roller 17 for feeding and sending the guided RFID label T to a carry-out exit 16, and a tape end sensor 18 for detecting presence of the RFID label T at the carry-out exit 16.

Also, the main body 8 has a radio frequency circuit 21 for accessing (for writing or reading) the RFID circuit element To via the antenna 14, a signal processing circuit 22 for processing signals read out from the RFID circuit element To, a motor 23 to drive cartridge shaft for driving the ribbon take-up roller driving shaft 11 and the feeding roller driving shaft 12, a cartridge shaft driving circuit 24 for controlling the driving of the motor 23 to drive cartridge shaft, a print-head driving circuit 25 for controlling electricity to the print head 10, a solenoid 26 for driving the cutter 15 for a cutting operation, a solenoid driving circuit 27 for controlling the solenoid 26, a tape-feeding-roller motor 28 for driving the feeding roller 17, a tape-feeding-roller driving circuit 29 for controlling the tape-feeding-roller motor 28, a sensor (detecting device for a cartridge identifier) 20 for detecting an irregular shape of each of a plurality of identifiers provided at a portion 190 to be detected (details will be described later) provided at the cartridge 100, database (DB) 51 made of a non-volatile storage device storing various types of information such as correspondence between various types of tag parameter information (details will be described later) relating to the RFID circuit element To detected by the sensor 20 and the types of the cartridge 100 and addresses of article information, an operation portion 52 made of a plurality of character input keys and various function keys into which character data and instruction data relating to print can be input by an operator, a display portion 53 which can display the character data and instruction data input from the operation portion 52 or a notification signal (the detail will be described later) to the operator, and a control circuit 30 for controlling the entire operation of the apparatus 2 for producing RFID label via the radio frequency circuit 21, the signal processing circuit 22, the cartridge shaft driving circuit 24, the print-head driving circuit 25, the solenoid driving circuit 27, the tape-feeding-roller driving circuit 29 and the like.

The control circuit 30 is a so-called microcomputer. Though detailed description will be omitted, the control circuit 30 comprises a CPU, which is a central processing device, ROM, RAM and the like, and executes signal processing according to a program stored in the ROM in advance using the temporary storage function provided by the RAM.

FIG. 2 is an explanatory view for illustrating a detailed structure of the cartridge 100.

In FIG. 2, the cartridge 100 comprises a housing 100A, a first roll (roll of tape with RFID tag) 102 disposed within the housing 100A and around which the band-state base tape (tag tape) 101 is wound, a second roll 104 around which the transparent cover film 103 with the substantially same width as the base tape 101 is wound, a ribbon-supply-side roll 111 for feeding the ink ribbon 105 (thermal transfer ribbon, however, it is not needed when the cover film is a thermal tape), the ribbon take-up roller 106 for taking up the ribbon 105 after printing, and a tape feeding roller 107 for pressing and bonding the base tape 101 and the cover film 103 to each other so as to form the tag label tape 110 with print while feeding it in the direction of the arrow A (=also functioning as the feeding roller).

The first roll 102 has the base tape 101 in which a plurality of RFID circuit elements To is sequentially formed with a predetermined equal interval in the longitudinal direction wound around a reel member 102*a*.

The base tape 101 is basically in a four-layered structure (excluding the RFID circuit element and its vicinity) in this example (See partially enlarged view in FIG. 2) and is constructed in lamination in the order of an adhesive layer 101*a* made of an appropriate adhesive, a colored base film 101*b* made of polyethylene terephthalate (PET) and the like, an adhesive layer 101*c* made of an appropriate adhesive, and a separation sheet 101*d* from the side wound inside (right side in FIG. 2) toward the opposite side (left side in FIG. 2).

On the back side of the base film 101*b* (left side in FIG. 2), the antenna (tag antenna) 152 for transmission/reception of information is provided integrally in this embodiment, the IC circuit part 151 connected to it and storing information is formed, and the RFID circuit element To is comprised by them.

On the front side of the base film 101*b* (right side in FIG. 2), the adhesive layer 101*a* for affixing the cover film 103 later is formed, while on the back side of the base film 101*b* (left side in FIG. 2), the separation sheet 101*d* is bonded to the base film 101*b* by the adhesive layer 101*c* provided so as to include the RFID circuit element To. The separation sheet 101*d* is used when the RFID label T finally completed in the label state is affixed to a predetermined article or the like, and it is affixed to the article or the like by the adhesive layer 101*c* by peeling off the separation sheet.

The second roll 104 has the cover film 103 wound around a reel member 104*a*. In the cover film 103 fed out of the second roll 104, the ribbon 105 arranged on its back face side (that is, the side to be affixed to the base tape 101) and driven by the ribbon-supply-side roll 111 and the ribbon take-up roller 106 is brought into contact with the back face of the cover film 103 by being pressed by the print head 10.

The ribbon take-up roller 106 and the tape feeding roller 107 are rotated and driven, respectively, by a driving force of a motor 23 to drive cartridge shaft (See the above-mentioned FIG. 1), which is a pulse motor, for example, provided outside the cartridge 100, transmitted to the ribbon take-up roller driving shaft 11 and the feeding roller driving shaft 12.

In the cartridge 100 of the above construction, the base tape 101 fed out of the first roll 102 is supplied to the tape feeding roller 107. On the other hand, as for the cover film 103 fed out of the second roll 104, the ink ribbon 105 arranged on its back face side (that is, the side bonded to the base tape 101) and driven by the ribbon-supply-side roll 111 and the ribbon take-up roller 106 is pressed by the print head 10 and brought into contact with the back face of the cover film 103.

When the cartridge 100 is attached to the cartridge holder portion of the main body 8 and the roller holder (not shown) is moved from the release position to the contact position, the cover film 103 and the ink ribbon 105 are held between the print head 10 and the platen roller 108, and the base tape 101 and the cover film 103 are held between the tape feeding roller 107 and the sub roller 109. Then, the ribbon take-up roller 106 and the tape feeding roller 107 are rotated and driven by the driving force of the motor 23 to drive cartridge shaft in a direction shown by an arrow B and an arrow D, respectively, in synchronization with each other. At this time, the feeding roller driving shaft 12, the sub roller 109 and the platen roller 108 are connected through the gear (not shown), and with the driving of the feeding roller driving shaft 12, the tape feeding roller 107, the sub roller 109, and the platen roller 108 are rotated, and the base tape 101 is fed out of the first roll 102 and supplied to the tape feeding roller 107 as mentioned above. On the other hand, the cover film 103 is fed out of the second roll 104, and the plurality of heater elements of the print head 10 is electrified by a print-head driving circuit 25. As a result, print R (See FIG. 6, which will be described later) is printed on the back face of the cover film 103. Then, the base tape 101 and the cover film 103 on which the printing has been finished are bonded together by the tape feeding roller 107 and the sub roller 109 to be integrated and formed as the tag label tape 110 with print and fed out of the cartridge 100. The ink ribbon 105 finished with printing on the cover film 103 is wound up by the ribbon take-up roller 106 by driving of the ribbon take-up roller driving shaft 11.

FIG. 3 is a functional block diagram illustrating detailed functions of the radio frequency circuit 21. In FIG. 3, the radio frequency circuit 21 comprises a transmitting portion 32 for transmitting a signal to the RFID circuit element To through the antenna 14, a receiving portion 33 for input of the reflected waves from the RFID circuit element To through the antenna 14, and a transmit-receive splitter 34.

The transmitting portion 32 includes a crystal oscillator 35 for generating a carrier wave for accessing (reading or writing) the RFID tag information of the IC circuit part 151 of the RFID circuit element To, a PLL (Phase Locked Loop) 36 for generating a signal with a predetermined frequency by control of a control circuit 30, a VCO (Voltage Controlled Oscillator) 37, a transmission multiplying circuit 38 (however, it may be replaced by an amplitude factor variable amplifier or the like in the case of amplitude modulation) for modulating (in this case, amplitude modulation according to the "TX_ASK" signal supplied from the signal processing circuit 22) the carrier wave generated as described above according to a signal supplied from the signal processing circuit 22, and a variable transmission amplifier 39 for amplifying the modulated waves modulated by the transmission multiplying circuit 38 with an amplification factor determined according to a "TX_PWR" signal supplied from the control circuit 30. The UHF frequency band, a microwave band, or a shortwave band frequency is preferably used for the carrier wave generated as described above and the output from the transmission amplifier 39 is transmitted to the antenna 14 through the transmit-receive splitter 34 and is supplied to the IC circuit part 151 of the RFID circuit element To.

The receiving portion 33 includes a first receiving signal multiplying circuit 40 for multiplying the reflected wave received from the RFID circuit element To through the antenna 14 by the carrier wave generated as described above, a first bandpass filter 41 for extracting only the signals within the necessary frequency band range from the output from the first receiving signal multiplying circuit 40, a first receiving signal amplifier 43 for amplifying the output from the first bandpass filter 41, a first limiter 42 for further amplifying the output of the first receiving signal amplifier 43 and converting the output thus amplified into a digital signal, a second receiving signal multiplying circuit 44 for multiplying the reflected wave received from the RFID circuit element To through the antenna 14 by the carrier wave that have been delayed by a phase shifter 49 by 90° after having been generated as described above, a second bandpass filter 45 for extracting only the signals within the necessary frequency band range from the output of the second receiving signal multiplying circuit 44, a second receiving signal amplifier 47 for amplifying the output of the second bandpass filter 45, and a second limiter 46 for further amplifying the output of the second receiving signal amplifier 47 and converting the output thus amplified into a digital signal. The signal "RXS-I" output from the first limiter 42 and the signal "RXS-Q" output from the second limiter 46 are input to the signal processing circuit 22 for processing.

Furthermore, the outputs from the first receiving signal amplifier 43 and the second receiving signal amplifier 47 are also input to an RSSI (Received Signal Strength Indicator) circuit 48. The signal "RSSI" indicating the intensity of these signals is input to the signal processing circuit 22. As described above, the apparatus 2 for producing RFID label of this embodiment performs demodulation of the reflected wave from the RFID circuit element To by I-Q quadrature demodulation.

FIG. 4 is an explanatory diagram illustrating an example of configuration of the sensor 20.

In FIG. 4, the sensor 20 is a mechanical switch in this example for detecting an irregular shape by urging and bringing a contact 20B into contact to identifiers (cartridge identifiers) 190A to 190D of the portion 190 to be detected provided with the irregular shape by a spring member 20A and outputs a detection signal to the control circuit 30 from the contact 20B arranged corresponding to each of irregular portions.

The identifiers 190A to 190D indicate tag parameter information relating to communication parameters (electric wave frequency, communication protocol and the like used in the wireless communication) optimal for the RFID circuit element To in the cartridge 100 and tag attribute parameters (information indicating arrangement positions of the RFID circuit elements To in the base tape 101, including tape width, arrangement interval information of the RFID circuit elements To and the like) by presence of the irregularity. Usually, in all the RFID circuit element To provided in one cartridge, the communication parameters and tag attribute parameters are all the same (common).

In FIG. 4, out of the identifiers 190A to 190D, information relating to the communication parameters corresponds to the identifier 190A and the identifier 190B and information on the tag attribute parameters to the identifier 190C and the identifier 190D in this example.

As an example of the information on the communication parameters, the identifier 190A indicates a communication frequency (access frequency such as 915 MHz, 2.4 GHz or the like) of the RFID circuit element To in the base tape 101, while the identifier 190B indicates the type of the communication protocol (type A, type B or the like).

On the other hand, the identifier 190C indicates, as an example of the information on the tag attribute parameters, a tape width W (12 cm, 16 cm or the like) of the base tape 101, while the identifier 190D indicates an arrangement interval L (5 cm, 10 cm or the like) of the RFID circuit elements To.

The control circuit 30 can obtain the tag parameter information in the cartridge 100 from the detection signal of the contact 20B indicating the irregular state of the identifiers 190A to 190D and further can search the type of the attached cartridge 100 in the database 51 from the combination of the tag parameter information.

The sensor 20 as the detecting device is not limited to a mechanical switch but may be a sensor using other methods such as light reflection. In this case, a light emitting diode for emitting light by a signal from the control circuit 30 and a phototransistor receiving the reflected light of the emitted light at each identifier and outputting a corresponding detection signal to the control circuit 30 may be provided. Also, as a more developed optical sensor, various barcodes (including one dimensional and two dimensional ones) can be described on the cartridge 100 or the surface of the separation sheet of the base tape 101 so as to be read by a reading device provided at the main body 8 in the apparatus 2 for producing RFID label.

Other than the mechanical switched and optical sensors, a RFID circuit element for detecting tag parameter information (RFID circuit element for cartridge) may be provided at the main body of the cartridge 100 so as to be read by an antenna provided at the main body 8 in the apparatus 2 for producing RFID label.

Since the tag parameter information on the cartridge 100 can be obtained from the cartridge 100 itself as mentioned above, input by operators for that purpose is not needed any more, and the tag parameter information can be obtained assuredly.

As the tag attribute parameters, other than the above-mentioned tape width W to which the RFID circuit element is to be affixed, the arrangement interval of the RFID circuit elements on the tape (=equal to the label length L), data such as communication sensitivities of the IC circuit part 151 and the antenna 152 of the RFID circuit element To and memory capacity of the IC circuit part 151 may be used.

FIG. 5 is a functional block diagram illustrating a functional configuration of the RFID circuit element To. In FIG. 5, the RFID circuit element To has the antenna 14 on the side of the apparatus 2 for producing RFID label and the antenna 152 for transmitting/receiving a signal contactlessly using a radio frequency such as the UHF band and the IC circuit part 151 connected to the antenna 152.

The IC circuit part 151 comprises a rectification part 153 for rectifying the carrier wave received by the antenna 152, a power source part 154 for accumulating energy of the carrier wave rectified by the rectification part 153 so as to make it a driving power supply of the IC circuit part 151, a clock extraction part 156 for extracting a clock signal from the carrier wave received by the antenna 152 so as to supply it to a control part 155, a memory part 157 functioning as an information storing unit which can store a predetermined information signal, a modem part 158 connected to the antenna 152, and the control part 155 for controlling operation of the RFID circuit element To through the rectification part 153, the clock extraction part 156, the modem part 158 and the like.

The modem part 158 demodulates a communication signal from the antenna 14 of the apparatus 2 for producing RFID label received by the antenna 152 and modulates and reflects the carrier wave received at the antenna 152 based on a reply signal from the control part 155.

The control part 155 interprets a received signal demodulated by the modem part 158, generates a reply signal based on the information signal stored in the memory part 157, and executes basic control such as control of reply by the modem part 158.

FIGS. 6A and 6B are views illustrating an example of an appearance of a RFID label T formed after information writing or reading of the RFID circuit element To and cutting of the tag label tape 110 with print as above have been finished, in which FIG. 6A is a top view and FIG. 6B is a bottom view. FIG. 7 is a sectional view by VII-VII' section in FIG. 6A.

In FIGS. 6A, 6B and 7, the RFID label T includes one RFID circuit element To and is in the five-layered structure in which the cover film 103 is added to the four-layered structure shown in FIG. 2 as mentioned above made of the cover film 103, the adhesive layer 101a, the base film 101b, the adhesive layer 101c, and the separation sheet 101d from the side of cover film 103 (upper side in FIG. 7) to the opposite side (lower side in FIG. 7). Then, the RFID circuit element To including the antenna 152 provided on the back side of the base film 101b as mentioned above is provided in the adhesive layer 101c, and a print R (characters of "ABC" in this embodiment) is printed on the back face of the cover film 103.

In this embodiment, as shown in FIG. 6A, the RFID label has the constant tape width W and formed by cutting with a given length L in the tape length direction with the arrangement that the RFID circuit element To is located at the center, and the cut label length L accords with the arrangement interval of the RFID circuit elements To, which is one of the tag attribute parameters. The label length L of the RFID label T, that is, the arrangement interval of the RFID circuit elements To and the tape width W are the same (common) for all the RFID labels T pulled out of a single cartridge for production.

The print R in this embodiment is to print text data consisting of a character string of the constant horizontal to vertical ratio and the same character size (point) for all in one line along the tape length direction. Print layout is selected from left-aligned, center-aligned, right-aligned, and equal-space by print layout setting (the detail will be described later) made in a production process of the RFID label T for printing. In this embodiment, the character size is set based only on the tape width W.

FIGS. 8A, 8B, 8C and 8D are views illustrating an example of an appearance of the RFID label T produced by printing with different print layouts from the same cartridge, respectively, in which FIG. 8A is a top view in the case of left-aligned print, FIG. 8B is a top view in the case of the center-aligned print, FIG. 8C is a top view in the case of the right-aligned print, and FIG. 8D is a top view in the case of equal space print.

In the case of left-aligned arrangement shown in FIG. 8A, the print is made from a print start position spaced by a given length of margin m from the distal side (left side in FIG. 8) in the tape feeding-out direction in the arrangement of the character string of the text data without any interval. The same margin m is ensured at the tape rear-end side (right side in FIG. 8).

In the case of the center-aligned arrangement shown in FIG. 8B, print is made in the arrangement with the center of the character string without an interval aligned at the tape center. In this case, too, the margin m is ensured at both ends of the tape, respectively.

In the case of the right-aligned arrangement shown in FIG. 8C, while the margin m is ensured at both ends of the tape, the character string without an interval is printed in the arrangement adjacent to the margin m in the tape rear-end side (right side in FIG. 8).

In the case of equal-space arrangement shown in FIG. 8D, the same margin m is provided at both ends of the tape and the print is applied so that the character strings are arranged with an equal interval between the margins.

If the RFID label T of the same label length (=arrangement interval L of the RFID circuit element To) is to be produced from the same cartridge 100, the length of the printable region excluding the margin m on the both ends becomes the same length, the maximum number of printable characters is limited in common to the number of characters according to the printable region length in any of the above print layouts as long as the print is applied in the same character size.

In other words, the minimum required printing length for printing the same text data with narrowed interval becomes the same length in any of the above print layouts, and the minimum printing length is limited to the printable region length or less.

By providing the margin m, which can be used as an allowance dimension capable of absorbing an error in the blank region, occurrence of defective print in the vicinity of the arrangement position of the RFID circuit element To can be surely prevented regardless of the error caused by control accuracy or dimensional tolerance.

FIG. 9 is a view illustrating an example of a screen displayed on the above-mentioned display portion 53 at an access (reading or writing) to the RFID tag information of the IC circuit part 151 in the RFID circuit element To by the apparatus 2 for producing RFID label mentioned above.

In FIG. 9, in this embodiment, the type of a RFID label (represented by an access frequency, which is the communication parameter information, and a tape width and a label dimension, which is the tag attribute parameter information in this embodiment), print character R printed in correspondence with the RFID circuit element To, an access (reading or writing) ID, which is an ID unique to the RFID circuit element To, an address of the article information stored in the database 51 and the like can be switchably displayed on the display portion 53.

At production of a RFID label, the apparatus 2 for producing RFID label is operated by operation of the operation portion 52 and the print character R is printed on the cover film 103. At the same time, information such as the writing ID and article information is written (or RFID tag information such as the article information stored in advance in the IC circuit part 151 is readout) in the IC circuit part 151 as will be described later. At this time, with the printing operation, the feeding guide 13 may be held in an access area with respect to the tag label tape 110 with print being moved for an access (reading or writing) or the tag label tape 110 with print may be stopped at a predetermined position and held by the feeding guide 13 for making the access. Also, at the above reading or writing, the correspondence between the ID of the RFID circuit element To in the generated RFID label T and the information written in the IC circuit part 151 of the RFID circuit element To (or the information read out from the IC circuit part 151) is stored in the above-mentioned database 51 so that it can be referred to as needed.

The most distinctive feature of this embodiment is that the apparatus 2 for producing RFID label is provided with a function to determine matching between the tag parameter information relating to the tag attribute parameters of the RFID circuit element To provided at the cartridge 100 or the communication parameters and the instruction data relating to the print input with the operation portion 52, and particularly in this embodiment, the minimum printing length for applying the print with the print head 10 is calculated from the instruction data relating to the print input with the operation portion 52, the minimum printing length is compared with the printable region length (the length L−2 m obtained by subtracting the margin m at two locations at both ends of the tape from the arrangement interval L of the RFID circuit elements To, which is one of the tag attribute parameters, that is, the label length) for determination of matching of the cartridge 100 according to the size relation of the values, and notification based on a determination result is made on the display portion 53.

FIG. 10 is a flowchart illustrating a control procedure executed by the control circuit 30 when the cover film 103 is fed and given a predetermined print by the print head 10, while the base tape 101 is bonded to produce the tag label tape 110 with print and then, the tag label tape 110 with print is cut away so as to produce the RFID label T in production of the RFID label T carried out as above.

In FIG. 10, first, at Step S1105, when a writing operation of the apparatus 2 for producing RFID label is executed via the operation portion 52, this flow is started. The writing information to be written in the IC circuit part 151 in the RFID circuit element To and the print information (text data, instruction data) to be printed on the RFID label T by the print head 10 in correspondence with the information are read in by the input operation through the operation portion 52, and the tag parameter information on the communication parameters and the tag attribute parameters (including the arrangement interval of the RFID circuit element To, that is, the label length L and the tape width W) of the cartridge 100 detected by the sensor 20 is read in through the input portion 30c (See FIG. 15, which will be described later). The print information read at this time is expanded on the text buffer 30b and temporarily stored, while the tag attribute parameters are input into the determination portion (See FIG. 15, which will be described later).

Then, at Step S1300, according to the input operation by the operator executed through the operation portion 52, the print layout of the print R in the printable region is set (for detail, see FIG. 11, which will be described later).

After that, at Step S1110, variables M, N for counting the number of retry times when there is no reply from the RFID circuit element To and a flag F indicating communication state are initialized to 0.

At the subsequent Step S1400, based on the print information and the tag attribute parameters read in at Step S1105 and according to the print layout set at Step S1300, a print signal for output to the print-head driving circuit 25 is generated (for detail, see FIG. 14, which will be described later). In this print signal generation processing, determination on matching between the tag parameter information of the RFID circuit element To provided at the cartridge 100 and the instruction data on the print input by the operation portion 52 and notification of the determination result, which are the above-mentioned features of this embodiment, are executed.

Then, at Step S1115, a control signal is output to the cartridge shaft driving circuit 24 and the ribbon take-up roller 106 and the tape feeding roller 107 are rotated and driven by a driving force of the motor 23 to drive cartridge shaft. By this arrangement, the base tape 101 is fed out of the first roll 102 and supplied to the tape feeding roller 107, while the cover film 103 is fed out of the second roll 104. At this time, the print signal generated at Step S1400 is output to the print-head driving circuit 25, the print head 10 is energized, and the print R such as characters, symbols and the like read in at step S1105 is printed on a predetermined region in the cover film 103 according to the print layout set at Step S1300. Moreover, a control signal is output to the tape-feeding-roller motor 28 through the tape-feeding-roller driving circuit 29 so as to rotate and drive a feeding roller 17A. As a result, the base tape 101 and the cover film 103 on which the printing has been finished are bonded and integrated by the tape feeding roller 107 and the sub roller 109 as mentioned above so as to be formed as the tag label tape 110 with print and fed outside the cartridge body 100.

After that, at Step S1120, it is determined if the tag label tape 110 with print has been fed for a predetermined value C (a feeding distance for which the RFID circuit element To which the cover film 103 with the corresponding print is bonded reaches the feeding guide 13, for example). This feeding distance determination at this time can be made, for example, by detecting an appropriate identification mark provided on the base tape 101 by a known tape sensor provided separately. If the determination is satisfied, the program goes on to the subsequent Step S1200. At Step S1200, the tag information writing processing is executed, and after memory initialization (deletion) for writing, the RFID tag information is transmitted and written in the RFID circuit element To (for detail, see FIG. 16, which will be described later). When Step S1200 is finished, the program goes to Step S1125.

At Step S1125, it is determined if the flag F=0 or not. If the writing processing has been normally completed, it is still F=0 (See Step S1245 in the flow shown in FIG. 16, which will be described later), the determination is satisfied, and the program goes to Step S1130.

At Step S1130, combination of the information written in the IC circuit part 151 of the RFID circuit element To at Step S1200 and the print information having been printed by the print head 10 in correspondence with that is stored in the database 51.

After that, at Step S1135, it is confirmed whether all the prints in the printable region corresponding to the RFID circuit element To be processed at this time in the cover film 103 have been completed or not, and then, the program goes to Step S1140.

At the above-mentioned Step S1125, if the writing processing has not been normally completed for some reason, it becomes F=1 (See Step S1245 in the flow shown in FIG. 16, which will be described later), and the determination at Step S1125 is not satisfied and the program goes on to Step S1137, where a control signal is output to the print-head driving circuit 25 so as to stop electricity to the print head 10 and stop printing. After it is apparently displayed that the RFID circuit element To is not a non-defective product by interruption of printing in this way, the routine goes on to Step S1140.

At Step S1140, it is determined if the tag label tape 110 with print has been further fed by a predetermined amount (a feeding distance that the RFID circuit element To be a target and the whole printable region of the cover film 103 corresponding to that exceeds the cutter 15 by a predetermined distance (margin amounts at both ends of the tape), for example). The determination on the feeding distance at this time can be also made only by detecting marking, for example, by a tape sensor similarly to the above-mentioned Step S1120. If the determination is satisfied, the program goes to step S1145.

At Step S1145, a control signal is output to the cartridge shaft driving circuit 24 and the tape-feeding-roller driving circuit 29 so as to stop driving of the motor 23 to drive cartridge shaft and the tape-feeding-roller motor 28 and to stop rotation of the ribbon take-up roller 106, the tape feeding roller 107, and the feeding roller 17. By this arrangement, feeding-out of the base tape from the first roll 102, feeding-out of the cover film 103 from the second roll 104, and feeding of the tag label tape 110 with print by the feeding roller 17 are stopped.

After that, at Step S1150, a control signal is output to the solenoid driving circuit 27 so as to drive the solenoid 26, and the tag label tape 110 with print is cut by the cutter 15. AS mentioned above, the RFID circuit element To and the whole printable region of the cover film 103 corresponding to that have sufficiently exceeded the cutter 15 at this time, and by the cutting by this cutter 15, the predetermined RFID tag information is written in the RFID circuit element To and the label-state RFID label T with the predetermined print corresponding to that is produced.

After that, the program goes to Step S1155, where a control signal is output to the tape-feeding-roller driving circuit 29, driving of the tape-feeding-roller motor 28 is resumed and the feeding roller 17 is rotated.

By this arrangement, the feeding by the feeding roller 17 is resumed, and the RFID label T produced in the label state at Step S1150 is fed toward the carry-out exit 16 and discharged from the carry-out exit 16 to outside of the apparatus 2 for producing RFID label.

FIG. 11 is a flowchart illustrating a detailed procedure of the above-mentioned Step S1300.

In FIG. 11, first, at Step S1305, it is determined if any key is input by an operator through the operation portion 52. At this time, description to ask the operator if setting on the print layout is to be made or not is displayed on the display portion 53. If the determination is satisfied as some key has been input, the program goes to the subsequent Step S1310.

At Step S1310, it is determined whether or not the key input by the operator is a print layout setting on/off key, which is one of function keys. If the determination is satisfied, the program goes to Step S1500, an on/off selection on whether the print is to be applied according to the set print layout is made (for details, see FIG. 12, which will be described later), and then, the program returns to Step S1305 and waits for the subsequent input.

If the determination at Step S1310 is not satisfied, the program goes to Step S1315, where it is determined whether or not the key input by the operator is a print layout type setting key, which is one of the functions keys. If the determination is satisfied, the program goes to Step S1600, where the type of print layout is selected (for details, see FIG. 13, which will be described later), and then, the program returns to Step S1305 and waits for the subsequent input.

If the determination at Step S1315 is not satisfied, the program goes to Step S1320, where it is determined whether or not the key input by the operator is a termination key, which is one of the function keys. If the determination is not satisfied, it is considered that a key not relating to the print layout setting processing has been input, and the program returns to Step S1305 and waits for the subsequent input. On the other hand, if the determination is satisfied at Step S1320, this flow is finished. If the print layout setting is not on-selected by the processing at Step S1500 or if the type of the print layout other than the left-aligned print layout is not selected by the processing at Step S1600 in this flow, the print layout may be configured to be set in the left-aligned manner as default, for example.

FIG. 12 is a flowchart illustrating a detailed procedure of the above-mentioned Step S1500.

In FIG. 12, first, at Step S1505, display portion 53 and various settings are moved to a mode to make on/off selection of the print layout settings (such a display signal is generated and output). After that, the program goes to Step S1510, where it is determined if any key is input by the operator through the operation portion 52. At this time, selection of off by input of the numeral 0 key and selection of on by input of the numeral 1 key are made and displayed on the display portion 53. If the determination is satisfied as some key has been input, the program goes to the subsequent Step S1515.

At Step S1515, it is determined if the key input by the operator is the numeral 0 key or not. If the determination is satisfied, the program goes to Step S1520, where various variables and the flag are set for the printing not according to the setting of the print layout, and this flow is finished.

If the determination at Step S1515 is not satisfied, the program goes to Step S1525, where it is determined if the key input by the operator is the numeral 1 key or not. If the determination is satisfied, the program goes to Step S1530, where various variables and the flag are set for the printing according to the setting of the print layout, and this flow is finished.

If the determination at Step S1525 is not satisfied, the program goes to Step S1535, where it is determined whether or not the key input by the operator is a termination key, which is one of the functions keys. If the determination is not satisfied, it is considered that a key not relating to the print layout setting on/off processing has been input, and the program returns to Step S1510 and waits for the subsequent input. On the other hand, if the determination at Step S1525 is satisfied, this flow is finished.

FIG. 13 is a flowchart illustrating a detailed procedure of the above-mentioned Step S1600.

In FIG. 13, first, at Step S1605, display on the display portion 53 and various settings are moved to a mode for selection of the print layout type (such a display signal is generated and output). After that, the program goes to Step S1610, where it is determined if any key is input by the operator through the operation portion 52. At this time, selection of left-aligned by input of the numeral 0 key, selection of center-aligned by input of the numeral 1 key, selection of right-aligned by input of the numeral 2 key, and selection of equal space by input of the numeral 3 key are made and displayed on the display portion 53. If the determination is satisfied as some key has been input, the program goes to the subsequent Step S1615.

At Step S1615, it is determined if the key input by the operator is the numeral 0 key or not. If the determination is satisfied, the program goes to Step S1620, where various variables and the flag are set for the left-aligned print layout, and the flow is finished.

If the determination is not satisfied at Step S1615, the program goes to Step S1625, where it is determined if the key input by the operator is the numeral 1 key or not. If the determination is satisfied, the program goes to Step S1630, where various variables and the flag are set for the center-aligned print layout, and the flow is finished.

If the determination is not satisfied at Step S1625, the program goes to Step S1635, where it is determined if the key input by the operator is the numeral 2 key or not. If the determination is satisfied, the program goes to Step S1640, where various variables and the flag are set for the right-aligned print layout, and the flow is finished.

If the determination is not satisfied at Step S1635, the program goes to Step S1645, where it is determined if the key input by the operator is the numeral 3 key or not. If the determination is satisfied, the program goes to Step S1650, where various variables and the flag are set for the equal-space print layout, and the flow is finished.

If the determination is not satisfied at Step S1645, the program goes to Step S1655, where it is determined if the key input by the operator is the termination key, which is one of the function keys. If the determination is not satisfied, it is considered that a key not relating to the print layout type selection processing has been input, and the program returns to Step S1610 and waits for the subsequent input. On the other hand, if the determination at Step S1655 is satisfied, this flow is finished.

FIG. 14 is a flowchart illustrating a detailed procedure of the above-mentioned Step S1400.

In FIG. 14, first, at Step S1405, the character size is determined according to the tape width W, which is one of the tag attribute parameters. In this embodiment, the text data (print information read in at the above Step S1105) is printed in a single-line character string, but if a plural number of lines such as two lines or three lines is designated by the operator by other devices through the operation portion 52, the character size may be determined according to the tape width W and the designated number of lines.

Next, at Step S1410, the minimum printing length is acquired by the determined character size. This can be acquired according to a product of the dimension in the tape length direction of the determined character size and the number of print characters of the text data to be printed. The unit of the length in the tape direction may be actual dimension (such as mm) on the tape or the number of print dots of the print head in the tape length direction. By setting a fixed ratio between the horizontal and vertical lengths in any size, the minimum printing length along the tape length direction can be made uniformly the same only by determining the number of print characters and the character size of the text data. This Step S1410 functions as printing length calculating means for calculating the printing length when the print is to be printed by the printing device from the instruction data relating to the print input by the data input means.

Then, at Step S1415, the printable region length is acquired from the label length L (=arrangement interval of the RFID circuit elements), which is one of the tag attribute parameters. This can be acquired by subtracting the length of the margin m located at two locations at both ends from the label length L. The unit of the length here is the same unit used when the minimum printing length is acquired at Step S1410. Since the margin m is not indispensable in printing operation, an instruction may be made by the operator that the margin at the both ends or one end of the tape is eliminated by other devices through the operation portion 52, it may be so configured that the operator can input the length of the margin m in a numeral value completely freely, or the operator can select and input from a plurality of lengths determined in advance.

After that, at Step S1420, the minimum printing length acquired at Step S1410 is compared with the printable region length acquired at Step 415 so as to determine if the minimum printing length is not more than the printable region length (for details, see FIG. 15, which will be described later).

If the determination is not satisfied, it is determined that the tag parameter information relating to the cartridge 100 does not match the instruction data relating to the print input by the operation portion 52, and the program goes to Step S1425, where the size error is notified to the display portion 53 as a determination result.

After this size error is notified in this way, the program goes to Step S1430, where the suitable cartridge 100 provided with the proper (in other words for replacement) base tape 101 having the printable region length more than the minimum printing length is searched from the database 51 (in the database 51, the data for replacement has been accumulated and stored in advance as a replacement information storage means. Also, the data can be made updatable by an appropriate update processing device by the operation by the operator through the operation portion 52.), and a model number or the like of the proper cartridge is notified to the display portion 53 at the subsequent Step S1435. In the notification of the proper cartridge at Step S1435, it is effective to display (preview) a sample in the state where the same text data is printed on the proper base tape 101 on the display portion 53. The search and notification of the proper cartridge by Step S1430 and Step S1435 can be omitted if not necessary.

After that, at Step S1440, it is determined if the cartridge 100 has been replaced or not by presence of input of a cartridge replacement confirmation key provided at the operation portion 52, for example. If the determination is satisfied, the program goes to Step S1445.

At Step S1445, the tag attribute parameters of the replaced cartridge 100 (label length L, tape width W and the like) are read by the sensor 20 again, and then, the program returns to Step S1405, where the print signal generation processing is started over.

On the other hand, if the determination that the minimum printing length is not more than the printable region length is satisfied at the preceding Step S1420, the program goes to Step S1450.

At Step S1450, based on the character string of the text data and according to the character size determined at Step S1405 and the print layout having been already set, the print signal to be output to the print-head driving circuit 25 is generated, and this flow is finished.

By the above routine, the print characters of the text data input by the operator (print information) can be all printed in the printable region on the cover film 103 with the proper character size.

FIG. 15 is a functional block diagram extracting and illustrating a portion relating to determination made at Step S1400 in the above-mentioned FIG. 10 among the functions of the control circuit 30.

In FIG. 15, the control circuit 30 comprises an input portion 30a (data input means) for input of print information (text data, instruction data) from the operation portion 52, a text buffer 30b for temporarily storing print information input through the input portion 30a, an input portion 30c for input of the label length L (=arrangement interval of the RFID circuit elements To) detected by the above-mentioned sensor 20 from the portion 190 to be detected provided at the cartridge 100, a determination portion 30d (determining means, first matching-preparation-processing device) for determining matching of the cartridge 100 by comparing the printable region length acquired from the label length and the minimum printing length acquired from the print information of the text buffer 30b, a print signal generation portion 30e (print control means) for generating a print signal to be output to the print-head driving circuit 25 based on the print information determined as matching data by the determination portion 30d and the character size as well as print layout set in advance, a print signal output portion 30f (print control device) outputting the generated print signal to the print-head driving circuit 25, a determination result memory portion (determination storage means) 30g made of a memory such as RAM and storing determination results of the determination portion 30d, and an error signal output portion 30h (notification signal output means) for outputting an error signal (notification signal) such as a size error based on the determination result to the display portion 53.

FIG. 16 is a flowchart illustrating a detailed procedure of Step S1200 in the above-mentioned FIG. 10.

In FIG. 16, first, at Step S1205, identification numbers (=tag ID, ID information) of the plurality of RFID circuit elements To included in a single RFID label T to be written in are set, respectively, by a known appropriate method (as mentioned above, with regard to the identification information of the RFID tag To be written in, ID information different for each RFID circuit element To is stored all the time so that an access can be made to the respective RFID circuit element To without interference).

After that, at Step S1210, an "Erase" command to initialize information stored in the memory portion 157 of the RFID circuit element To is output to the signal processing circuit 22. Based on this, an "Erase" signal as access information is generated at the signal processing circuit 22 and transmitted to the RFID circuit element To be written in through the radio frequency circuit 21 so as to initialize the memory portion 157.

Next, at Step S1215, a "Verify" command to verify contents of the memory portion 157 is output to the signal processing circuit 22. Based on this, a "Verify" signal as the access information is generated at the signal processing circuit 22 and transmitted to the RFID circuit element To into which the information is to be written through the radio frequency circuit 21, and a reply is prompted. After that, at step S1220, a reply signal sent in response to the "Verify"

signal from the RFID circuit element To be written in is received through the antenna 14 and taken in through the radio frequency circuit 21 and the signal processing circuit 22.

Next, at Step S1225, based on the reply signal, information in the memory portion 157 of the RFID circuit element To is confirmed so as to determine if the memory portion 157 has been normally initialized or not.

If the determination is not satisfied, the program goes to Step S1230 and one is added to M, and moreover, at Step S1235, if it is M=5 or not is determined. In the case of M≦4, the determination is not satisfied but the program returns to Step S1210 and the same procedure is repeated. In the case of M=5, the program goes to Step S1240, where an error display signal is output to the display portion 53, corresponding writing failure (error) display is made, and this flow is finished. In this way, even if initialization is not successful, retry is made up to 5 times.

If the determination at Step S1225 is satisfied, the program goes to Step S1250, where a "Program" command to write desired data in the memory portion 157 is output to the signal processing circuit 22. Based on this, a "Program" signal (=RFID tag information such as the tag ID) as the access information is generated at the signal processing circuit 22 and transmitted to the RFID circuit element To be written in through the radio frequency circuit 21, and the information is written in the memory portion 157.

After that, at Step S1255, the "Verify" command is output to the signal processing circuit 22. Based on this, the "Verify" signal as the access information is generated at the signal processing circuit 22 and transmitted to the RFID circuit element To into which the information is to be written through the radio frequency circuit 21, and a reply is prompted. After that, at step S1260, a reply signal sent in response to the "Verify" signal from the RFID circuit element To be written in is received through the antenna 14 and taken in through the radio frequency circuit 21 and the signal processing circuit 22.

Next, at Step S1265, based on the reply signal, information stored in the memory portion 157 of the RFID circuit element To is confirmed, and it is determined if the predetermined information transmitted as above has been normally stored in the memory part 157 or not.

If the determination is not satisfied, the program goes to Step S1270, where one is added to N and whether it is N=5 or not is determined at Step S1275. In the case of N≦4, the determination is not satisfied but the program returns to Step S1250 and the same procedure is repeated. In the case of N=5, the program goes to the above-mentioned Step S1240, where corresponding writing failure (error) display is similarly made on the terminal 5 or the general-purpose computer 6, the above-mentioned flag is set at the flag F=1 at Step S1245, and this flow is finished. In this way, even if information writing is not successful, retry is made up to 5 times.

If the determination at Step S1265 is satisfied, the program goes to Step S1280, where a "Lock" command is output to the signal processing circuit 22. Based on this, a "Lock" signal is generated at the signal processing circuit 22 and transmitted to the RFID circuit element To into which the information is to be written through the radio frequency circuit 21, and new information writing in the RFID circuit element To is prohibited. By this arrangement, writing of the RFID tag information in the RFID circuit element To be written is completed, and the flow is finished.

By the above routine, the desired RFID tag information (tag ID and the like) can be written in the IC circuit part 151 to the RFID circuit element To be accessed in the cartridge 100.

FIGS. 17A and 17B are explanatory views illustrating examples of matching and mismatching between the text data and the tag attribute parameters.

In FIGS. 17A and 17B, FIG. 17A shows an appearance of a RFID label T (the same as the RFID label T shown in the above-mentioned FIG. 6A) when the input text data matches the tag attribute parameters and print is completed properly, while FIG. 17B shows an error case that the input text data does not match the tag attribute parameters. As in FIG. 17B, if the printing length of the text data input from the operation portion 52 is larger than the printable region length of the base tape 101 (label length L−2×margin m), the text data is not printed but a size error is notified to the display portion 53. FIGS. 17A and 17B show both an example of left-aligned print layout.

In the above, the signal processing circuit 22 and transmitting portion 32 in the radio frequency circuit 21 constitute information access device that generates access information ("Erase" signal, "Verify" signal, "Program" signal and the like) to the IC circuit part described in each claim, transmits it to the RFID circuit element To through the device antenna, and carries out information writing in the IC circuit part and information reading from the IC circuit part.

As mentioned above, in the apparatus 2 for producing RFID label in this embodiment, the base tape 101 on which the RFID circuit elements To are arranged with a substantially equal interval is fed out, the tag label tape 110 with print in which the fed-out base tape 101 and the cover film 103 with print are bonded together is cut by the cutter 15 so as to form the RFID label T. At that time, the determination portion 30d determines their matching (in other words, matching of the cartridge 100) based on the instruction data (print information, text data) relating to the print and the tag attribute parameters of the RFID circuit element To. In the case of mismatching, the print is not carried out as it is but the fact is notified or notification of matching cartridge information for replacement is made. By this arrangement, even if the cartridge 100 is replaced for production of the RFID label T, mismatching with the print can be easily prevented, and convenience for the operator can be improved. Also, production of the RFID label T with performance or quality which might not fully satisfy the operator is prevented, and product quality and reliability of the RFID label T can be improved.

At this time, particularly in this embodiment, if the minimum printing length is larger than the printable region length (if there is no margin m, the label length L itself, which is the same as the arrangement interval of the RFID circuit element To), by determination as mismatching by the determination portion 30d, interruption of the print portion or division between two RFID circuit elements To is avoided but product quality and reliability of the RFID label T can be surely improved.

Also, particularly in this embodiment, since the display portion 53 outputs information (cartridge name, model number and the like) relating to the cartridge 100 matching the instruction data (print information, text data) input at the operation portion 52, if the determination result by the determination portion 30d is mismatching, not only that the fact of mismatching is notified to the operator but a matching cartridge can be recommended. Thus, the product quality and reliability of the RFID label can be surely improved.

In the above first embodiment, various variations are possible in a range not departing from its gist and a technical scope. The variations will be described below.

(1-1) When the Character Size is Adjusted Also for the Label Length L:

In the above embodiment, the character size of the print character R is adjusted to a size matched only with the tape width W, but not limited to this, the character size may be adjusted to match both the tape width W and the label length L so as to enable print of all the text data within the printable region.

The print signal generation processing (corresponding to Step S1400 in FIG. 10 in the above embodiment) carried out by the control circuit in this variation will be described using FIG. 18. FIG. 18 is a flowchart illustrating a detailed procedure of the pint signal generation processing carried out by the control circuit of this variation and corresponds to FIG. 14 in the above embodiment. The same portions as those in FIG. 14 are given the same reference numerals and explanation will be omitted as appropriate.

In FIG. 18, first, at Step S1403, it is determined if there is designation that the character size should be adjusted also for the label length L. This designation may be input and made by an operator in advance in the print layout setting processing (Step S1300 in FIG. 10) in FIG. 11 or the operator may input and designate at Step S1403.

If the determination is not satisfied, the program goes to Step S1405, where the print signal generation processing is executed in substantially the same flow as that in FIG. 14 after that as a normal mode. On the other hand, if the determination is satisfied, the program goes to Step S1405', and the character size is adjusted according both to the tape width W and the label length L at Step S1405' to Step S1420' after that as a matching control mode.

First, at Step S1405', the character size is provisionally determined according to the tape width W, which is one of the tag attribute parameters. If the number of print lines is designated to plural, the character size may be provisionally determined according to the tape width W and the number of designated lines.

Next, at Step S1410', the minimum printing length of the text data is acquired with the provisionally determined character size, and at Step S1415', the printable region length is acquired from the label length L.

Then, the program goes to Step S1418', where the character size with which the minimum printing length is not more than the printable region length is determined. If the minimum printing length is already not more than the printable region length here, there is no need to adjust the character size, and the program goes to the subsequent Step S1420' with the character size as it is. On the other hand, if the minimum printing length is larger than the printable region length, since the printing of the text data can not be contained within the printable region, the character size with which the minimum printing length becomes not more than the printable region length is acquired and determined, and the program goes to the subsequent Step S1420'.

At Step S1420', it is determined if the determined character size is at a minimum limit value or more. This is a processing to ensure the character size larger than the minimum limit value set in advance, considering collapse of the print due to limitation in print accuracy of the print head 10 and legibility of normal characters for the operator. If the determination is satisfied, it is considered that print is possible with the determined character size, the program goes to Step S1450, where the print signal is generated, and the flow is finished.

On the other hand, at Step S1420', if the determination is not satisfied, the cartridge 100 is considered to be mismatching. The error notification processing and the cartridge replacement processing at Step S1425 to Step S1445, similarly to the above-mentioned FIG. 14, are executed and then, the program returns to Step 403 to start over this flow from the beginning. The minimum limit value determination on the character size at Step S1420' may be omitted.

FIGS. 19A and 19B are views illustrating two examples when the character size is matched only with the tape width W and can not be contained in the printable region length in this variation.

In FIGS. 19A and 19B, FIG. 19A shows the RFID label T when the character size is matched only with the tape width W and cannot be contained in the printable region length in the normal mode at step S1405 and after in the above-mentioned FIG. 18 and corresponds to FIG. 17B. FIG. 19B shows the RFID label T when the character size is matched both with the tape width W and the label length L and print is completed by the matching control mode at Step S1405' and after in FIG. 18 with the same text data as that in FIG. 19A. In the case of FIG. 19A, the error is notified and characters are not printed actually.

In the variation described as above, similarly to the above embodiment, the effect of improved quality and reliability of a RFID label product can be obtained. Also, since the matching control mode can be executed, in the case of mismatching to the label length L, the label production work is not stopped at that point but matching is forced, and a RFID label with high quality and reliability can be produced efficiently and surely.

Also, since the matching control mode and the normal mode are configured to be switchable, the mode can be switched according to preference or need of the operator, and convenience for users can be further improved.

(1-2) When Tag Parameter Information is to be Obtained from RFID Circuit Element in Base Tape:

The above embodiment is configured so that the tag attribute parameters including the tape width W and the label length L (arrangement interval of the RFID circuit elements To) are obtained through detection by the sensor 20 provided at the main body 8 in the apparatus 2 for producing RFID label from the portion 190 to be detected provided at the main body of the cartridge 100. However, the present invention is not limited to that, it may be so configured that the tag attribute parameters are stored in the RFID circuit element To itself of the base tape 101 included in the cartridge 100 so that the parameters are obtained by wireless communication through the antenna 14 (or a separate antenna may be used).

In such a variation, the sensor 20 and the portion 190 to be detected (See FIG. 1) provided in the above embodiment are not needed any more. In the control procedure shown in FIG. 10, reading of the tag attribute parameters is carried out not at Step S1105 but in the tag information writing processing at Step S1200 immediately before information writing. On the premise that the communication parameters are separately obtained or set in advance by some device, the tag attribute parameters can be read in by wireless. Since the print signal generation processing at Step S1400 in FIG. 10 is carried out before the tag information writing processing at Step S1200 in which the tag attribute parameters are read in for the first time, the character size adjustment or determination reflecting the tag attribute parameters can not be carried out in the print signal generation processing for the first RFID label T after the production is started. This situation can be handled by obtaining the tag attribute parameters by some device before the print signal generation processing or by the print signal generation processing (FIG. 14 or FIG. 18) at appropriate timing in the tag information writing processing at Step S1200 only for the first RFID label T.

In the variation described above, in addition to the effect similar to those in the above embodiment, since the information relating to the tag parameter information is obtained by accessing the RFID circuit element To through the wireless communication, such effects are resulted that input by the operator is not needed any more and the tag parameter information can be obtained surely.

(1-3) Others (A) When Only Information Reading is Carried Out:

In the above, a case was described that information is written in the IC circuit part 151 in the RFID circuit element To, but not limited to this, the present invention may be applied to the apparatus for producing RFID label for the RFID label T provided with the RFID circuit element To capable only of information reading. The same effect can be also obtained in this case.

(B) When Bonding is Not Carried Out:

That is, not that the print is applied to the cover film 103 separate from the tag tape (base tape) 101 provided with the RFID circuit element To for bonding as in the above embodiment, the present invention may be applied to the apparatus for producing RFID label for applying the print on the cover film provided at the tag tape. In this case, the RFID circuit element To is provided at the tape on which the print is applied, but a thermal tape can be also used as the tape. In this case, too, the same effect as that in the first embodiment can be obtained.

Also, in the first embodiment and each variation, a case of a stand-along type was described that the apparatus 2 for producing RFID label is provided with the database 51 so that required information can be stored and searched independently, but not limited to that, but the present invention may be applied to a RFID tag manufacturing system in which the apparatus 2 for producing RFID label is provided with an interface and is connected to a route server, a terminal, a general-purpose computer, and a plurality of information servers through wired or wireless communication lines. In this case, too, the same effect can be obtained.

A second embodiment of the present invention will be described referring to the attached drawings. The same portions as those in the first embodiment are given the same reference numerals and explanation will be omitted or simplified as appropriate.

FIG. 20 is a system block diagram illustrating a RFID tag manufacturing system to which the apparatus for producing RFID label of this embodiment is applied.

In a RFID tag manufacturing system 1 (tag label manufacturing system) shown in FIG. 20, the apparatus for producing RFID label (apparatus for communicating with a RFID tag) 2 is connected to a route server 4, a terminal 5 (operation terminal, editing apparatus for label) for operating the apparatus 2 for producing RFID label, a general-purpose computer 6, and information servers 7 through a wired or wireless communication line 3 so as to construct a (wide-area, for example) network.

The terminal 5 is a so-called personal computer (PC) terminal, provided with an operation means 5b such as a display 5a, which is a display means, and a keyboard (it may be a mouse or the like) and has a CPU 5c (See FIG. 31, which will be described later), which is a central processing unit, not shown, ROM (not shown) and RAM (not shown) as storage means and the like. The CPU 5c starts a predetermined application for operating the apparatus 2 for producing RFID label and various templates along the application stored in the ROM in advance, for example, based on an external signal input through the communication line 3 (the details will be described later).

FIG. 21 is a conceptual block diagram illustrating a detailed structure of the apparatus 2 for producing RFID label in this embodiment and substantially corresponds to FIG. 1 above.

In FIG. 21, differences from FIG. 1 is that the database 51 in FIG. 1 is omitted, and the control circuit 30 is connected to the communication line 3, for example, through an input/output interface 31 so that information can be exchanged with the above-mentioned route server 4, other terminals 5, the general-purpose computer 6, the information server 7 and the like connected to the communication line 3. Correspondingly, in this embodiment, various information such as the correspondence between the identification information (tag ID) of the RFID circuit element To and the article information (or correspondence with addresses of the article information) is stored and held in the database (not shown) in the route server 4 (or the information sever 7) made of a non-volatile storage device, for example.

In the other points, this embodiment is substantially the same as the first embodiment including a point that each of the irregular shapes in the plurality of cartridge identifiers provided at the portion 190 to be detected at the cartridge 100 is detected by the sensor (detecting device for a cartridge identifier, cartridge-type detecting device, parameter-information detecting device) 20. The detailed structure of the cartridge 100 is the same as that mentioned above using FIG. 2, the detailed functions of the radio frequency circuit 21 are the same as those described above using FIG. 3, and the functional configuration of the RFID circuit element To is the same as that described above using FIG. 5, and the explanation will be omitted.

In this embodiment, in the portion 190 to be detected, the information (cartridge information) relating to presence of the RFID circuit element To in the cartridge 100 is recorded and held (that is, concerning whether the base tape 101 provided with the RFID circuit element To is provided or a normal tape not provided with the RFID circuit element To is provided, information indicating the former in this example is recorded). Other than the information relating to presence of the tag, the tag attribute parameters (tape width, arrangement interval of RFID circuit elements To, communication sensitivity of the IC circuit part 151 and the antenna 152, memory capacity of the IC circuit part 151, communication protocol used for communication, wave transmission output, frequency, communicable distance and the like) may be recorded. In this second embodiment, various types of information including the tag presence information and the tag attribute parameters are collectively called as "tape attribute parameter information". Prior to access from the antenna 14 to the RFID tag information of the IC circuit part 151 in each RFID circuit element To provided at the base tape 101, the information is read out and a corresponding signal is input to the control circuit 30. It may be so configured that in the information server 7, for example, correspondence between the type of the cartridge 100 and various types of parameter data (details will be described later) relating to the RFID circuit element To is stored and held so that the type information of the cartridge 100 recorded in the portion 190 to be detected is read out by the sensor 20 and an access is made to the information server 7 based on the information so as to obtain the various types of tape attribute parameter information and the like.

As one of features of this embodiment, a cartridge 100' provided with a normal base tape 101' not provided with the RFID circuit element may be detachably attached at the cartridge holder portion (not shown) here. FIG. 22 is an explanatory view for illustrating the detailed structure of the cartridge 100' and corresponds to FIG. 2 above.

In FIG. 22, the cartridge 100' is different from the cartridge 100 in a point that the first roll 102 has the normal base tape 101' without the RFID circuit element To wound around the reel member 102a. The other configuration and feeding-out operation and the like are the same as those of the cartridge 100.

Also, in the portion 190 to be detected in the cartridge 100', the information relating to presence of the RFID circuit element To in the cartridge is recorded and held similarly to the cartridge 100 (information that the normal tape 101' not provided with the RFID circuit element To is provided is recorded in this example). Other various types of tape attribute parameter information and the like such as the tape width may be also recorded. The read-out information is input to the control circuit 30.

The essential part of this embodiment is that a template for print corresponding to the tapes 101, 101' is automatically displayed on the display 5a at the terminal 5 according to the type of the cartridges 100, 100' detected by the sensor 20 (=cartridge information. In other words, also corresponding to the type of the tapes 101, 101' incorporated in the cartridges 100, 100'), and only by inputting data to be printed (text data, for example), by the operator on the template, the optimal print mode corresponding to the tape type can be realized. The contents will be described below in order.

FIGS. 23A and 23B are views illustrating an example of an appearance of the RFID label T formed by attaching the cartridge 100 provided with the RFID circuit element To the cartridge holder portion and by completing writing of information in the RFID circuit element To and cutting of the label tape 110 with print, in which FIG. 23A is a top view and FIG. 23B is a bottom view. Since the cross-sectional structure in FIGS. 23A and 23B is the same as that shown in FIG. 7 above, it will not be illustrated again.

In FIGS. 23A and 23B, the RFID label T is in the five-layered structure of the cover film 103 (print-receiving tape), the adhesive layer 101a, the base film 101b, the adhesive layer 101c, and the separation sheet 101d similarly to that shown in FIGS. 6, 7A and 7B above. On the back face of the cover film 103, the print R (the figure shows an example of a nametag in which three character strings of "ABC Industrial Co., Ltd., XXX Development Department, Taro Hotta" indicating the name of a company, name of a department and name of an employee with the respective predetermined font and size as will be described later and a partition line extending in the label longitudinal direction at the center in the width direction and the like) is printed. At both ends in the label longitudinal direction (right and left ends in FIG. 23), a RFID label mark Ro indicating the RFID label T with the RFID circuit element To is also printed.

FIGS. 24A and 24B are views illustrating an example of an appearance of a label T' formed by attaching the above-mentioned cartridge 100' not provided with the RFID circuit element To the cartridge holder portion and completing cutting of the tape 110 with print, in which FIG. 24A is a top view and FIG. 24B is a bottom view. FIG. 25 is a cross-sectional view by XXV-XXV' section in FIG. 24A.

In FIGS. 24A, 24B and 25, the label T' is in the five-layered structure of the cover film 103, the adhesive layer 101a, the base film 101b, the adhesive layer 101c, and the separation sheet 101d similarly to the above RFID label T. On the back face of the cover film 103, the print R' (in an example in the figure, characters of "ABC Industrial Co., Ltd., XXX Development Department, Taro Hotta" and a partition line extending in the label longitudinal direction at the center in the width direction and the like) is printed. At this time, since the label T does not include the RFID circuit element To, the above-mentioned RFID label mark Ro is omitted and layout of the print R' becomes different from the print R in the RFID label T accordingly.

FIG. 26 is a view illustrating an example of a template for print displayed on the display 5a when the cartridge 100 provided with the base tape 101 including the RFID circuit element To is attached to the cartridge holder portion.

In FIG. 26, a template 200 shows a case of the cartridge 100 provided with the base tape 101 with the tape width of 24 mm and the arrangement interval of the RFID circuit elements To of 120 mm, and as the result that the cutting margin is set at 10 mm at both ends in the tape longitudinal direction, the tape length is a fixed length of 100 mm. At this template 200, the above-mentioned RFID label mark Ro indicating the RFID label T provided with the IC circuit part 151 has been set in advance, and a department print region 204 and a name print region 206 are set in the intermediate part. A case is shown where the characters of "department" are rewritably set in the department print region 204 and the characters of "name" are rewritably set in the name print region 206 as initial settings in the figure, but at actual production of print data, the "department name" and "name" of an employee designated by the operator as a target for nametag production are replaced and inserted (See also FIG. 38 and the like, which will be described later) in the department print region 204 and the name print region 206, respectively, from the database in the storage device 5E (storage means, see also FIG. 31, which will be described later) at the terminal 5 and the image is displayed on the display 5a.

FIG. 27 is a view illustrating an example of a template 300 for print displayed on the display 5a when the cartridge 100' provided with the base tape 101' not including the RFID circuit element To is attached to the cartridge holder portion.

In FIG. 27, the template 300 corresponds to the template 200 in FIG. 26 and shows a case of the cartridge 1001 provided with the base tape 101' with the tape width of 24 mm. In this template 300, a department print region 304 and a name print region 306 are set in the intermediate part similarly to the template 200, but unlike the template 200, the RFID label mark Ro is not set. In the figure, a case where the characters of "department" are rewritably set in the department print region 304 and the characters of "name" are rewritably set in the name print region 306 as initial settings similarly to the above, but at actual creation of print data, the "department name" and "name" of an employee designated by the operator as a target for nametag production are replaced and inserted from the database in the storage device 5E (See also FIG. 38, which will be described later) and the image is displayed on the display 5a.

In this template 300, the cutting margin is set at 5 mm each at both ends in the tape longitudinal direction, but the tape length is a variable length in which a character string designated with a designated font size (20 dots in this example, for example. See FIG. 30, which will be described later) is arranged. That is, the label length is automatically determined so that the designated character string is contained with the designated font size according to the number of characters to be printed in the department display region 304 or the name print region 306. The template 300 constitutes an example of a base template, which will be described later.

On the other hand, FIG. 28 is a view illustrating another example of a template for print displayed when the cartridge 100 provided with the base tape 101 including the RFID circuit element To is attached to the cartridge holder portion. This template 210 shows a case of the cartridge 100 provided with the base tape 101 with the tape width of 36 mm and the arrangement interval of the RFID circuit elements To of 120 mm, and similarly to the above FIG. 26, as the result that the cutting margin is set at 10 mm each at both ends in the tape longitudinal direction, the tape length is a fixed length of 100 mm. Settings of the RFID label mark Ro, a department print region 214, a name print region 216 and the like are the same as those in FIG. 26, and the explanation will be omitted.

FIG. 29 is a view illustrating another example of a template for print displayed when the cartridge 100' provided with the base tape 101' not including the RFID circuit element To is attached to the cartridge holder portion. This template 310 shows a case of the cartridge 100' provided with the base tape 101' with the tape width of 36 mm corresponding to the template 210 in FIG. 28, in which a department print region 314 and a name print region 316 are set similarly to the template 210 but the RFID label mark Ro is not set. In this template 310, the cutting margin is set at 5 mm each at both ends in the tape longitudinal direction, but the tape length is variable and the character arrangement is not center-aligned as in FIG. 28 but left-aligned. The template 310 also constitutes an example of the base template, which will be described later.

In the above illustrated examples, an image printed in one line with the designated font size on the department display regions 204, 214, 304, 314 (corresponding to the case with less number of print characters) is shown, but when there are more character strings to be printed, it may be so configured that a smaller font is automatically selected or the character strings are reduced in size to be laid out in two lines (See the above-mentioned FIG. 23A).

FIG. 30 is an explanatory view illustrating a list of examples of various setting items and the respective set values/setting modes relating to the print in the template displayed on the display 5a in the terminal 5 as above.

In FIG. 30, as the setting items in this example, the width of the base tapes 101, 101', the (longitudinal) length of the labels T, T', size in the right and left margins (at cutting), the font and font style of the print characters R, R', alignment directions in the vertical direction (label width direction) and the horizontal direction (label longitudinal direction) of the text, control (limitation) of the number of characters, painting of text, whole background, presence of the RFID label mark Ro and the like are set. In the illustrated example, various setting cases for the templates 200, 300 shown in FIGS. 26 and 27, respectively, are illustrated.

In the case of the template 300 without the RFID circuit element To, as mentioned above, settings are made such that the width of the base tape 101' is 24 mm, the length in the longitudinal direction of the label T' is free, the size in the right and left margins at cutting is 5 mm, the font of the print character R' is gothic, the font size is fixed at 20 dots, the font style is bold, the alignment direction in the vertical directions (label width direction) of the text is center-aligned, the alignment direction in the horizontal direction (label longitudinal direction) of the text is left-aligned, the limitation control of the number of characters is free (no limitation), no painting of the text, no whole background, no RFID label mark Ro and the like.

In the case of the template 200 with the RFID circuit element To, settings are made as mentioned above such that the width of the base tape 101 is 24 mm, the length in the longitudinal direction of the RFID label T is fixed at 100 mm, the size in the right and left margins at cutting is 10 mm, the font of the print character R is gothic, the font size is automatic setting, the font style is bold, the text alignment direction in the vertical direction (label width direction) is aligned to the side opposite to the arrangement position of the RFID circuit element To in the tape width direction, the text alignment direction in the lateral direction (label longitudinal direction) is center-aligned, limitation control on the number of characters is fixed to the outer frame size (limited within the frame size. If the number of characters is large, the font size is automatically set smaller as above and line feed is also carried out), no painting of the text, no whole background, with RFID label marl Ro and the like.

Other than the above setting items, other settings such as design of patterns of the print data to be created can be provided.

FIG. 31 is a functional block diagram illustrating functions of the CPU 5c for displaying the templates 200, 300, 210, 310 and the like on the display 5a and the like at the terminal 5. In FIG. 31, the CPU 5c comprises an external data processing portion 5D that carries out processing of article data (employee payroll and various data on each employee in the company, for example, in the above example) relating to an article to use the labels T, T' (nametags for the employees in this example) according to an operation input result by the operation means 5b and an access result to the database in the route server 4 or the information server 7 corresponding to that and processing of the cartridge information and the like based on a detection result of the sensor 20 in the apparatus 2 for producing RFID label, a storage device 5E (storage means) constituting the database (file database) storing and holding a base template file F1 and a replacement template file F2 for a tag tape, a base template selection portion 5A that selects a corresponding base template from the base template file F1 based on the cartridge information, a replacement template combination portion 5B that generates a template different from the base template (a template corresponding to the cartridge provided with the RFID circuit element To and the like) by selecting a corresponding replacement template from the corresponding replacement template file F2 based on the cartridge information and replacing and combining a part of the setting items in the base template, and a print data preparation portion 5C that creates a print data signal for driving the print head 10 for printing in the apparatus 2 for producing RFID label by inserting print data such as texts in the base template 5A (or a template after replacement combined using this and the replacement template 5B).

In the storage device 5E, in this example, the base template file f1, the replacement template file F2 for tag tape and the like are provided in a folder format, for example, as shown in the figure. The database is not limited to those provided in the storage device 5E at the terminal 5 but may be provided at another spot such as the terminal 5 or outside the apparatus 2 for producing RFID label through the communication line 3 or may be provided in the apparatus 2 for producing RFID label.

The base template file F1 stores data on various setting items and the respective set values/setting modes in the templates 300, 310 described in the above-mentioned FIG. 30, for example, in a single file for each tape width (24 mm, 36 mm . . . and the like) in this example. That is, in the case of the above template 300, data such that the width of the base tape 101' is 24 mm, the length in the longitudinal direction of the label T' is free, the right and left margin size at cutting is 5 mm, the font of the print character R' is gothic, the font size is fixed to 20 dots, the font style is bold, the text alignment direction in the vertical direction (label width direction) is center-aligned, the text alignment direction in the horizontal direction (label longitudinal direction) is left-aligned, the limitation control on the number of characters is free (no limitation), no painting of the text, no whole background, no RFID label mark Ro and the like is stored as a single file.

On the other hand, the replacement template file F2 is to realize display of data on various setting items and set values/ setting modes in the above-mentioned templates 200, 210 and the like. As a feature of this embodiment, when the templates 200, 210 and the like for the base tape 101 with the RFID circuit element To is to be displayed on the display 5a, display of the templates 200, 210 and the like is realized not by storing the data of the templates 200, 210 and the like as individual files for each tape width as in the above base template file but by replacing a part of data in the base template files 300, 310 and the like with the same tape width. The replacement template file F2 stores data for the replacement for each tape width (24 mm, 36 mm, . . . and the like) in a single file.

That is, in the case of the template 200 shown in the above-mentioned FIGS. 30 and 26 (in the case of the tape width of 24 mm), seven data conversions of the free length in the label T' longitudinal direction->label T length of 100 mm (fixed), right and left margin size at cutting of 5 mm->10 mm, the font size of the print character R' fixed to 20 dots->the print character R font size is automatic control, center-aligned in the vertical alignment direction of the text->up or down-aligned, left-aligned in the horizontal alignment direction of the text->center-aligned, no limitation control on the number of characters->frame size fixed control, and no RFID label mark Ro->with the RFID label mark Ro are stored in a single file. In other words, data on the font of the print character R', R (=gothic), font style (=bold), no painting of the text, no whole background and the like, which is common (same setting) to the template 300 and the template 200 is not provided in the replacement template file for the tape width of 24 mm.

FIG. 32 is a flowchart illustrating a control procedure executed by the CPU 5c at the terminal 5. In FIG. 32, upon appropriate operation (such as tag label production start instruction operation or the like) by the operation means 5b, for example, this flow is started. First, at Step S2302, an access is made to the database (not shown) of the route server 4 (or the information server 7) at the above external data processing portion 5D through the communication line 3, a list of article data (employee data for printing the nametags, for example) relating to the article (nametag, for example) to which the RFID circuit element To is affixed is obtained and stored in the RAM once and a display control signal is output to the display 5a so as to display the list on the display 5a (or it may be the display portion 53 of the apparatus 2 for producing RFID label). In this list, the name, sex, age, employee number, title, year of joining the company and the like of all the employees in each department are listed for each department of the company, for example.

When the operator makes a selection instruction through the operation means 5b according to the display to the display 5a and the like, at the subsequent Step S2304, the data relating to the employee selected and instructed is extracted and selected from the article data (employee data) list obtained at Step S2302 in the external data processing portion 5D and stored in the RAM once.

Then, the program goes to Step S2306, where at the external data processing portion 5D, the cartridge information and moreover, the tape attribute parameter information (including the tag attribute parameters) based on the detection results by the sensor 20 are obtained from the control circuit 30 in the apparatus 2 for producing RFID label through the communication line 3.

After that, the program goes to Step S2308, where at the external data processing portion 5D, based on the cartridge information, tape attribute parameter information and the like obtained at Step S2306, it is determined if the cartridge attached to the cartridge holder portion in the apparatus 2 for producing RFID label is the cartridge 100 provided with the base tape 101 having the RFID circuit element To or the cartridge 100' provided with the normal base tape 101' not having the RFID circuit element To.

If the cartridge 100' provided with the normal base tape 101' not having the RFID circuit element To is attached, the determination at step S2308 is satisfied, and the program goes to Step S2310. At Step S2310, at the above-mentioned base template selection portion 5A, an access is made to the base template file F1 in the database of the storage device 5E, the template corresponding to the attribute parameter information obtained at Step S2306 (the template with the tape width 24 mm, for example) is searched and extracted from the base template file F1 and stored in the RAM once.

On the other hand, if cartridge 100 provided with the base tape 101 having the RFID circuit element To is attached, the determination at Step s2308 is not satisfied, and the program goes to Step S2312. At Step S2312, at the above-mentioned base template selection portion 5A, an access is made to the base template file F1 in the database of the storage device 5E, the template corresponding to the tape attribute parameter information obtained at Step S2306 (the template with the tape width 24 mm, for example) is searched and extracted from the base template file F1 and stored in the RAM once. After that, further at the above-mentioned replacement template combination portion 5B, an access is made to the replacement template file F2 for tag tape in the database of the storage device 5E, and the template corresponding to the tape attribute parameter information obtained at Step S2306 (the template with the tape width 24 mm, for example) is searched and extracted from the replacement template file F2 and stored in the RAM once. Then, as mentioned above, a part of data on the predetermined items in the base template file with the tape width 24 mm is replaced by the replacement template file and a template (for the cartridge 100 with tag) is combined for display on the display 5a and the like in the end and stored in the RAM once.

When Step S2310 or Step S2312 is finished, the program goes to Step S2313, a display control signal is output to the display 5a, and the template stored in the RAM at Step S2310 or Step 2312 is displayed (See the above-mentioned FIGS. 26, 27, 28, 29 and the like). When Step S2313 is finished, the program goes to Step S2314. Display of the template at Step S2313 does not have to be made.

At Step S2314, at the print data preparation portion 5C, the template stored and held in the RAM at Step S2310 or Step S2312 is read out, and the data relating to the employee extracted and selected at Step S2304 is inserted into the replaceable region in this template (See the department print regions 204, 304, 214, 314, and the name print regions 206, 306, 216, 316 and the like in FIGS. 26, 27, 28, 29 and the like) so as to prepare the print data.

After that, the program goes to Step S2316, where at the print data preparation portion 5C, a display control signal corresponding to the print data prepared at Step S2314 is output to the display 5a, and an image when the RFID label T or the label T' is actually produced with the print data is displayed. This display is made (preview) on the display 5a at the terminal 5, for example, in a form substantially equal to the labels T, T' after production as shown in FIGS. 23A and 24A.

After that, at Step S2318, at the print data preparation portion 5C, the print data prepared at Step S2314 and displayed in an image at Step S2316 and the article data selected at step S2304 (data relating to the employee selected and instructed in the above example) is output (transmitted) to the control circuit 30 of the apparatus 2 for producing RFID label through the communication line 3, and this flow is finished.

FIG. 33 is a flowchart illustrating a control procedure executed by the control circuit 30 and corresponds to FIG. 10 described in the first embodiment above at production of the labels T, T', that is, the cover film 103 is fed and applied with the predetermined print by the print head 10 while the base tape 101 is bonded together so as to produce the label tape 110 with print and then, the label tape 110 with print is cut away to produce the labels T, T'.

In FIG. 33, when the operator performs the tag information reading or writing operation (in other words, tag label production operation) in the apparatus 2 for producing RFID label through the operation means 5a (or may be the general-purpose computer 6. The same applies to the following) at the terminal 5, for example, this flow is started.

First, at Step S2110, the print information output from the terminal 5 at Step S2318 shown in FIG. 32 to be printed on the labels T, T' by the print head 10 and the RFID tag information to be written in the IC circuit part 151 of the RFID circuit element To by the antenna 14 (including at least a tag ID, which is identification information of the RFID circuit element To and may include article data such as data relating to the employee in the above example. Alternatively, the article data is stored and held in the information server 7 and the like, so-called association information to associate the identification information of the RFID circuit element To with the article data is stored and held in the route server 4 and the like, and only the identification information may be written in the IC circuit part 151) are read in through the communication line 3 and the input/output interface 31. When the cartridge 100' provided with the normal base tape 101' not having the RFID circuit element is attached, only print information is read at Step S2110.

After that, the program goes to Step S2115, where the variable N to count the number of retry times when there is no reply from the RFID circuit element To and the flag F indicating if the communication is favorable or not are initialized.

Step S2120, Step S2125, Step S2130, Step S2140, Step S2141, Step S2145, Step S2150, Step S2160, Step S2170, Step S2180, and Step S2190 after that are substantially the same as Step S1115, Step S1120, Step S1200, Step S1125, Step S1130, Step S1137, Step S1135, Step S1140, Step S1145, Step S1150, and Step S1155 shown in FIG. 10, respectively.

That is, at Step S2120, the base tape 101 or 101' and the cover film 103 on which the above printing has been finished are integrated and fed out in a direction outside the cartridge 100 or 100'. After that, via Step S2125, the RFID tag information writing processing is carried out at Step S2130 (for details, see FIG. 34, which will be described later). This procedure is omitted when the cartridge 1001 provided with the normal base tape 101' not having the RFID circuit element is attached.

After that, via Step S2140, the combination of the RFID tag information and the print information is output through the input/output interface 31 and the communication line 3 at Step S2141 and stored in the information server 7 or the route server 4. The stored data is stored and held in the database, for example, so as to be referred to from the terminal 5 or the general-purpose computer 6 as needed. When the cartridge 100' provided with the normal base tape 101' not having the RFID circuit element is attached, the procedure at Step S2140 and step S2141 is omitted.

After that, at Step S2150, it is confirmed that print has been fully completed on a predetermined region to be processed at this point of time in the cover film 103 (region corresponding to the RFID circuit element To, for example, when the cartridge 100 provided with the base tape 101 having the RFID circuit element is attached) or not (if the determination at Step S2140 is not satisfied, via Step S2145), the program goes to Step S2160.

At Step S2160, similarly to Step S1140, it is determined if the label tape 110 with print has been fed to a predetermined position to be cut by the cutter 15. Specifically, when the cartridge 100 provided with the base tape 101 having the RFID circuit element is attached, for example, it is only necessary that the RFID circuit element To be a target and the print regions in the corresponding cover film 103 have all exceeded the cutter 15 by a predetermined length (margin amount) by detecting an appropriate identification mark provided in correspondence with each RFID circuit element To in the base tape 101 (in detail, in the separation sheet 101d or the cover film 103 or the like) by a known tape sensor provided outside the cartridge 100 (on the further downstream side in the feeding direction of the cutter 15, for example).

Alternatively, instead of such detection, determination may be made on whether the length obtained by adding a predetermined margin region to the print character length of the print R exceeds the entire length of the RFID circuit element To based on the print information (if exceeded, by cutting outside the margin region by the cutter 15 when at least the print on the cover film 103 has been completed, cutting of the RFID circuit element To be bonded can be avoided).

If the determination at Step S2160 is satisfied, similarly to the above, feeding-out of the base tape 101 or 101' from the first roll 102, feeding-out of the cover film 103 from the second roll 104, and feeding of the label tape 110 with print by the feeding roller 17 are stopped at Step S2170, the label tape 110 with print is cut at Step S2180, and the RFID label T or the print label T' with the predetermined print is produced. After that, the RFID label T or the print label T' is discharged from the carry-out exit 16 to outside the apparatus 2 at Step S2190.

FIG. 34 is a flowchart illustrating a detailed procedure at Step S2130 executed when the cartridge 100 provided with the base tape 101 having the RFID circuit element is attached and corresponds to FIG. 16 in the first embodiment.

In FIG. 34, when the above-mentioned Step S2125 in FIG. 33 is finished (after the identification information of the RFID circuit element To is set as appropriate by a known method), first, at Step S2131, a "Program" command to write desired data in the memory part 157 is output to the signal processing circuit 22. Based on this, a "Program" signal as RFID tag information including at least the above identification information is generated at the signal processing circuit 22 and transmitted to the RFID circuit element To into which the information is to be written through the transmitting portion 32 in the radio frequency circuit 21 (See the above-mentioned FIG. 3 and the like) and the antenna 14, and the information is written in the memory part 157.

After that, at Step S2132, a "Verify" command to verify contents of the memory portion 157 is output to the signal processing circuit 22 (See the above-mentioned FIG. 3 and the like). Based on this, a "Verify" signal as the RFID tag information is generated at the signal processing circuit 22 and transmitted to the RFID circuit element To into which the information is to be written through the transmitting portion 32 of the radio frequency circuit 21 and the antenna 14, and a reply is prompted.

Then, the program goes to Step S2133, where a reply signal sent (replied) in response to the "Verify" signal from the RFID circuit element To is received through the antenna 14 and taken in through the receiving portion 33 in the radio frequency circuit 21 and the signal processing circuit 22.

Next, at Step S2134, based on the receiving result at Step S2133, the information stored in the memory part 157 of the RFID circuit element To is confirmed to determine if the predetermined information sent as above is normally stored in the memory part 157 or not.

If the determination is not satisfied, the program goes to Step S2135, where one is added to N and whether it is N=5 or not is determined at Step S2136. In the case of N≦4, the determination is not satisfied but the program returns to Step S2131 and the same procedure is repeated. In the case of N=5, the program goes to Step S2137. At Step S2137, an error display signal is output to the terminal 5 or the general-purpose computer 6 through the input/output interface 31 and the communication line 3 to have corresponding writing failure (error) display made, and then the above-mentioned flag is set as the flag F=1 at Step S2138 to finish this flow. In this way, even if information writing is not successful, retry is made up to 5 times so as to ensure writing reliability.

On the other hand, if the determination at Step S2134 is satisfied, the program goes to Step S2139, where a "Lock" command to prohibit subsequent information writing is output to the signal processing circuit 22. Based on this, a "Lock" signal is generated at the signal processing circuit 22 and transmitted to the RFID circuit element To into which the information is to be written through the radio frequency circuit 21, and new information writing in the RFID circuit element To is prohibited. By this arrangement, writing of the RFID tag information in the RFID circuit element To be written is completed, and the RFID circuit element To is discharged as mentioned above. When Step S2139 is finished, the flow is finished.

In the above, the case where the RFID tag information is transmitted to the RFID circuit element To and written in the IC circuit part 151 so as to produce the RFID label T has been described, but not limited to this, there is a case where the RFID tag information is read out from the RFID circuit element To for read only in which the predetermined RFID tag information is stored and held unrewritably in advance, while the print corresponding to that is applied so as to produce the RFID label T.

In this case, even if the cartridge 100 provided with the base tape 101 having the RFID circuit element is attached, it may be so configured that only the print information is read in at Step S2110 in FIG. 33 and reading processing of the RFID tag information is carried out at Step S2130 (for details, see FIG. 35, which will be described later). After that, at Step S2141, combination of the print information and the read-in RFID tag information is held.

FIG. 35 is a flowchart illustrating a detailed procedure of the RFID tag reading processing.

In FIG. 35, at Step S2201, a "Scroll All ID" command to read out the information stored in the RFID circuit element To from which the information is to be read is output to the signal processing circuit 22. Based on this, a "Scroll All ID" signal as RFID tag information is generated at the signal processing circuit 22 and transmitted to the RFID circuit element To be read through the radio frequency circuit 21, and a reply is prompted.

Next, at Step S2202, a reply signal transmitted from the RFID circuit element To be read in response to the "Scroll All ID" signal (RFID tag information including at least the identification information of the RFID circuit element To) is received through the antenna 14 and taken in through the radio frequency circuit 21 and the signal processing circuit 22.

Next, at Step S2203, it is determined if there is nothing wrong with the reply signal received at Step S2202 using a known error detection signal (CRC code: Cyclic Redundancy Check and the like).

If the determination is not satisfied, the program goes to Step S2204, where one is added to N and whether it is N=5 or not is determined at Step S2205. In the case of N≦4, the determination is not satisfied but the program returns to Step S2201 and the same procedure is repeated. In the case of N=5, the program goes to Step S2206, where an error display signal is output to the terminal 5 or the general-purpose computer 6 through the input/output interface 31 and the communication line 3, corresponding writing failure (error) display is made on the terminal 5 or the general-purpose computer 6, the above-mentioned flag is set at the flag F=1 at Step S2207, and this routine is finished. In this way, even if information reading is not successful, retry is made up to 5 times, and reading reliability can be ensured.

On the other hand, if the determination at Step S2203 is satisfied, reading of the RFID tag information from the RFID circuit element To be read is completed, and this routine is finished.

In the above, a tape in which the base tapes 101, 101' are bonded to a print-receiving tape is constructed.

Also, Step S2306 in the flow in FIG. 32 executed by the CPU 5c at the terminal 5 constitutes parameter information acquisition means that acquires tape attribute parameter information.

Also, the templates 200, 300, 210, 310 and the like shown in FIGS. 26, 27, 28, 29 and the like correspond to the setting-factor groups set in plural relating to the print contents of the printing device according to the tape attribute parameter information acquired by the parameter information acquisition means, and Step S2313 in FIG. 32 constitutes a factor-group display control-signal output means that outputs a factor group display control signal for displaying at least a single set of the corresponding setting-factor group from the setting-factor groups set in plural in relation to the print contents of the printing device and also constitutes a second matching-preparation-processing device that carries out predetermined preparation processing for matching the print contents to the parameter information.

Also, the base templates 300, 310 and the like described using FIGS. 27, 29, 30 and the like correspond to basic setting-factor groups stored and held in the storage means in advance to realize display of the setting-factor group corresponding to the tape attribute parameter information acquired by the parameter information acquisition means on the display means, setting items and the respective set values or setting modes shown in FIG. 30 correspond to the setting factors, and Step S2312 shown in the flow in FIG. 32 constitute a replacement control signal output means that outputs a replacement control signal for replacing at least one setting factor included in the basic setting-factor group stored and held in the storage means in advance by a corresponding different setting factor and displaying it in order to realize the display of the setting-factor group corresponding to the tape attribute parameter information acquired by the parameter information acquisition means on the display means.

Also, Step S2110 in the flow shown in FIG. 33 executed by the control circuit 30 in the apparatus 2 for producing RFID label constitutes a data input means that inputs instruction data relating to the print by the printing device, and Step S2120 constitutes a print control device for controlling the printing device based on the instruction data relating to the print input by the data input means.

As mentioned above, in the apparatus 2 for producing RFID label of this embodiment, when the cartridge 100 or 100' is installed at the cartridge holder portion, the tape attribute parameter information (tag presence information, tag attribute parameter) of the base tape 101 or 101' provided at each of them is detected by the sensor 20 and input to the control circuit 30. At the terminal 5, according to the tape attribute parameter information, the optimal (that can realize a favorable print mode typically) templates 200, 300, 210, 310 and the like are displayed. That is, according to diversified needs, whatever cartridge is installed at the cartridge holder portion by the operator, the optimal template is automatically associated with the cartridge accordingly and displayed on the display 5a. Thus, without cumbersome setting operation, mismatching with the print is easily prevented, and the desired labels T, T' can be produced by the optimal print by the print head 10 in the apparatus 2 for producing RFID label, which can improve convenience for the operator.

At this time, depending on which of the cartridge 100 provided with the base tape 101 having the RFID circuit element To or the cartridge 100' provided with the normal base tape 101' not having the RFID circuit element To is installed at the cartridge holder portion, different templates 200, 210 and the like or the templates 300, 310 or the like are displayed on a display 5a. That is, whether the cartridge 100 is installed or the cartridge 100' without a tag is installed by the operator according to the needs, the optimal templates 200, 210 and the like or the templates 300, 310 or the like can be automatically associated and displayed on the display 5a. Thus, without cumbersome setting operation, the RFID label T or the normal label T' without a tag can be easily produced by switching at the same apparatus 2 for producing label for production, which can further improve convenience.

Also, as mentioned above, when the communication sensitivities of the IC circuit part 151 and the antenna 152, the memory capacity of the IC circuit part 151, the communication protocol used in the communication, the wave transmission output, the frequency, the communicable distance and the like are recorded in the portion 190 to be detected, according to the communication distance of the RFID circuit element To provided at the tape 101, 101', the type of communication protocol, the memory capacity of the IC circuit part 151 and the like, for example, a template which can print only with large characters or a template which can also print small characters can be obtained. Also, with the template which can print only with large characters, it is possible to print with a certain size and the characters that can not be printed can be stored in the RFID circuit element To or the like.

Also, when display is made by switching between the templates 200, 210 and the like or the templates 300, 310 and the like on the display 5a, this embodiment particularly has the following effects. That is, when the optimal template according to the cartridge type (in other words, the type of the base tape) is to be displayed on the display, if all the setting factors are stored in the database in the storage device 5E provided at the terminal 5 as data for each template, the memory capacity required for the storage device 5E becomes huge. Then, particularly in this embodiment, the base templates 300, 310 and the like corresponding to the attachment of the cartridge 100' provided with the normal base tape 101' not having the RFID circuit element To are stored and held in the storage device 5E in advance, and when the templates 200, 210 and the like corresponding to the attachment of the cartridge 100 provided with the base tape 101 having the RFID circuit element To are to be displayed on the display 5a, by replacing at least one setting factor included in the base templates 300, 310 and the like at the replacement template combination portion 5B, the display of the templates 200, 210 and the like are realized. By this arrangement, data amount required for display of the templates 200, 210 and the like can be reduced, and as a result, the memory capacity required in the storage means 5E can be drastically reduced.

In the second embodiment, various variations are possible in a range without departing from its gist and the technical scope other than the above. The variations will be described below in order.

(2-1) When the Template is Changed According to the Tag Arrangement Interval:

In the above, the case of the templates 200, 300 with the cutting margin set at 10 mm each at both ends in the tape longitudinal direction and the tape length fixed at 100 mm corresponding to the attachment of the cartridge 100 in which the RFID circuit elements To are arranged on the base tape 101 with an interval of 120 mm was described (See FIGS. 26, 28 and 30), but not limited to that. That is, when the cartridge 100 in which the RFID circuit elements To are arranged with another dimension or an interval of 100 mm, for example, on the base tape 101 is attached for use, a template 230 with the cutting margin at 10 mm each at both ends in the tape longitudinal direction and the tape length fixed to 80 mm as shown in FIG. 36 corresponding to FIG. 26 may be used. For dimensions other than them, corresponding templates may be provided in advance for use. Also, when such tag arrangement interval information is included in the attribute parameter information obtained at Step S2306 in FIG. 32, a corresponding template according to that may be searched and extracted for use from the base template file F1 in the database at the storage device 5E at Step S2310. Also, similarly at Step S2312, a corresponding template may be searched and extracted for use from the replacement template file F2 in the database at the storage device 5E according to the tag arrangement interval information.

According to this variation, even if the operator installs the base tape 101 with various RFID circuit element intervals according to the needs, the optimal template can be automatically associated and displayed according to each of them. As a result, without cumbersome setting operation, the RFID label T with different length can be easily produced by switching at the same apparatus for producing RFID label based on the base tape 101 with various RFID circuit element intervals, which results in an effect of further improved convenience.

(2-2) When the Print Images by a Plurality of Templates are Displayed in a List:

FIG. 37 is a flowchart illustrating a control procedure executed by the CPU 5c at the terminal 5 in this variation and corresponds to the above-mentioned FIG. 32. The same procedures as those in FIG. 32 are given the same reference numerals and explanation will be omitted.

In FIG. 37, instead of the above Step S2314, Step S2314' is newly provided in this variation. At Step S2314', the template stored and held in the RAM in the print data preparation portion 5C is read out at step S2310 or Step S2312 similarly to Step S2314, and data relating to the employee extracted and selected at Step S2304 is inserted into a replaceable region in this template so as to create the print data. Moreover, for a predetermined (at least another) template set and stored in association in advance as another candidate for the template, for example, different from the template stored and held in the RAM at Step S2310 or Step S2312, the same data extracted and selected at Step S2304 is inserted in the replaceable region similarly to the above so as to create the print data.

After that, the program goes to Step S2316' newly provided instead of the above-mentioned Step S2316, where at the print data preparation portion 5C, a display control signal corresponding to the plurality of print data prepared at Step S2314', respectively, is output to the display 5a and the plurality of images when the RFID label T or label T' is actually produced by the print data is displayed capable of comparison and listing.

FIG. 38 is a view illustrating an example of the display on the display 5a at this time. In this example, while the cartridge 100 having the base tape 101 provided with the RFID circuit element To is attached, the print image is prepared by the corresponding templates 200, 300 and the like, and it is displayed as "image with tag" on the right in the figure. Below that, a check box with "PRINT WITH THIS TEMPLATE" is provided. On the other hand, as another template candidate, another print image is prepared by the templates 210, 310 and the like corresponding to the case of the cartridge 100' having the base tape 101' not provided with the RFID circuit element To and displayed as "image without tag" on the left in the figure. Below that, a check box with "PRINT WITH THIS TEMPLATE AFTER REPLACEMENT" is provided.

Returning to FIG. 37, when Step S2316' is finished, the program goes to Step S2319, where it is determined if there has been operation input indicating that print may be applied using the currently displayed template from the operator through the operation means 5b or not. If the operator checks the check box with "PRINT WITH THIS TEMPLATE" below "image with tag" on the right in the figure and inputs "Yes" in response to the display "OK? (Y/N)", for example, the determination at Step S2319 is satisfied, the program goes to Step S2318 similarly to the above, the print data prepared at Step S2314' and displayed in image at Step S2316' and the article data selected at step S2304 are output (transmitted) to the control circuit 30 in the apparatus 2 for producing RFID label through the communication line 3 at the print data preparation portion 5C and this flow is finished.

On the other hand, if the operator determines (rethinks) that the print image displayed as reference is better, checks the checkbox with "PRINT WITH THIS TEMPLATE AFTER REPLACEMENT" below the "image without tag" on the left in FIG. 38 and inputs "Yes" in response to the display "OK? (Y/N)", for example, the determination at Step S2319 is not satisfied, but the program goes to newly provided Step S2320.

At Step S2320, an access is made to the control circuit 30 in the apparatus 2 for producing RFID label through the communication line 3, and based on the detection signal of the sensor 20, it is determined if the cartridge has been replaced by a cartridge corresponding to the template of the above "PRINT WITH THIS TEMPLATE AFTER REPLACEMENT" (the cartridge 100' provided with the normal base tape 101' not having the RFID circuit element To in the above example) or not. The determination at the subsequent Step S2320 is not satisfied till it is replaced, the program goes to Step S2321, a predetermined notification-control-signal is output to the display 5a, for example, and as shown in FIG. 39, a predetermined alarm is displayed indicating that the template selected based on the intension of the operator in the end does not match the cartridge currently attached to the cartridge holder portion. The display is not limited to visual notification, but sound notification may be made.

When it is detected by the sensor 20 that the cartridge is replaced and the new cartridge matches the displayed template, the determination at Step S2320 is satisfied and the program goes to Step S2318.

In the above, Step S2316' in FIG. 37 constitutes an image display control-signal output means that outputs an image-display-control signal for displaying a plurality of print images when each of the plurality of different setting-factor groups is applied to the print operation of the printing device in each claim by the display means capable of comparison with each other.

Also, Step S2318 constitutes a print-control signal output means that outputs a print-control signal for applying the print corresponding to the signal by the printing device when a signal based on the operation of a selection operation means (operation means 5b at the terminal 5) for selecting the print by the non-corresponding print image is input in response to the display by the display means based on the above image-display-control signal.

Moreover, Step S2321 constitutes a notification control-signal output means that outputs a notification-control-signal for making a corresponding notification by a notifying means (the display 5a, a sound generating device at the terminal 5 and the like) when a signal based on the operation of the selection operation means for selecting the print by the non-corresponding print image is input in response to the display by the display means.

According to the variation configured as above, by the listed display of images based on the plurality of templates on the display 5a as shown in FIG. 38, the operator can visually confirm a finished state of the label by comparing print images when a different template is applied before the labels T, T' are actually produced.

Particularly, not only that the print image by the template corresponding to the cartridge installed at the cartridge holder portion can be confirmed but also the print image by another template not corresponding to the installed cartridge as reference can be visually compared. Moreover, since the template displayed as reference (another template candidate) can be newly selected and print can be applied based on this, convenience can be further improved.

Also, when another template candidate is newly selected as above (till the cartridge is replaced), the operator can surely recognize the fact that the current cartridge does not match the template and should be replaced as shown in FIG. 39.

(2-3) When the Template is Made Editable:

That is, in the above, even though the templates 200, 210, 230, 300, 310 and the like are displayed on the display 5a, the setting factors of each template of the set values or setting modes such as the width of the base tape 101, 101', the (longitudinal) length of the labels T, T', the right and left margin size (at cutting), the font and font style of the print characters R, R', the alignment direction of the text in the vertical (label width direction) and horizontal (label longitudinal direction) directions, the (limitation) control on the number of characters, the painting of the text, the whole background, presence of the RFID label mark Ro and the like as shown in FIG. 30 are fixed for each template, but not limited to this.

That is, by operating the operation means 5b at the terminal 5 as appropriate, for example, the normal mode with the fixed set values/setting modes of the template is switched to an editing mode for changing the set values/setting modes, and in this editing mode, the numeral values, modes and the like may be made changeable by the operator through the operation of the operation means 5b (editing operation means). Then, the CPU 5c outputs a display control signal corresponding to the changed contents to the display 5a for the display.

By this arrangement, since the operator can change at least one setting factor included in the template by the operation means 5*b* to a desired mode after checking the templates 200, 300 and the like automatically displayed corresponding to the cartridges 100, 100' installed at the cartridge holder portion on the display 5*a*, convenience can be further improved by this.

At this time, predetermined limitation may be applied to editing in the above editing mode instead of completely free operation by the operator. That is, at a stage where the operator is to execute the editing by the operation means 5*a*, based on the cartridge information detected by the sensor 20 and obtained by the control circuit 30, depending on whether the cartridge concerned is the cartridge 100 including the base tape 101 provided with the RFID circuit element To or not, or corresponding to the other tape attribute parameter information, a range of settable numeral values may be limited by the operator in the editing operation and displayed on the display 5*a* (in the case of the template 200 corresponding to the cartridge 100, the "right and left margin size" can be edited only in a range from 0 to 10 mm, for example), or only those limited in advance as options may be displayed (in the case of the template 200 corresponding to the cartridge 100, as for the "text alignment horizontal direction", only the center-aligned and left-aligned can be selected and edited, for example).

By providing limitation as above, when the operator is to change the setting factor included in the automatically displayed template to a desired mode, the range in which the change is allowed in the form corresponding to the cartridge initially installed in the cartridge holder portion can be displayed with limitation (in an allowable range).

(2-4) When the Display Means and Operation Means are Provided on the Side of the Apparatus for Producing RFID Label:

That is, the function as the display means of the display 5*a* at the terminal 5 or the function of the operation means 5*b* (including the function as the selection operation means) mentioned above may be replaced by the display portion 53 and the operation portion 52 (operation means) in the apparatus 2 for producing RFID label, respectively. In this case, various display control signals and the like output from the CPU 5*c* to the display 5*a* in the above are input from the input/output interface 31 and the control circuit 30 in the apparatus 2 for producing RFID label to the display portion 53 through the communication line 3 and corresponding display is made. The various operation signals and the like input from the operation means 5*b* to the CPU 5*c* in the above are input to the CPU 5*c* at the terminal 5 from the operation portion 52 in the apparatus 2 for producing RFID label by the communication line 3 through the control circuit 30 and the input/output interface 31, and corresponding processing, control and the like are carried out. In this case, the operation portion 52 on the side of the apparatus 2 for producing RFID label constitutes a device that operates and inputs the instruction data (text data to be printed by the print head 10) relating to the print by the printing device corresponding to the at least one set of setting-factor group displayed on the display means.

With this variation, too, the same effect as that of the second embodiment is obtained.

(2-5) When a Local Network is Used:

The case where the apparatus 2 for producing RFID label, the terminal 5 and the like are incorporated in a (wide area) network through the communication line 3 was described above, but not limited to that. That is, as shown in FIG. 40, for example, the apparatus 2 for producing RFID label and the terminal 5 may be connected to each other (not connected to other external lines) through a local network (so-called a LAN and the like) so that a RFID tag manufacturing system 1' is formed by them.

According to this variation, the same effects as those in the second embodiment and the variations in (2-1) to (2-4) can be also obtained.

(2-6) When the Single Apparatus for Producing RFID Label is Provided with All the Functions:

That is, not only the operation means (including selection operation means and editing operation means) and display means (including notifying means) as in the above variation in (2-4) but all the functions of the terminal 5 in the second embodiment are provided on the side of the apparatus 2 for producing RFID label (so-called standalone type). In this case, the same control procedure as that shown in FIGS. 32, 37 and the like executed by the CPU 5*c* at the terminal 5 are carried out by the control circuit 30 in the apparatus 2 for producing RFID label.

With this configuration, the apparatus 2 for producing RFID label itself constitutes the editing apparatus for label described in each claim. The storage device equivalent to the storage device 5E constituting the database is provided at the apparatus 2 for producing RFID label and performs the same function.

Step S2306 in FIG. 32 executed by the sensor 20 and the control circuit 30 constitute the parameter information acquisition means, and Step S2313 in FIG. 32 executed by the control circuit 30 constitutes the factor-group display control-signal output means and also constitutes the display signal output means and moreover constitutes the first matching-preparation-processing device. Also, Step S2312 in FIG. 32 executed by the control circuit 30 constitutes the replacement control-signal output means, Step S2316' in FIG. 37 executed by the control circuit 30 constitutes the image display control-signal output means, Step S2318 in FIG. 37 executed by the control circuit 30 constitutes the print control-signal output means, and step S2321 in FIG. 37 executed by the control circuit 30 constitutes the notification control-signal output means. Contrary to the above (2-4), it is possible to provide only the editing function in the apparatus 2 for producing RFID label and the functions of the operation means and the display means outside the apparatus 2 for producing RFID label.

With this variation, too, the same effects as those in the second embodiment and the variations in (2-1) to (2-5) can be obtained.

(2-7) Others (7-A) When Tape Bonding is Not Carried Out:

That is, not that print is applied on the cover film 103 different from the base tape 101 provided with the RFID circuit element To or the normal base tape 101' and they are bonded as mentioned above, but the present invention may be applied to the apparatus for producing RFID label for applying print on the cover film provided at the tag tape. In this case, a thermal tape can be used as the tape (the RFID circuit element To is provided at the thermal tape to have a tape corresponding to the base tape 101). In this case, the thermal tape constitutes the print-receiving tape described in each claim and also constitutes the tag tape.

With this variation, too, the same effects as those in the second embodiment and the variations can be obtained.

(7-B) Other Modes to Obtain the Tape Attribute Parameter Information

In the above, the tape attribute parameter information is detected and obtained from the portion 190 to be detected of the cartridge, but not limited to this. That is, the RFID circuit element for cartridge identification may be provided at the main body of the cartridges 100, 100' and the tape attribute parameter information stored in the IC circuit part of the RFID circuit element for cartridge identification by an antenna newly provided at the main body 8 of the apparatus 2 for communicating with a RFID tag may be read in (or the tape attribute parameter information is obtained by making an access to the database of an appropriate server based on the identification information of the RFID circuit element).

In this case, more parameter data can be surely obtained than the case using the sensor 20 made of a mechanical switch, an optical sensor or the like, and labor of the operator for that purpose is not needed, which can improve convenience. The antenna for the wireless communication may be constituted in common with the antenna 14 or may be configured as an independent antenna.

(7-C) Other Tape Forms:

In the above, the case where the base tape or the thermal tape is wound around the reel member so as to constitute a roll, the roll is arranged in the cartridges 100, 100' and the tape is fed out thereof was described, but not limited to this. For example, it may be so configured that a lengthy flat-paper state or strip-state tapes or sheets (including those formed by feeding out the tape wound around the roll and then, by cutting it to an appropriate length. Also, the RFID circuit element To is arranged on those corresponding to the base tape 101) are stacked in a predetermined storage portion as a cartridge, the cartridge is attached to the cartridge holder portion on the side of the apparatus 2 for producing RFID label and transferred and fed from the storage portion, and the print and writing are applied so as to produce the labels T, T'.

Moreover, not limited to the cartridge type, either, configuration to attach the roll directly to the side of the apparatus 2 for producing RFID label or configuration in which the lengthy flat-paper state or strip-state tapes or sheets are transferred one by one from outside the apparatus 2 for producing RFID label by a predetermined feeder mechanism and supplied into the apparatus 2 for producing RFID label are possible. In these cases, too, by obtaining the tape attribute parameter information of the tape (including the sheets) on the side of the apparatus by some known method such as contact, optical, wireless communication or the like, the same effect as those of the second embodiment and each variation can be obtained.

(7-D) Applications Other than Production of Nametags:

In the above, production of nametags is used as an example and explanation was made based on the state where the application for producing nametags is stored and held in the terminal 5 in advance and the application is started so as to expand each template, but not limited to this. That is, the present invention can be also applied to production of the labels T, T' by the apparatus 2 for producing RFID label for other various uses such as fixed asset management, office document control, general purposes and the like. In these cases, an appropriate application is started according to each use so as to expand each template on the application.

Other than those mentioned above, methods of the first or second embodiment and the variations may be combined as appropriate for use.

The "Scroll All ID" signal, the "Erase" signal, the "Verify" signal, the "Program" signal and the like used in the above shall comply with the specification formulated by EPC global. The EPC global is a non-profit corporation jointly established by International EAN Association, which is an international organization of distribution codes, and UCC (Uniformed Code Council), which is U.S. distribution code organization. Signals complying with other standards will do as long as they serve the same functions.

Though not specifically exemplified, the present invention should be put into practice with various changes made in a range not departing from its gist.

What is claimed is:

1. An apparatus for producing RFID label comprising:
a holder for installing a tag tape configured to install a tag tape in which a RFID circuit element provided with an IC circuit part storing information and a tag antenna connected to the IC circuit part is arranged;
an apparatus antenna configured to transmit and receive information by wireless communication with said IC circuit part of said RFID circuit element;
an information access device configured to generate access information to said IC circuit part of said RFID circuit element, to transmit the information to said RFID circuit element contactlessly through said apparatus antenna, and to make an access to said IC circuit part;
a printing device configured to apply a print on said tag tape or a print-receiving tape to be bonded thereto;
a data input device configured to input instruction data relating to the print by the printing device;
a print controller configured to control said printing device based on the instruction data relating to said print input by the data input device;
a first matching-preparation-processing device configured to, based on tag parameter information relating to tag attribute parameters or communication parameters of said RFID circuit element or on tape attribute parameter information relating to said tag tape or a print-receiving tape to be bonded thereto, carry out predetermined preparation processing to match a size of print contents with a size of a printable region of said tag tape or said print-receiving tape said parameter information. , and
a printing-length calculating device configured to calculate a printing length when the print is printed by said printing device, in accordance with said instruction data relating to the print input by said data input device.
wherein:
said holder for installing a tag tape is a roll holder for a tag tape capable of detachable attachment of a roll of tape with RFID tag around which said tag tape is wound;
said first matching-preparation-processing device is a determining device configured to determine a matching between said tag parameter information of said RFID circuit element provided at said roll of tape with RFID tag and said instruction data;
said tag parameter information is data including at least an arrangement interval of said RFID circuit elements on the tape as said tag attribute parameter; and
said determining device compares the printing length calculated by said printing-length calculating device with the arrangement interval of said RFID circuit element and determines said matching according to a relationship that one of two values is larger than another, and wherein:
when said determining device determines a mismatch between the printing length and interval of said RFID circuit element, said print controller carries out matching control for said printing device by making said printing length shorter than that initially calculated by said printing-length calculating device, such that the shortened printing length matches the interval of said RFID circuit element.

2. An apparatus for producing RFID label according to claim 1, further comprising a determination storage device configured to store a determination result by said determining device.

3. An apparatus for producing RFID label according to claim 1, further comprising a notification-signal output device configured to output a notification signal for notification based on the determination result by said determining device.

4. An apparatus for producing RFID label according to claim 3, wherein:
   said notification-signal output device, when said determination result at said determining device is mismatching, outputs said notification signal indicating the result.

5. An apparatus for producing RFID label according to claim 3, wherein:
   said notification-signal output device, when said determination result at said determining device is mismatching, outputs information relating to a roll of tape with RFID tag for replacement which matches said instruction data input by said data input device.

6. An apparatus for producing RFID label according to claim 5, further comprising a replacement-information storage device configured to store and hold information relating to said roll of tape with RFID tag for replacement.

7. An apparatus for producing RFID label according to claim 6, further comprising an update processing device configured to update and process information relating to said roll of tape with RFID tag for replacement stored and held in said replacement-information storage device.

8. An apparatus for producing RFID label according to claim 7, wherein:
   said tag parameter information is provided at said cartridge for including at least a RFID tag.

9. An apparatus for producing RFID label according to claim 8, further comprising a detecting device for a cartridge identifier configured to detect a cartridge identifier that includes said tag parameter information and is provided at said cartridge for including at least a RFID tag.

10. An apparatus for producing RFID label according to claim 8, wherein:
    said tag parameter information is obtained by an access to said IC circuit part by said information access device.

11. An apparatus for producing RFID label according to claim 1, wherein: said roll holder for a tag tape is a cartridge holder to which a cartridge for including at least a RFID tag configured to store said roll of tape with RFID tag can be detachably attached; and
    said determining device determines a matching between said tag parameter information relating to said tag attribute parameters or said communication parameters of said RFID circuit element provided at said cartridge for including at least a RFID tag and said instruction data relating to said print input by said data input device.

12. An apparatus for producing RFID label according to claim 1, wherein:
    said data input device inputs text data to be printed by a printing device as said instruction data.

13. An apparatus for producing RFID label according to claim 1, wherein: said tag parameter information is data including at least one of communication sensitivities of said IC circuit part and said tag antenna of the corresponding RFID circuit element, memory capacity of said IC circuit part, a width of the tape to which said RFID circuit element is to be affixed, and an arrangement interval of said RFID circuit elements on the tape, as said tag attribute parameters.

14. An apparatus for producing RFID label according to claim 1, wherein:
    said tag parameter information is data including at least one of a frequency of an electric wave and a communication protocol used in said wireless communication, as said communication parameters.

15. An apparatus for producing RFID label according to claim 1, wherein:
    said determining device determines said matching according to said relationship between a length obtained by adding a dimension of predetermined margin region to said printing length and said arrangement interval of said RFID circuit element.

16. An apparatus for producing RFID label according to claim 1, wherein:
    said print controller is configured to be switchable between a matching control mode for carrying out said matching control and a normal mode for not carrying out said matching control.

17. An apparatus for producing RFID label according to claim 1, further comprising a parameter-information detecting device configured to detect said tape attribute parameter information of said tag tape installed by using said holder for installing a tag tape or the print-receiving tape to be bonded to said tag tape, wherein
    said first matching-preparation-processing device is a display-signal output device that outputs a display signal for displaying at least corresponding one set of setting-factor group by a display device from among setting-factor groups set in plural sets relating to the print contents of said printing device according to said tape attribute parameter information detected by said parameter-information detecting device, and
    said data input device inputs said instruction data corresponding to at least one set of setting-factor group relating to said display signal output by said display-signal output device.

18. An apparatus for producing RFID label according to claim 17, further comprising an operation device configured to be operable by an operator to generate instruction data relating to said print corresponding to said at least one set of setting-factor group displayed on said display device.

19. An apparatus for producing RFID label according to claim 17, wherein:
    said holder for installing a tag tape is a cartridge holder to which a cartridge for including at least a RFID tag configured to store a tag tape roll around which said tag tape is wound can be detachably attached, and said tape attribute parameter information is provided at said cartridge for including at least a RFID tag.

20. An apparatus for producing RFID label according to claim 19, wherein:
    said parameter-information detecting device is a detecting device for a cartridge identifier configured to detect a cartridge identifier that includes said tape attribute parameter information and is provided at said cartridge for including at least a RFID tag.

21. An apparatus for producing RFID label according to claim 20, wherein:
    said detecting device for a cartridge identifier is a cartridge-type detecting device configured to detect type information of said cartridge for including at least a RFID tag as said cartridge identifier.

22. An apparatus for producing RFID label according to claim 17, wherein:
    said data input device inputs text data to be printed by said printing device as said instruction data.

* * * * *